United States Patent
Suzuta et al.

(10) Patent No.: US 9,123,922 B2
(45) Date of Patent: Sep. 1, 2015

(54) LITHIUM ION BATTERY EXTERIOR MATERIAL

(75) Inventors: Masayoshi Suzuta, Tokyo (JP); Takashi Jikumaru, Tokyo (JP); Hidenori Echizen, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 162 days.

(21) Appl. No.: 13/878,946

(22) PCT Filed: Oct. 14, 2011

(86) PCT No.: PCT/JP2011/073629
§ 371 (c)(1),
(2), (4) Date: Apr. 11, 2013

(87) PCT Pub. No.: WO2012/050182
PCT Pub. Date: Apr. 19, 2012

(65) Prior Publication Data
US 2013/0209868 A1   Aug. 15, 2013

(30) Foreign Application Priority Data

Oct. 14, 2010 (JP) .................................. 2010-231560
Mar. 23, 2011 (JP) .................................. 2011-064269
Apr. 8, 2011 (JP) .................................. 2011-086235
Jul. 20, 2011 (JP) .................................. 2011-158848

(51) Int. Cl.
*H01M 2/04* (2006.01)
*H01M 2/02* (2006.01)
(Continued)

(52) U.S. Cl.
CPC .................. *H01M 2/026* (2013.01); *B32B 7/02* (2013.01); *B32B 7/12* (2013.01); *B32B 15/08* (2013.01); *B32B 15/20* (2013.01); *B32B 27/08* (2013.01);
(Continued)

(58) Field of Classification Search
CPC ............. H01M 10/0525; Y02E 60/122; Y10S 525/905; C08L 71/123; C08L 77/00
USPC ............ 429/163, 141, 175; 525/74, 193, 232, 525/78, 211, 233, 197, 196, 192, 66, 92, 68, 525/97, 905; 524/572, 504
See application file for complete search history.

(56) References Cited

U.S. PATENT DOCUMENTS

2002/0142178 A1   10/2002   Yamashita et al.
2010/0255365 A1*  10/2010   Suzuta .......................... 429/163

FOREIGN PATENT DOCUMENTS

CN   1347573      5/2002
JP   54-160481   12/1979
(Continued)

OTHER PUBLICATIONS

Yutaka et al., Machine translated IDS Reference JP 2008-277274 A Nov. 24, 2014.*

(Continued)

*Primary Examiner* — Patrick Ryan
*Assistant Examiner* — Jose Colucci Rios

(57) ABSTRACT

A lithium ion battery exterior material, includes: a base material layer, and a sequentially laminated adhesive layer, aluminum foil layer provided with a corrosion prevention treated layer, and an adhesive resin layer on one surface of the base material layer; wherein, the adhesive resin layer contains an acid-modified polyolefin resin and a miscible elastomer dispersed in the acid-modified polyolefin at a dispersed phase size of 1 nm to less than 1 μm.

13 Claims, 7 Drawing Sheets

(51) Int. Cl.
*H01M 10/0525* (2010.01)
*B32B 7/02* (2006.01)
*B32B 7/12* (2006.01)
*B32B 15/08* (2006.01)
*B32B 15/20* (2006.01)
*B32B 27/08* (2006.01)
*B32B 27/30* (2006.01)
*B32B 27/32* (2006.01)
*B32B 27/34* (2006.01)
*B32B 27/36* (2006.01)

(52) U.S. Cl.
CPC ............... *B32B 27/306* (2013.01); *B32B 27/32* (2013.01); *B32B 27/34* (2013.01); *B32B 27/36* (2013.01); *H01M 2/0275* (2013.01); *H01M 2/0277* (2013.01); *H01M 2/0285* (2013.01); *H01M 2/0287* (2013.01); *H01M 10/0525* (2013.01); *B32B 2250/05* (2013.01); *B32B 2255/06* (2013.01); *B32B 2255/10* (2013.01); *B32B 2255/26* (2013.01); *B32B 2307/206* (2013.01); *B32B 2307/42* (2013.01); *B32B 2307/51* (2013.01); *B32B 2307/518* (2013.01); *B32B 2307/702* (2013.01); *B32B 2307/704* (2013.01); *B32B 2307/714* (2013.01); *B32B 2307/734* (2013.01); *B32B 2457/00* (2013.01); *B32B 2457/10* (2013.01); *Y02E 60/122* (2013.01)

(56) References Cited

FOREIGN PATENT DOCUMENTS

| | | |
|---|---|---|
| JP | 9-164639 | 6/1997 |
| JP | 11-86808 | 3/1999 |
| JP | 2001-68074 | 3/2001 |
| JP | 2001-176458 | 6/2001 |
| JP | 2001-202927 | 7/2001 |
| JP | 2001-202928 | 7/2001 |
| JP | 2001-243928 | 9/2001 |
| JP | 2002-104474 | 4/2002 |
| JP | 2002-144479 | 5/2002 |
| JP | 2002-187233 | 7/2002 |
| JP | 2002-210898 | 7/2002 |
| JP | 2002-361798 | 12/2002 |
| JP | 2003-288866 | 10/2003 |
| JP | 2003-321582 | 11/2003 |
| JP | 2004-42477 | 2/2004 |
| JP | 2004-74419 | 3/2004 |
| JP | 2004-142302 | 5/2004 |
| JP | 2004-327043 | 11/2004 |
| JP | 2006-228653 | 8/2006 |
| JP | 2006-236938 | 9/2006 |
| JP | 2006-318685 | 11/2006 |
| JP | 2007-95652 | 4/2007 |
| JP | 2007-280923 | 10/2007 |
| JP | 2008-19003 | 1/2008 |
| JP | 2008-77930 | 4/2008 |
| JP | 2008-210777 | 9/2008 |
| JP | 2008-277274 | 11/2008 |
| JP | 2009-73014 | 4/2009 |
| JP | 2009-245680 | 10/2009 |
| JP | 2010-102935 | 5/2010 |

OTHER PUBLICATIONS

Japanese Office Action mailed Mar. 4, 2014 in corresponding Japanese Application No. 2013-204923.
"Tech-On!", on the Web Site of Nikkei BP net, Nov. 21, 2005, pp. 1-4, http://techon.nikkeibp.co.jp/article/NEWS/20051121/110912.
Mitsui Chemicals, Inc., "Commercialization of NOTIO™, a Nano-Crystal Structure Controlled Elastomer", Apr. 11, 2005, pp. 1-1, http://www.chem-t.com/fax/images/tmp_file1_1113193169.pdf.
Mitsui Chemicals, Inc., "NOTIO™, a Nano-Crystal Structure Controlled Elastomer", Jan. 2006, by the Functional Resins Laboratory, Elastomer Group of Mitsui Chemicals, Inc., pp. 1-14.
International Search Report of PCT/JP2011/073629 mailed Jan. 24, 2012.
Chinese Office Action dated Oct. 8, 2014 in corresponding Chinese Patent Application No. 201180049252.8.
Japanese Office Action dated Nov. 4, 2014 in corresponding Japanese Patent Application No. 2014-060620.
Japanese Office Action dated Nov. 4, 2014 in corresponding Japanese Patent Application No. 2014-060818.
Japanese Office Action dated Nov. 11, 2014 in corresponding Japanese Patent Application No. 2014-060814.

\* cited by examiner

LITHIUM ION BATTERY EXTERIOR MATERIAL

CROSS-REFERENCE TO RELATED APPLICATIONS

This application is a U.S. National Stage application of PCT/JP2011/073629 filed Oct. 14, 2011 and claims the foreign priority benefit of Japanese Patent Application No. 2010-231560 filed in Japan on Oct. 14, 2010, Japanese Patent Application No. 2011-064269 filed in Japan on Mar. 23, 2011, Japanese Patent Application No. 2011-086235 filed in Japan on Apr. 8, 2011, and Japanese Patent Application No. 2011-158848 filed in Japan on Jul. 20, 2011, the contents of which are incorporated herein by reference.

BACKGROUND OF THE INVENTION

1. Field of the Invention

The present invention relates to an exterior material for a lithium ion battery.

2. Description of Related Art

Lithium ion batteries are widely used as batteries of personal computers, portable terminal devices such as cell phones, video cameras, satellites and the like because they are able to realize thin dimensions, light weight and compact size. In addition, lithium ion batteries are also being actively developed for application to transport machinery exemplified by hybrid vehicles and electric vehicles. Lithium ion batteries are being required to demonstrate performance in terms of larger capacity and lower price while continuing to take advantage of their existing characteristics.

Metal enclosures have conventionally been used for the lithium ion battery exterior materials (to also be simply referred to as "exterior materials") that house components such as battery cells and electrolytic solution. However, multilayer laminated films are used as exterior materials because of their advantages of light weight, high heat resistance and degree of freedom when selecting battery shape. An example of the configuration of a multilayer laminated film consists of a base material (heat-resistant base material) layer, a first adhesive layer, an aluminum foil layer, a corrosion prevention treated layer, a second adhesive layer and a sealant (heat-fusible film) layer. A lithium ion battery is formed by forming an exterior material composed of a multilayer laminated film into the form of a pouch or deep-drawn formed product by subjecting to deep drawing by cold forming, and filling a battery cell composed of a positive electrode, separator and negative electrode along with an electrolytic solution inside followed by heat sealing. In particular, deep-drawn formed products are widely used since battery capacity increases the greater the draw depth.

The electrolytic solution of a lithium ion battery is composed of an aprotic solvent such as propylene carbonate, ethylene carbonate, dimethyl carbonate, diethyl carbonate or ethylmethyl carbonate and an electrolyte. Examples of salts serving as electrolytes include lithium salts such as $LiPF_6$ and $LiBF_4$. Since the aforementioned lithium salts generate hydrofluoric acid due to a hydrolysis reaction induced by water, they cause corrosion of the metal surface of the battery cell as well as a decrease in lamination strength between each layer of the multilayer laminated film. Consequently, an aluminum foil layer is provided on the multilayer laminated film of the exterior material to prevent moisture from entering the battery from outside the exterior material.

In addition, exterior materials composed of a multilayer laminated film are broadly classified into two types according to the type of adhesive layer that adheres to the aluminum foil layer and the sealant layer. In other words, these exterior materials are classified as having a dry laminated configuration that uses an adhesive for dry lamination, and a thermal laminated configuration that uses a thermoplastic material in the form of an adhesive resin in the manner of acid-modified polyolefin-based resin (Patent Document 1 (Japanese Unexamined Patent Application, First Publication No. 2001-202927)). Exterior materials having a dry laminated configuration are widely used in consumer applications such as portable devices requiring moldability and low price. The adhesives used in dry laminated configurations have binding sites such as ester groups or urethane groups that are not sufficiently resistant to hydrolysis (highly hydrolyzable). Consequently, exterior materials having a thermal laminated configuration are used in applications requiring higher reliability. Namely, exterior materials having a thermal laminated configuration are widely used in large-scale applications requiring higher levels of reliability, such as electric vehicles, satellites, submarines or power-assisted bicycles.

More specifically, in the large-scale secondary battery/capacitor market, which includes the automotive field, such as electric vehicles (EV) or hybrid electric vehicles (HEV), and the power storage field, such as lithium ion capacitors (LIC) having the properties of both secondary batteries and capacitors, battery performance is naturally required to have superior long-term stability (10 to 30 years). Consequently, exterior materials having a thermal laminated configuration are used in such applications.

Since lithium ion batteries used in the aforementioned automotive and power storage fields are required to have large electrical capacity in particular, it is necessary to increase draw depth of a multilayer laminated film in particular, and superior deep-drawing formability is required. A known example of an exterior material in which deep-drawing formability has been improved is an exterior material that uses a film base material having specific physical property values as the base material of the outer layer (see, for example, Patent Document 2 (Japanese Unexamined Patent Application, First Publication No. 2006-228653) and Patent Document 3 (Japanese Unexamined Patent Application, First Publication No. 2006-236938)). However, even if such an exterior material is used, in the case of increasing the draw depth of a deep-drawn formed product, insulation between the electrodes within the battery and the aluminum foil layer may be inadequate.

The following provides a detailed explanation based on an exterior material 110 exemplified in FIG. 3. The exterior material 110 is an exterior material obtained by laminating a base material layer, adhesive layer, aluminum foil layer, corrosion prevention treated layer, adhesive resin layer and sealant layer. For the sake of simplicity, only two layers are shown in FIG. 3 consisting of a first laminated portion 111 consisting of the base material layer, adhesive layer, aluminum foil layer and corrosion prevention treated layer, and a second laminated portion 112 consisting of the adhesive resin layer and sealant layer. Deep drawing of this exterior material 110 is carried out with the sealant layer facing to the inside to form a recess portion 113. At this time, the exterior material 110 is drawn and becomes thin at regions a in near the corners of the recess portion 113 in particular. Consequently, the thicknesses of the adhesive resin layer and sealant layer of the second laminated portion 112 become extremely thin, and insulation between the aluminum foil layer and electrodes within the battery in the first laminated portion 111 may be inadequate when the battery is formed.

In addition, since lithium ion batteries used in the aforementioned automotive and power storage fields are discharged at high current, electrodes and electrode tabs leading outside the battery in order to extract electrical power are extremely large. Consequently, in a lithium ion battery using a deep-drawn formed product formed by deep drawing the exterior material 110, the adhesive resin layer and sealant layer in near an electrode tab 120 are subjected to heat flow and easily become thin when adhering the adhered portion between the exterior material 110 and the electrode tab 120 around the periphery of the battery as shown in FIG. 4, thereby resulting in inadequate insulation between the electrode tab 120 and the aluminum foil layer within the exterior material 110.

On the other hand, at the periphery of the lithium ion battery where deep-drawn exterior materials are heat-sealed, moisture easily enters between the adhesive resin layer and sealant layer at seal end surfaces 114. Consequently, moisture resistance of the seal end surfaces 114 is required to be improved by reducing the thicknesses of the resin adhesive layer and sealant layer in order to prevent hydrolysis of lithium salt and improve long-term reliability. However, when the thicknesses of the resin adhesive layer and sealant layer are reduced in order to improve moisture resistance, electrical insulating properties decrease as previously described. Consequently, it is difficult to simultaneously realize moisture resistance of the seal end surfaces 114 and electrical insulating properties between the aluminum foil layer and the electrodes and electrode tabs of the exterior material.

In addition, another example of an exterior material is known that is obtained by laminating a base material layer, adhesive layer, aluminum foil layer, corrosion prevention treated layer and adhesive resin layer, or in other words, an exterior material in which a sealant layer is not provided on the surface of the aluminum foil layer provided with the adhesive resin layer. In this case, as shown in FIG. 5, in order to form a lithium ion battery by deep drawing an exterior material 110A that does not have a sealant layer and in which the innermost layer is an adhesive resin layer, adhesion between the exterior material 110A and the electrode tab 120 around the periphery of the battery is carried out using a film 130 that adheres to metal. However, even in the case of this type of exterior material that does not have a sealant layer, problems occur similar to those in the case of the aforementioned exterior material 110.

The following two types of packaging forms have been proposed for the form of sealing battery contents consisting of a positive electrode, separator, negative electrode, electrolytic solution and tab composed of a lead and tab sealant and the like for use as the form of a lithium ion battery using a (laminated type) exterior material employing a multilayer laminated film:

(i) pouch type packaging that uses an exterior material to form a pouch that houses the battery contents; and, (ii) embossed type packaging that subjects an exterior material to cold forming to form a recess portion that houses the battery contents therein.

In an embossed type packaging of packaging form, a form is also employed that increases battery capacity by increasing housing volume by forming recess portions in both sides of the laminated exterior material in order to more efficiently contain the battery contents. For example, as shown in FIG. 11, by housing a positive electrode, separator, negative electrode and electrolytic solution in recess portions 111a of two exterior materials 110a having the recess portions 111a formed by cold forming, and heat sealing so as to sandwich tabs 120a composed of a lead 121a and tab sealant 122a there between, the resulting lithium ion battery 101a is sealed by forming heat sealed portions 112a.

In the forms described in the aforementioned (i) and (ii), sealing is carried out by aligning the sealant layers of the exterior materials 110a and heat sealing the ends of the exterior materials 110a with the tabs 120a sandwiched there between as in the lithium ion battery 101a exemplified in FIG. 11. Heat sealing is controlled by the three conditions of temperature, pressure and time. In general, when heat sealing at a high temperature, although sealing time can be shortened, if the temperature is excessively high, problems such as resin deterioration are presumed to occur. If the pressure is excessively low, entanglement of the deposited resin decreases, interfacial separation occurs easily, and peel strength decreases. If the pressure is excessively high, the heat sealed portions 112a become thin and peel strength decreases. In addition, resin reservoirs are formed by resin that has been extruded from the heat sealed portions 112a, strain is generated around the heat sealed portions 112a, and there is increased susceptibility to the local application of a load at the portions where strain is generated, thereby causing a decrease in peel strength or resulting in increased susceptibility to separation at locations other than between the sealant layers. In addition, although heat sealing is a short period of time is advantageous in terms of operability and costs, when considering adequate sealing performance, heat sealing is required to be carried out for a minimum fixed period of time.

On the other hand, since electrolytes such as $LiPF_6$ typically used in the lithium ion battery 101a cause deterioration of battery characteristics resulting from the generation of hydrofluoric acid by hydrolysis, it is necessary to reduce moisture permeability from sealed ends 113a. The physical properties of the heat sealed portions 112a of the exterior materials 110a have a considerable effect on moisture permeability from the sealed ends 113a. If the film thickness of the heat sealed portions 112a of the exterior materials 110a is reduced, the amount of water permeating from the sealed ends 113a can be reduced. However, the physical properties of the sealed ends 112a of the exterior materials 110a also have a considerable effect on insulating properties between the leads 121a of the tabs 120a and the aluminum foil of the exterior materials 110a. In other words, if the film thickness of the heat sealed portions 112a is reduced, since the distance between the aluminum foil layer of the exterior materials 110a and the tabs 120a decreases, it becomes difficult to ensure insulating properties between the aluminum foil layer and the tabs 120a. In addition, due to the formation of resin reservoirs, there is also the risk of a decrease in peel strength due to the generation of strain at the interface between the sealant layers around the heat sealed portions 112a.

A known example of a method for reducing permeation of moisture consists of improving barrier properties by promoting molecular orientation in the sealant layers and the like by drawing. However, this drawing method causes problems such as decreased heat sealing performance or decreased formability.

In addition, Patent Document 4 (Japanese Unexamined Patent Application, First Publication No. H11-086808) indicates an exterior material that prevents corrosion of an aluminum foil layer by hydrofluoric acid by reducing moisture permeation from sealed ends in which a carboxylic acid metal salt or metal oxide, or an inorganic substance such as hydrotalcite or magnesium sulfate, is dispersed in an adhesive resin layer composed of a thermoplastic resin formed between the aluminum foil layer and a sealant layer. In this exterior material, effects are obtained such as absorption of moisture that has entered from the sealed ends and capturing of hydrofluoric acid by the dispersed substance.

However, although the exterior material of Patent Document 4 (Japanese Unexamined Patent Application, First Publication No. H11-086808) is expected to demonstrate temporary effects, it is difficult to sustain those effects over a long period of time, while also having disadvantages such as requiring storage in a dry environment. In addition, since the aforementioned substance is required to a dispersed in a fixed minimum amount in order to obtain adequate effects, it is difficult to make the thickness of the exterior material to be 100 µm or less. Moreover, there is also the risk of increased moisture permeation due to effects such as crystallization of the thermoplastic resin being inhibited by the dispersed substance.

Furthermore, a lithium ion battery is also referred to as a lithium secondary battery, the electrolyte thereof is composed of a solid polymer, gelled polymer or liquid, is a battery that generates electromotive force due to the migration of lithium ions, and includes that in which the positive electrode and negative electrode active materials are composed of high molecular weight polymers.

Lithium ion batteries enabling reduced thickness, light weight and compact size have recently become quite familiar as a result of having been actively marketed as batteries used in applications such as personal computers as well as cell phones and other portable terminal devices. In addition, there has recently been active development of applications to transport machinery exemplified by hybrid vehicles and electric vehicles, and these batteries are being required to demonstrate performance in terms of increased size, increased capacity and lower price while taking advantage of existing characteristics.

The electrolytic solution used in lithium ion batteries is composed of an electrolyte and an aprotic solvent such as propylene carbonate, ethylene carbonate, dimethyl carbonate, diethyl carbonate or ethylmethyl carbonate. In addition, salts such as $LiPF_6$ or $LiBF_4$ are used as lithium salts used for the electrolyte. However, since these lithium salts generate hydrofluoric acid due to a hydrolysis reaction with water, they caused corrosion of metal surfaces and decreases in lamination strength between each of the layers of multilayer films. Consequently, the entry of moisture has been blocked from the surface of multilayer laminated films by using aluminum foil for a portion of the multilayer film for the purpose of preventing entry of moisture.

This type of multilayer laminated film typically employs a configuration in which a sealant layer is laminated on a first surface (one surface) of an aluminum foil layer through an adhesive layer, and a base material layer is laminated on a second surface (other surface) through an adhesive layer. The adhesive layers are broadly classified into that having a dry laminated configuration composed of an adhesive resin layer for dry lamination, and that having a thermal laminated configuration composed of a thermoplastic material. Since adhesives of dry laminated products have highly hydrolyzable binding sites such as ester groups or urethane groups, a hydrolytic reaction induced by hydrofluoric acid occurs easily. Thus, thermal laminated configurations are used in applications requiring high reliability.

In addition, in the large-scale secondary battery/capacitor market, such as the automobile industry, in which development is proceeding on automobiles using only secondary batteries or those combining the use of gasoline and secondary batteries in the manner of electric vehicles (EV) or hybrid electric vehicles (HEV), or the power storage industry, in which development is proceeding on electrical double-layer capacitors (ELDC) for storing electrical power manufactured in solar cells or wind power generators or lithium ion capacitors (LIC) having the properties of both secondary batteries and capacitors, thermal laminated configurations are used that are capable of ensuring high reliability as previously described for applications in which battery performance is naturally required to have greater safety and long-term stability (10 to 30 years).

Multilayer laminated films are required to have greater deep-drawing formability in response to needs for increased electrical capacity for use in lithium batteries used in such automotive or power storage applications. Moreover, since automotive applications are presumed to involve use in high-temperature climates, lithium batteries are also required to have heat resistance even when used in regions subjected to considerably high temperatures in consideration of installing the batteries around an engine.

In consideration of this background, draw depth is one of the factors that affect performance in multilayer laminated films. As described above, draw depth is extremely important in terms of electrical capacity in lithium battery exterior materials. Conversely, deep-drawn formed products are such that thickness decreases from the original wall thickness at a formed corner D as shown in FIG. 13. In this case, this means that the inner sealant layer is subjected to strain due to drawing at the formed corner D, resulting in the occurrence of whitening, a phenomenon by which the sealant layer becomes white and turbid along the formed site. This phenomenon involves the formation of microcracks at the interface between crystalline portions and amorphous portions due to the effects of crystallization of the maleic anhydride-modified polyolefin resin used for the sealant layer and adhesive resin, and the effects of strain caused by deep drawing, thereby causing the sealant layer to appear white due to scattering of light, and is referred to as void crazing. This whitening phenomenon is also one of the factors causing concern regarding insulating properties with aluminum foil.

In particular, there are many cases in which an acid-modified polyolefin-based resin, which has been graft-modified with maleic anhydride, is used as a film layer that contacts aluminum foil typically used in thermal laminated configurations, on the inside of a multilayer laminated film in thermal laminated configurations. Since acid-modified polyolefin-based resins that have been graft-modified with maleic anhydride alleviate stress generated in the case separation has occurred at the interface between aluminum foil and the polyolefin-based resin graft-modified by maleic anhydride in addition to chemical adhesion using functional groups of maleic anhydride with respect to adhesion with metal foil in particular, physical adhesion is improved by incorporating an immiscible elastomer.

An island-sea structure is formed in which an immiscible elastomer is dispersed in the polyolefin graft-modified by maleic anhydride on the micrometer order, and since well-defined interfaces are formed (FIGS. 14A and 14B), microcracks form at these interfaces leading to a whitening phenomenon due to strain generated during deep drawing in particular.

Another factor is improvement of the above-mentioned heat resistance. Heat resistance as referred to here refers to heat seal strength in a multilayer laminated film. In general, in the case of lithium batteries, electrolytic solution deteriorates due to repeated charge and discharge cycling or high temperature and humidity in the work environment, thus resulting in the generation of pyrolytic gas components. At this time, the generation of this gas is accompanied by an increase in internal pressure, thus requiring heat sealed portions of the multilayer laminated film to have adequate heat seal strength (seal strength). However, the exterior material for a lithium ion battery of the multilayer laminated film type is characterized by having a gas escape mechanism by which, in the case internal pressure has increased due to the generation of gas accompanying deterioration of electrolytic solution in a high-temperature environment, the lamination strength of the lithium ion battery exterior material that has been stored in a high-temperature environment decreases and gas generated accompanying an increase in internal pressure is allowed to escape by utilizing this decrease in lamination strength. Thus, although a decrease in lamination strength in a high-temperature environment cannot always be said to be an area of concern, differing from ordinary consumer applications, since it is necessary for the battery to operate in a considerably harsh environment when placed in the environment associated with the aforementioned automotive applications, heat resistance to a greater degree than that of consumer applications is thought to be preferable.

Numerous publications of the prior art, including those defining the physical properties of the outer layer film base material and those using a thermal laminated configuration in order to improve deep-drawing formability, have been disclosed that describe exterior materials for lithium ion batteries. However, these publications are not recognized to contain details describing improvements with respect to the improvement of the aforementioned whitening phenomenon that occurs during forming or improvement of heat resistance.

On the basis of the above, it is necessary to inhibit a whitening phenomenon during cold forming for applications requiring long-term reliability such as automotive applications and power storage applications which are likely to proliferate in the future.

Lithium ion secondary batteries (to also be simply referred to as "lithium batteries") enabling reduced thickness and compact size while generating high levels of energy are being actively developed for use as secondary batteries for consumer applications used in cell phones and other portable terminal devices, video cameras and the like. Deep-drawn formed products obtained by cold forming (deep drawing) of a laminated film having a multilayer configuration are used as lithium ion battery exterior materials used in lithium batteries. An example of the configuration of a laminated film having a multilayer configuration consists of a heat-resistant base material layer, aluminum foil layer and sealant (heat-fusible film) layer. In addition, since exterior materials that use such a laminated film not only offer a high degree of freedom with respect to battery shape, but also are lightweight, have high heat dissipation and are inexpensive, they have been attempted to applied to batteries of environmentally-friendly hybrid vehicles and electric vehicles that have demonstrated remarkable growth in recent years.

Lithium batteries using a laminated film type of exterior material are formed by housing battery body components, consisting of a positive electrode material, negative electrode material and separator along with an electrolytic solution obtained by dissolving a lithium salt in an aprotic solvent (such as propylene carbonate, ethylene carbonate, dimethyl carbonate, diethyl carbonate or ethylmethyl carbonate) or an electrolyte layer composed of a polymer gel impregnated with this electrolytic solution, in the aforementioned deep-drawn formed product, followed by heat sealing with a heat seal.

The aforementioned electrolytic solution is highly permeable with respect to the sealant layer. Consequently, electrolytic solution that has penetrated into the sealant layer may decrease lamination strength between the aluminum foil layer and sealant layer and ultimately cause leakage of the electrolytic solution. In addition, since electrolytes in the form of lithium salts such as $LiPF_6$ or $LiBF_4$ generate hydrofluoric acid due to a hydrolytic reaction, they cause corrosion of metal surfaces and decreases in lamination strength between each layer of the laminated film. Therefore, Patent Documents 5 to 7 (Patent Document 5: Japanese Unexamined Patent Application, First Publication No. 2001-243928, Patent Document 6: Japanese Unexamined Patent Application, First Publication No. 2004-42477, Patent Document 7: Japanese Unexamined Patent Application, First Publication No. 2004-142302), for example, disclose exterior materials that are resistant to electrolytic solution and hydrofluoric acid and are resistant to the occurrence of delamination.

In addition, in exterior materials fabricated by dry lamination, the urethane-based adhesive used may be swollen by electrolytic solution thereby causing delamination. Patent Document 8 (Japanese Unexamined Patent Application, First Publication No. 2002-187233) indicates that an exterior material can be fabricated that inhibits delamination by using a dry lamination method that uses a urethane-based adhesive that is resistant to electrolytic solution. However, exterior materials fabricated by thermal lamination are used for large-scale applications requiring high reliability in particular.

Since lithium batteries used in large-scale applications are required to have superior reliability and long-term stability in particular, the level of performance required of exterior materials used in these lithium batteries is also high. Conventionally, since hydrofluoric acid is generated by hydrolysis of electrolyte in the form of a lithium salt, evaluations using water were hardly carried out at all to evaluate exterior materials. However, in the case of lithium batteries for large-scale applications, the environment in which they are used is harsher in comparison with consumer applications. Consequently, it has become necessary to examine evaluations premised on the occurrence of delamination caused by corrosion of aluminum foil due to an increase in the amount of hydrofluoric acid generated accompanying excessive moisture absorption. From this viewpoint, there are a growing number of cases in which water resistance and hydrofluoric acid resistance are being used to evaluate exterior materials. When evaluating an exterior material using an electrolytic solution, normally a sample of the exterior material in the shape of a strip (such as a strip consisting of a heat-resistant base material, aluminum foil layer and heat-fusible film layer) is immersed in electrolytic solution at 85° C. followed by confirming the presence or absence of delamination. Moreover, a method consisting of rinsing the sample with water after immersing in electrolytic solution and then immersing in water has also been proposed in order to also evaluate handling and water resistance. Moreover, an accelerated test has also come to be carried out in which a sample is immersed in electrolytic solution at 85° C. into which water equivalent to several ppm has been dropped in advance in order to evaluate under conditions of excessive generation of hydrofluoric acid.

A method consisting of chemical conversion treatment of aluminum foil is known to be the most effective method for imparting resistance (electrolyte resistance, water resistance and hydrofluoric acid resistance). An example of chemical conversion treatment is chromate treatment. Patent Document 9 (Japanese Unexamined Patent Application, First Publication No. 2002-144479), for example, discloses numerous types of chromate treatment, such as coating chromate treatment or chromate treatment by immersion. Chemical conversion treatment as exemplified by chromate treatment is being examined regardless of whether applying to consumer applications or large-scale applications. In recent years, methods have been examined for carrying out corrosion prevention treatment on an aluminum foil layer without using chromium compounds in consideration of the effects of chromium compounds on the environment. For example, Patent Document 10 (Japanese Unexamined Patent Application, First Publication No. 2007-280923) indicates an exterior material that imparts electrolyte resistance, hydrofluoric acid resistance and water resistance without using a chromium compound.

On the other hand, exterior materials are also required to have superior formability. In other words, since energy density is determined by the extent to which cells and electrolytic solution can be contained within a lithium battery, in order to further increase the capacity thereof, the draw depth is required to be further increased when forming the exterior material into the shape of a battery.

Although forming of the exterior material is typically carried out by drawing with a metal mold, if the forming depth at this time is too deep, cracks and pinholes may form in those portions of the lithium battery exterior material that are drawn by forming, thereby resulting in a loss of reliability of the battery. Consequently, it is important to increase forming depth without impairing reliability.

In large-scale applications such as electric vehicles in particular, although there is a desire to extract a large amount of current in terms of battery performance, since it is also desired to further increase energy density, both superior reliability and long-term storage stability are required simultaneously.

Although exterior materials employing a thermal laminated configuration are able to impart adequate electrolyte resistance even in large-scale applications, it is difficult to obtain adequate formability with respect to cold forming. Consequently, at drawn portions such as formed lateral surfaces and corners in particular, microcracks easily form in the sealant layer of the exterior material due strain generated during cold forming, thereby resulting in increased susceptibility to whitening. In the worst possible case, these microcracks end up joining causing the sealant layer per se to rupture, while further resulting in the risk of additional rupturing of the aluminum foil layer and heat-resistant base material layer. Thus, the occurrence of a whitening phenomenon in an exterior material due to cold forming is considered to be a preliminary warning of potential rupture of the exterior material per se. Consequently, it is obviously important to be able to inhibit a whitening phenomenon to prevent rupture of the exterior material during cold forming even if forming depth is increased.

SUMMARY OF THE INVENTION

A first object of the present invention is to provide a lithium ion battery exterior material that has an adhesive resin layer having high withstand voltage and is capable of realizing both superior moisture resistance and electrical insulating properties.

A second object of the present invention is to provide a lithium ion battery exterior material that is able to inhibit interface strain around heat sealed portions caused by resin flow during heat sealing, allow the obtaining of adequate peel strength, and stably reduce penetration of moisture through seal end surfaces over a long period of time.

A third object of the present invention is to provide a lithium ion battery exterior material having superior inhibiting whitening during forming and heat sealing resistance.

A fourth object of the present invention is to provide a lithium ion battery exterior material having superior resistance such as electrolyte resistance, and superior moldability capable of inhibiting the occurrence of a whitening phenomenon during cold forming.

The present invention employs the following configurations to solve the aforementioned problems.

(1) A lithium ion battery exterior material, includes a base material layer, and an adhesive layer, an aluminum foil layer provided with a corrosion prevention treated layer, and an adhesive resin layer, the adhesive layer, the aluminum foil layer, and the adhesive resin layer being sequentially laminated on one surface of the base material layer, the adhesive resin layer contains an acid-modified polyolefin resin and a miscible elastomer dispersed in the acid-modified polyolefin at a dispersed phase size of 1 nm to less than 1 μm.

(2) In (1) above, the adhesive resin layer may also contain an immiscible elastomer dispersed in the acid-modified polyolefin resin at a dispersed phase size of 1 μm to less than 1000 μm.

(3) In (1) or (2) above, the content of the miscible elastomer may be 1% by weight to 50% by weight based on 100% by weight of the adhesive resin layer.

(4) In (1) to (3) above, the absolute value of birefringence following a heat treatment of a thermoplastic resin layer may be 0.002 or less and the degree of crystallization may be 60% or less composed of the adhesive resin layer and a sealant layer provided on the opposite surface of the adhesive resin layer from the base material layer.

(5) In (1) to (4) above, a withstand voltage of the adhesive resin layer as measured according to the "Testing Methods for Electric Strength of Solid Insulating Materials" defined in JIS-C2110 may be 0.04 kV/μm or more.

(6) In (1) to (5) above, the laminated portion of the adhesive resin layer and a sealant layer provided on the opposite surface from the adhesive resin layer satisfies the following conditions (1) and (2):
  (1) a heat of fusion ΔH as measured by differential scanning calorimetry is 15 J/g to 80 J/g and a melting temperature Tm is 130° C. to 170° C.; and,
  (2) a melt viscosity η at a shear velocity of $1 \times 10^{-2}$/second and temperature 30° C. higher than the melting temperature Tm of the laminated portion of a sealant layer and the adhesive resin layer is 1000 Pa·s to 7000 Pa·s.

(7) In (1) to (6) above, a luminosity difference ΔL* of an aluminum laminate obtained by sequentially laminating the base material layer, the adhesive layer, the aluminum foil layer and the adhesive resin layer before and after drawing the adhesive resin layer surface of the aluminum laminate may be 25 or less when a test piece of the aluminum laminate having a width of 15 mm is drawn by 150%, and when the luminosity before drawing is defined as L*1 and the luminosity after drawing is defined as L*2, the luminosity difference ΔL* may be L*2−L*1.

(8) In (1) to (7) above, the acid-modified polyolefin resin may be a resin that has been graft-modified with one or more compounds of unsaturated carboxylic acid derivative components selected from the group consisting of unsaturated carboxylic acids, acid anhydrides of unsaturated carboxylic acids and esters of unsaturated carboxylic acids.

(9) In (1) to (8) above, the miscible elastomer may be one or more compounds selected from the group consisting of styrene-based thermoplastic elastomers, hydrogenated styrene-based thermoplastic elastomers and propylene-α-olefin copolymer elastomers, and may be dispersed at a dispersed phase size of 1 nm to 200 nm.

(10) In (1) to (9) above, a sealant layer provided on an opposite surface from the adhesive resin layer may be composed of a polyolefin-based resin, and the polyolefin-based resin and the acid-modified polyolefin-based resin may contain at least one or more compounds selected from the group consisting of random polypropylene, homopolypropylene and block polypropylene.

(11) In (1) to (10) above, the acid-modified polyolefin-based resin may be a maleic anhydride-modified polyolefin-based resin.

(12) In (1) to (11) above, at least one of a styrene-based elastomer and an olefin-based elastomer may be dispersed at a nanometer size in the adhesive resin layer.

(13) In (1) to (12) above, the base material layer may have at least one of a biaxially oriented polyester film and a biaxially oriented polyamide film.

(14) In (1) to (13) above, the base material layer may have a protective layer on an opposite surface from the surface on which the aluminum foil layer is laminated.

(15) In (1) to (14) above, a molding improvement layer may be provided between the base material layer and the aluminum foil layer.

(16) In (7) to (15) above, when the surface of the adhesive resin layer of the aluminum laminate is taken to be the inner layer, heat seal strength when corresponding lateral surfaces of the inner layer are heat-sealed may be 30 N/15 mm or more in an atmosphere at 100° C.

(17) In (1) to (16), the corrosion prevention treated layer may be provided on the surface of the aluminum foil layer that contacts the adhesive resin layer.

(18) In (1) to (17), the miscible elastomer may be a polyolefin-based elastomer composed of a crystalline polyolefin segment and an amorphous polyolefin segment and having a microphase-separated structure, and a content of the polyolefin-based elastomer may be 5% by weight to 50% by weight.

(19) In (1) to (17) above, the miscible elastomer may be a styrene-based elastomer or a hydrogenated styrene-based elastomer, and a content of the styrene-based elastomer or the hydrogenated styrene-based elastomer may be 5% by weight to 30% by weight.

(20) In (1) to (18) above, the acid-modified polyolefin resin may be acid-modified polypropylene, and the miscible elastomer may be a propylene-based elastomer.

(21) In (1) to (20) above, the acid-modified polyolefin resin may be acid-modified polypropylene, a hydrogenation product of a block copolymer composed of styrene and butadiene, or a hydrogenation product of a block copolymer composed of styrene and isoprene.

(22) In (1) to (21) above, an immiscible polyolefin-based elastomer component having a dispersed phase size of 1 μm to 50 μm may be incorporated in the acid-modified polyolefin resin.

(23) In (1) to (22) above, a polymer x having a functional group capable of reacting with a graft-modified unsaturated carboxylic acid derivative component may be contained in the acid-modified polyolefin resin in the corrosion prevented treated layer.

(24) In (23) above, the polymer x may be a cationic polymer.

(25) In (24) above, the cationic polymer may be one or more compounds selected from the group consisting of polyethyleneimine, an ion-polymer complex composed of polyethyleneimine and a polymer having carboxylic acid, a primary amine-grafted acrylic resin obtained by grafting a primary amine to an acrylic main backbone, a polyallylamine or derivative thereof, and aminophenol.

The lithium ion battery exterior material according to one aspect of the present invention has an adhesive resin layer having high withstand voltage, and is able to realize both superior moisture resistance and electrical insulating properties.

The lithium ion battery exterior material according to one aspect of the present invention is able to inhibit interface strain around heat sealed portions caused by resin flow during heat sealing, allow the obtaining of adequate peel strength, and stably reduce penetration of moisture through seal end surfaces over a long period of time.

According to one aspect of the present invention, in a lithium ion battery exterior material obtained by sequentially laminating at least an outermost layer in the form of a base material film layer, an adhesive layer, an aluminum layer and an adhesive resin layer in that order, by adding a hydrogenated styrene-based thermoplastic elastomer and/or polyolefin-based elastomer to the adhesive resin layer, a lithium ion battery exterior material can be provided that has superior resistance to a whitening phenomenon during deep drawing.

The lithium ion battery exterior material according to one aspect of the present invention has superior resistance such as electrolyte resistance, and superior moldability capable of inhibiting the occurrence of a whitening phenomenon during cold forming.

DETAILED DESCRIPTION OF THE INVENTION

First Embodiment

Figure 1:
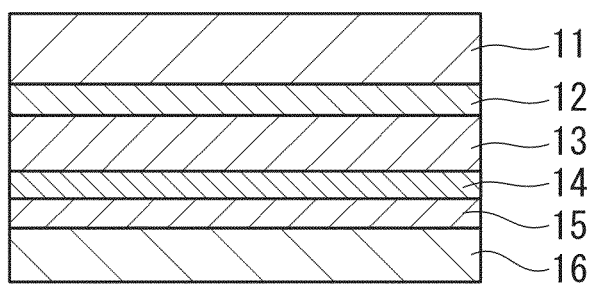
FIG. 1 is a cross-sectional view showing an example of an exterior material according to a first embodiment of the present invention.
Figure 2:
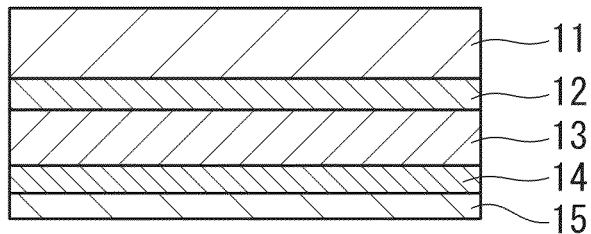
FIG. 2 is a cross-sectional view showing another example of the exterior material according to a first embodiment of the present invention.

The following provides a detailed explanation of a first embodiment of the exterior material of the present invention. FIG. 1 is a cross-sectional view showing an exterior material 1 that is an example of an exterior material according to a first embodiment of the present invention. FIG. 2 is a cross-sectional view showing an exterior material 2 that shows another example of an exterior material according to the first embodiment of the present invention.

As shown in FIG. 1, the exterior material 1 comprises sequentially laminating an adhesive layer 12, an aluminum foil layer 13, a corrosion prevention treated layer 14, an adhesive resin layer 14 and a sealant layer 16 on a first surface (one surface) of a base material layer 11. The exterior material 2 is the same as the exterior material 1 with the exception of not being provided with the sealant layer 16. Namely, the exterior material 2 is comprised by sequentially laminating the adhesive layer 12, the aluminum foil layer 13, the corrosion prevention treated layer 14 and the adhesive resin layer 15 on a first surface (one surface) of the base material layer 11.

[Adhesive Resin Layer]

The adhesive resin layer in the exterior materials 1 and 2 contains an acid-modified polyolefin resin and a miscible elastomer dispersed in the acid-modified polyolefin resin at a dispersed phase size of 1 nm to less than 1 μm.

The aforementioned acid-modified polyolefin resin is a resin in which a polyolefin resin has been graft-modified by any of an unsaturated carboxylic acid, unsaturated carboxylic acid anhydride or unsaturated carboxylic acid ester component (and these may be collectively referred to as an "unsaturated carboxylic acid derivative component"). The acid-modified polyolefin resin demonstrates adhesion by utilizing the reactivity of a graft-polymerized unsaturated carboxylic acid derivative component with a polymer having various types of metals or various types of functional groups.

Examples of polyolefin resins include low density polyethylene, medium density polyethylene, high density polyethylene, ethylene-α-olefin copolymers, homo-, block- or random polypropylenes, and propylene-α-olefin copolymers.

Examples of unsaturated carboxylic acids include acrylic acid, methacrylic acid, maleic acid, fumaric acid, itaconic acid, citraconic acid, tetrahydrophthalic acid and bicyclo [2.2.1]hept-2-ene-5,6-dicarboxylic acid.

Examples of unsaturated carboxylic acid anhydrides include maleic anhydride, itaconic anhydride, citraconic anhydride, tetrahydrophthalic anhydride and bicyclo[2.2.1] hept-2-ene-5,6-dicarboxylic acid anhydride.

Examples of unsaturated carboxylic acid esters include methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalate and dimethyl bicyclo[2.2.1] hept-2-ene-5,6-dicarboxlyate.

The aforementioned acid-modified polyolefin resin is obtained by graft polymerizing (graft modifying) the aforementioned unsaturated carboxylic acid derivative component with the aforementioned polyolefin resin in the presence of a radical initiator.

The ratio of the unsaturated carboxylic acid derivative component subjected to graft polymerization is preferably 0.2 parts by weight to 100 parts by weight based on 100 parts by weight of the polyolefin resin.

The reaction temperature is preferably 50° C. to 250° C. and more preferably 60° C. to 200° C.

The reaction time can be suitably set according to the production method, and in the case of a molten graft reaction using a twin-screw extruder, for example, the reaction time is equal to or less than the residence time in the extruder, and more specifically, is preferably 2 minutes to 30 minutes and more preferably 5 minutes to 10 minutes.

Furthermore, graft modification can be carried out under conditions of either normal pressure or under pressurization.

Examples of the radical initiator used in graft modification include organic peroxides. Examples of organic peroxides include alkyl peroxides, aryl peroxides, acyl peroxides, ketone peroxides, peroxyketals, peroxycarbonates, peroxyesters and hydroperoxides. These organic peroxides can be suitably selected corresponding to the reaction temperature and reaction time. For example, in the case of a molten graft reaction using a twin-screw extruder, an alkyl peroxide, peroxyketal or peroxyester is preferable, and di-t-butyl peroxide, 2,5-dimethyl-2,5-di-t-butylperoxide-3-benzene or dicumyl peroxide is more preferable.

A resin obtained by subjecting a polyolefin resin to graft modification by maleic anhydride is preferable for the acid-modified polyolefin resin. Examples of such resins include Admer (trade name) manufactured by Mitsui Chemicals Inc., Modic (trade name) manufactured by Mitsubishi Chemical Corp., and Adtex (trade name) manufactured by Nippon Polyethylene Corp.

The aforementioned miscible elastomer has a microphase-separated structure.

A microphase-separated structure refers to (1) a structure in which the maximum diameter (d1) when the dispersed phase in the miscible elastomer (either a flexible component or constrained component) is approximated to be oval is 1 nm to 200 nm, (2) a structure in the form of a rod in which the ratio (d1/d2) of the maximum diameter (d1) of the dispersed phase domain (flexible component or constrained component) to the maximum value (d2) of the diameter perpendicular to the maximum diameter is 20 or more and the aforementioned maximum value (d2) is 1 nm to 200 nm, or (3) a layered lamellar structure in which it is not possible to determine whether the dispersed phase is a flexible component or constrained component, and the thickness of at least one layer is 1 nm to 200 nm.

The presence of a microphase-separated structure in the miscible elastomer is confirmed in the manner described below.

The miscible elastomer is formed into a pressed sheet, cut into a 0.5 mm-square chip, and then stained with ruthenium oxide ($RuO_4$). An ultrathin section having a film thickness of about 100 nm is then prepared from the stained sample using an ultra-microtome (such as Reichert S or Reichert TSC) equipped with a diamond knife. Next, carbon is vapor-deposited on this ultrathin section followed by observation with a transmission electron microscope. At least five locations are randomly selected for the observed locations, and observations are made at magnifications of 10,000×, 50,000× and 150,000×. At that time, in the case of approximating as an oval as described in (1) above, by selecting Axis-major using the Image-Pro Plus within a field observed at a magnification of 10,000× to 150,000× with a transmission electron microscope, the dispersed phase (flexible component or constrained component) can be approximated to an oval of the same area and having an equal primary and secondary moment, and the long axis thereof is taken to be the maximum diameter (d1).

If the aforementioned miscible elastomer is present in the aforementioned acid-modified polyolefin resin, it is dispersed at a dispersed phase size of 1 nm to less than 1 µm. The dispersed phase size of the aforementioned miscible elastomer is preferably 1 nm to 200 nm from the viewpoint of electrical insulating properties.

Furthermore, the dispersed phase size of the elastomer in the acid-modified polyolefin resin in embodiments of the present invention in the case the dispersed phase is considered to be circular is the diameter of that circle, the maximum diameter in the case of approximating to be an oval, the maximum diameter of the long axis of the aspect ratio in the case of a rod, or the thickness of a layer thereof in the case of having a layered lamellar structure.

The dispersed phase size of the miscible elastomer in the acid-modified polyolefin resin, a microphase-separated structure in the aforementioned miscible elastomer, for example, can be confirmed by a method consisting of forming a pressed sheet of a mixture of the acid-modified polyolefin resin and the miscible elastomer instead of forming a pressed sheet of the miscible elastomer.

Preferable examples of the aforementioned miscible elastomer include styrene-based thermoplastic elastomers, hydrogenated styrene-based thermoplastic elastomers and propylene-α-olefin copolymer elastomers, and from the viewpoint of electrical insulating properties, propylene-α-olefin copolymer elastomers and hydrogenated styrene-based thermoplastic elastomers are more preferable. One type of the aforementioned miscible elastomer may be used alone or two or more types may be used in combination.

Examples of styrene-based thermoplastic elastomers include AB type or ABA type block copolymers having a structural unit derived from styrene and a structural unit derived from one or more types of compounds selected from the group consisting of α-olefins such as ethylene, propylene or butylene. Specific examples include styrene-ethylene•butylene-styrene copolymers and styrene-ethylene•propylene-styrene copolymers.

Examples of hydrogenated styrene-based thermoplastic elastomers include elastomers obtained by reducing the aforementioned styrene-based thermoplastic elastomer by hydrogenation.

The content of structural units to which hydrogen derived from styrene has not been added in the hydrogenated styrene-based thermoplastic elastomer is preferably 1% by weight to 20% by weight and more preferably 5% by weight to 15% by weight. If the aforementioned content is 1% by weight or more, resistance to electrolyte improves. If the aforementioned content is 20% by weight or less, miscibility with the acid-modified polyolefin resin improves thereby facilitating the formation of a microphase-separated structure.

Examples of commercially available products of hydrogenated styrene-based thermoplastic elastomers include Taftec (trade name) manufactured by Asahi Kasei Chemicals Corp., Septon/Hybrar (trade name) manufactured by Kuraray Co., Ltd., Dynalon (trade name) manufactured by JSR Corp., Espolex (trade name) manufactured by Sumitomo Chemical Co., Ltd., and Kraton G (trade name) manufactured by Kraton Polymers llc.

The propylene-α-olefin copolymer elastomer preferably has a structural unit derived from propylene and a structural unit derived from one or more types of compounds selected from the group consisting of α-olefins having 2 to 200 carbon atoms (excluding propylene), and the ratio of the structural unit derived from propylene is preferably 51 mol % or more.

Examples of commercially available products of propylene-α-olefin copolymer elastomers include Notio (trade name) manufactured by Mitsui Chemicals Inc., Tafthren (trade name) manufactured by Sumitomo Chemical Co., Ltd., and Dynalon (trade name) manufactured by JSR Corp.

The aforementioned miscible elastomer is not limited to the aforementioned styrene-based thermoplastic elastomers, hydrogenated styrene-based thermoplastic elastomers and propylene-α-olefin copolymer elastomers provided it is an elastomer that is dispersed at a dispersed phase size of 1 nm to less than 1 µm and is able to form a microphase-separated structure. For example, an elastomer other than the aforementioned propylene-α-olefin copolymer elastomer may be used as described in Japanese Unexamined Patent Application, First Publication No. 2003-321582.

In the adhesive resin layer 15, the aforementioned miscible elastomer is preferably composed of one or more types of compounds selected from the group consisting of styrene-based thermoplastic elastomers, hydrogenated styrene-based thermoplastic elastomers and propylene-α-olefin copolymer elastomers, and this miscible elastomer is preferably dispersed at a dispersed phase size of 1 nm to 200 nm.

The adhesive resin layer may also contain an immiscible elastomer having a microphase-separated structure that is dispersed in the aforementioned acid-modified polyolefin resin at a dispersed phase size of 1 µm to less than 1 mm, in addition to the aforementioned miscible elastomer. As a result, residual stress generated during lamination of the adhesive resin is released and viscoelastic adhesion improves.

A microphase-separated structure refers to a structure in which the dispersed phase in the elastomer (flexible component or constrained component) forms a sea-island structure that is larger than the aforementioned microphase-separated structure.

A polyolefin-based thermoplastic elastomer obtained by copolymerizing at least one of ethylene and propylene with one or more types of α-olefins selected from the group consisting of 1-butene, 1-pentene, 1-hexene, 1-octene and 4-methyl-1-pentene is preferable for the immiscible elastomer.

Examples of commercially available products of immiscible elastomers include Tafmer (trade name) manufactured by Mitsui Chemicals Inc., Zelas (trade name) manufactured by Mitsubishi Chemical Corp., and Catalloy (trade name) manufactured by Montell Co.

The dispersed phase size of the immiscible elastomer in the acid-modified polyolefin resin is preferably 1 µm to 50 µm, and more preferably 1 µm to 10 µm. If the dispersed phase size of the immiscible elastomer is 1 µm or more, viscoelastic adhesion improves. If the dispersed phase size of the immiscible elastomer is 50 µm or less, lamination suitability (processability) of the adhesive resin improves and physical strength of the adhesive resin layer 15 formed improves.

The microphase-separated structure in the immiscible elastomer and the dispersed phase size of the immiscible elastomer in the acid-modified polyolefin resin can be confirmed in the same manner as the case of the miscible elastomer as previously described.

The content of the aforementioned acid-modified polyolefin resin in the adhesive resin layer 15 (100% by weight) is preferably 1% by weight to 50% by weight and more preferably 10% by weight to 30% by weight. If the content of the acid-modified polyolefin resin is 1% by weight or more, dielectric breakdown strength improves. If the content of the acid-modified polyolefin resin is less than 1% by weight, it becomes difficult to obtain the effects thereof. If the content of the acid-modified polyolefin resin is 50% by weight or less, adhesion improves.

The content of the aforementioned miscible elastomer in the adhesive resin layer 15 (100% by weight) is preferably 5% by weight to 50% by weight and more preferably 10% by weight to 30% by weight. If the content of the miscible elastomer is 5% by weight or more, dielectric breakdown strength improves. In addition, effects do not change that much even if the content of the miscible elastomer exceeds 50% by weight. Consequently, a ratio of the miscible elastomer of 50% by weight or less is economically advantageous.

The content of the aforementioned immiscible elastomer in the adhesive resin layer 15 (100% by weight) is preferably 1% by weight to 50% by weight and more preferably 5% by weight to 30% by weight. If the content of the immiscible elastomer is 1% by weight or more, adhesion improves. If the content of the immiscible elastomer is less than 1% by weight, it becomes difficult to obtain the effects thereof. If the content of the immiscible elastomer is 50% by weight or less, adequate adhesion is easily obtained.

In addition, various types of additives may also be added to the adhesive resin layer 15, such as a flame retardant, slipping agent, anti-blocking agent, antioxidant, photostabilizer or pressure-sensitive adhesion promoter.

The withstand voltage of the adhesive resin layer 15 is preferably 0.04 kV/μm or more, more preferably 0.05 kV/μm or more and even more preferably 0.1 kV/μm or more.

Furthermore, the aforementioned withstand voltage is the withstand voltage measured according to the "Testing Methods for Electric Strength of Solid Insulating Materials" defined in JIS-C2110 (1-minute withstand voltage).

The thickness of the adhesive resin layer 15 is preferably 5 μm to 30 μm and more preferably 10 μm to 20 μm. If the thickness of the adhesive resin layer 15 is 5 μm or more, electrical insulating properties improve. If the thickness of the adhesive resin layer 15 is 30 μm or less, moisture resistance of the sealed ends of the exterior material when forming a battery improves.

[Base Material Layer]

The base material layer 11 fulfills the role of imparting heat resistance in the sealing step during production of a lithium ion battery and inhibiting the formation of pinholes that can occur during processing and distribution.

A resin layer having insulating properties is preferable for the base material layer 11. Examples of this resin layer include a layer composed of a drawn or non-drawn film such as a polyester film, polyamide film or polypropylene film. In particular, the resin layer is preferably a layer composed of a drawn polyamide film or drawn polyester film from the viewpoint of improving formability, heat resistance, pinhole resistance and insulating properties.

The base material layer 11 may consist of a single layer or a plurality of layers.

The thickness of the base material layer 11 is preferably 6 μm to 40 μm and more preferably 10 μm to 25 μm. If the thickness of the base material layer 11 is 6 μm or more, pinhole resistance and insulating properties improve. If the thickness of the base material layer 11 is 40 μm or less, formability improves. The aforementioned thickness refers to total thickness in the case the base material layer 11 is a multilayered film.

[Adhesive Layer]

The adhesive layer 12 is a layer that adheres the base material layer 11 and the aluminum foil layer 13.

A polyurethane-based adhesive obtained by allowing an isocyanate compound having two or more functional groups to act on a primary agent such as a polyester polyol, polyether polyol, acrylic polyol or carbonate polyol is preferable for the adhesive that composes the adhesive layer 12.

An example of a polyester polyol is that obtained by polymerization of a dibasic acid and a diol compound.

Examples of the aforementioned dibasic acid include aliphatic dibasic acids such as succinic acid, glutaric acid, adipic acid, pimelic acid, suberic acid, azelaic acid, sebacic acid or brazilic acid, and aromatic dibasic acids such as isophthalic acid, terephthalic acid or naphthalene dicarboxylic acid. One type of these dibasic acids may be used alone or two or more types may be used in combination.

Examples of the aforementioned diol compound include aliphatic diols such as ethylene glycol, propylene glycol, butanediol, neopentyl glycol, methyl pentanediol, hexanediol, heptanediol, octanediol, nonanediol, decanediol or dodecanediol, alicyclic diols such as cyclohexanediol or hydrogenated xylylene glycol, and aromatic diols such as xylylene glycol. One of these diol compounds may be used alone or two or more types may be used in combination.

In addition, polyester urethane polyols, in which hydroxyl groups on both ends of the aforementioned polyester polyol have undergone chain elongation by a polyisocyanate compound, may be used for the polyester polyol.

Examples of the aforementioned polyisocyanate compounds include 2,4-tolylene diisocyanate, 2,6-tolylene diisocyanate, xylylene diisocyanate, 4,4'-diphenylmethane diisocyanate, methylene diisocyanate, isopropylene diisocyanate, lysine diisocyanate, 2,2,4-trimethylhexamethylene diisocyanate, 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate and isopropylidene dicyclohexyl-4,4'-diisocyanate.

In addition, these isocyanate compounds may be used alone, or an adduct, biuret or isocyanurate form composed of these isocyanate compounds may also be used.

One type of these polyisocyanate compounds may be used alone or two or more types may be used in combination.

Examples of polyether polyols include ether-based polyols such as polyethylene glycol or polypropylene glycol. In addition, polyether urethane polyols may also be used that are obtained by subjecting these ether-based polyols to chain elongation with the aforementioned isocyanate compounds.

Examples of acrylic polyols include acrylic resins obtained by copolymerization using the previously described acrylic monomers.

Examples of carbonate polyols include polyols obtained by reacting a carbonate compound with a diol compound.

Examples of carbonate compounds include dimethyl carbonate, diphenyl carbonate and ethylene carbonate. Examples of diols include the same diols listed as examples of diols that form the aforementioned polyester polyols. In addition, polycarbonate urethane polyols obtained by undergoing chain elongation by the aforementioned isocyanate compounds may also be used as carbonate polyols.

One type of each type of the aforementioned polyols may be used alone or two or more types may be used in combination according to the desired functions and performance.

The use of a polyisocyanate compound as a curing agent in these primary agents enables them to be used as polyurethane-based adhesives. Examples of polyisocyanates used as curing agents include the same polyisocyanate compounds as those listed as examples of chain extenders.

In addition, a carbodiimide compound, oxazoline compound, epoxy compound, phosphorous compound or silane coupling agent and the like may be contained in the adhesive layer 12 to promote adhesion with the base material layer 11 and the aluminum foil layer 13.

Examples of carbodiimide compounds include N,N'-di-o-tolylcarbodiimide, N,N'-diphenylcarbodiimide, N,N'-di-2,6-dimethylphenylcarbodiimide, N,N'-bis(2,6-diisopropylphenyl) carbodiimide, N,N'-dioctyldecylcarbodiimide, N-tolyl-N'-cyclohexylcarbodiimide, N,N'-di-2,2-di-t-butylphenylcarbodiimide, N-triyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide and N,N'-di-p-tolylcarbodiimide.

Examples of oxazoline compounds include monooxazoline compounds such as 2-oxazoline, 2-methyl-2-oxazoline, 2-phenyl-2-oxazoline, 2,5-dimethyl-2-oxazoline or 2,4-diphenyl-2-oxazoline; and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline) or 2,2'-(1,4-phenylene)-bis(2-oxazoline).

Examples of epoxy compounds include diglycidyl ethers of aliphatic diols such as 1,6-hexanediol, neopentyl glycol or polyalkylene glycol; polyglycidyl ethers of aliphatic polyols such as sorbitol, sorbitan, polyglycerol, pentaerythritol, diglycerol, glycerol or trimethylolpropane; polyglycidyl ethers of alicyclic diols such as cyclohexane dimethanol; diglycidyl esters or polyglycidyl esters of aliphatic and aromatic polyvalent carboxylic acids such as terephthalic acid, isophthalic acid, naphthalene dicarboxylic acid, trimellitic acid, adipic acid or sebacic acid; diglycidyl ethers or polyglycidyl ethers of polyvalent phenols such as resorcinol, bis-(p-hydroxyphenyl)methane, 2,2-bis-(p-hydroxyphenyl) propane, tris-(p-hydroxyphenyl)methane or 1,1,2,2-tetrakis(p-hydroxyphenyl) ethane; N-glycidyl derivatives of amines such as N,N'-diglycidyl aniline, N,N,N-diglycidyl toluidine or N,N,N',N'-tetraglycidyl-bis-(p-aminophenyl) methane; triglycidyl derivatives of aminophenols; and triglycidyltris(2-hydroxyethyl) isocyanurate, triglycidyl isocyanurate, ortho-cresol epoxies and phenol novolac epoxies.

Examples of phosphorous-based compounds include tris (2,4-di-t-butylphenyl)phosphite, tetrakis(2,4-di-t-butylphenyl)4,4'-biphenylene phosphonite, bis(2,4-di-t-butylphenyl) pentaerythritol-di-phosphite, bis(2,6-di-t-butyl-4-methylphenyl)pentaerythritol-di-phosphite, 2,2-methylenebis(4,6-di-t-butylphenyl)octyl phosphite, 4,4'-butylidene-bis(3-methyl-6-t-butylphenyl-di-tridecyl) phosphite, 1,1,3-tris(2-methyl-4-ditridecylphosphite-5-t-butyl-phenyl)butane, tris(mixed mono- and di-nonylphenyl) phosphite, tris(nonylphenyl)phosphite and 4,4'-isopropylidenebis(phenyl-dialkylphosphite).

Examples of silane coupling agents include vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane and N-β (aminoethyl)-γ-aminopropyltrimethoxysilane.

In addition, various types of other additives and stabilizers may be incorporated in the adhesive layer 12 according to the performance required of the adhesive.

[Aluminum Foil Layer]

Ordinary soft aluminum foil can be used for the aluminum foil layer 13, and iron-containing aluminum foil is used preferably from the viewpoints of being able to impart pinhole resistance and extendability during forming.

The iron content of the aluminum foil (100% by weight) is preferably 0.1% by weight to 9.0% by weight and more preferably 0.5% by weight to 2.0% by weight. If the iron content is 0.1% by weight or more, pinhole resistance and extendability improve. If the iron content is 9.0% by weight or less, flexibility improves.

The thickness of the aluminum foil layer 13 is preferably 9 μm to 200 μm and more preferably 15 μm to 100 μm from the viewpoints of bather properties, pinhole resistance and processability.

Aluminum foil that has been subjected to degreasing treatment is preferably used for the aluminum foil layer 13 from the viewpoint of electrolyte resistance. Degreasing treatment is broadly classified into a wet type and a dry type.

Examples of wet type degreasing treatment include acid degreasing and alkaline degreasing.

Examples of acids used for acid degreasing include inorganic acids such as sulfuric acid, nitric acid, hydrochloric acid or hydrofluoric acid. One type of these acids may be used alone or two or more types may be used in combination. In addition, various types of metal salts serving as supply sources of Fe ions or Ce ions and the like may be incorporated in these organic acids as necessary from the viewpoint of improving etching effects of the aluminum foil.

Examples of bases used for alkaline degreasing include sodium hydroxide because of its high etching effects. In addition, other examples include weak bases and those incorporating surfactants.

Wet type degreasing treatment is carried out by immersion or spraying.

An example of dry type degreasing treatment is a method carried out in a step in which aluminum is subjected to annealing treatment. In addition, other examples of this degreasing treatment include flame treatment and corona treatment. Moreover, another example of degreasing treatment consists of oxidatively decomposing and removing contaminants with active oxygen generated by irradiating with ultraviolet light of a specific wavelength.

Degreasing treatment of the aluminum foil layer 13 may be carried out on one surface or on both surfaces of the aluminum foil layer 13 in the exterior materials 1 and 2.

[Corrosion Prevention Treated Layer 14]

The corrosion prevention treated layer 14 is a layer basically provided for preventing corrosion of the aluminum foil layer 13 by electrolytic solution or hydrofluoric acid. The corrosion prevention treated layer 14 is formed by degreasing treatment, hot water modification treatment, anodic oxidation treatment, chemical conversion treatment or a combination thereof.

Examples of degreasing treatment include acid degreasing and alkaline degreasing. Examples of acid degreasing include methods using an inorganic acid such as sulfuric acid, nitric acid, hydrochloric acid or hydrofluoric acid either alone or as a mixture thereof. In addition, by using an acid degreasing agent obtained by dissolving a fluorine-containing compound such as monosodium ammonium bifluoride with the aforementioned inorganic acids for acid degreasing, in addition to obtaining aluminum degreasing effects, fluorides of aluminum in a passive state can be formed, which are effective in terms of hydrofluoric acid resistance. Examples of alkaline degreasing include methods using sodium hydroxide and the like.

Examples of hot water modification treatment include boehmite treatment consisting of immersing aluminum foil in boiling water containing triethanolamine.

An example of anodic oxidation treatment is alumite treatment.

Examples of chemical conversion treatment include chromate treatment, zirconium treatment, titanium treatment, vanadium treatment, molybdenum treatment, calcium phosphate treatment, strontium hydroxide treatment, cerium treatment, ruthenium treatment and various types of chemical conversion treatment composed of mixed phases thereof.

When performing this hot water modification treatment, anodic oxidation treatment or chemical conversion treatment, the aforementioned degreasing treatment is preferably performed in advance.

The corrosion prevention treated layer 14 may be a single layer or composed of multiple layers.

In addition, among the aforementioned treatments, hot water modification treatment and anodic oxidation treatment in particular cause the surface of the aluminum foil to be dissolved by a treatment agent resulting in the formation of an aluminum compound (boehmite or alumite) that has superior corrosion resistance. Consequently, since this results in the formation of a common continuous structure extending from the aluminum foil layer 13 to the corrosion prevented treated layer 14, it allows the formation of a corrosion prevention treated layer 14 by a simple coating method, which is included in the definition of chemical conversion treatment but not included in the definition of chemical conversion treatment to be subsequently described. An example of such a method consists of using a sol of a rare earth element-based oxide in the manner of cerium oxide having a mean particle diameter of 100 nm or less that has aluminum corrosion preventive effects (inhibitory effects) and is also a preferable material in terms of environmental aspects. The use of this method makes it possible to impart corrosion preventive effects to metal foils such as aluminum foil even when using an ordinary coating method.

Examples of the aforementioned sols of rare earth element-based oxides include sols using various types of solvents such as aqueous, alcohol, hydrocarbon, ketone, ester and ether-based solvents. Aqueous sols are particularly preferable.

An inorganic acid such as nitric acid, hydrochloric acid or phosphoric acid or a salt thereof, or an organic acid such as acetic acid, malic acid, ascorbic acid or lactic acid, is normally used as a dispersion stabilizer in the aforementioned sol of a rare earth element-based oxide in order to stabilize the dispersion thereof. Among these dispersion stabilizers, phosphoric acid in particular is expected to (1) stabilize dispersion of the sol, (2) improve adhesion of the aluminum foil layer 13 by utilizing the aluminum chelating ability of phosphoric acid, (3) impart electrolyte resistance by scavenging (forming a passive state) aluminum ions that have eluted due to the effects of hydrofluoric acid, and (4) improve cohesion of the corrosion prevention treated layer 14 (oxide layer) by facilitating the occurrence of dehydration condensation of phosphoric acid even at low temperatures, in the exterior materials 1 and 2.

Examples of the aforementioned phosphoric acid and salts thereof include orthophosphoric acid, pyrophosphoric acid, metaphosphoric acid and alkaline metal or ammonium salts thereof. In particular, condensed phosphoric acids such as trimetaphosphoric acid, tetrametaphosphoric acid, hexametaphosphoric acid or ultrametaphosphoric acid as well as alkaline metal salts or ammonium salts thereof are preferable for expressing function in the exterior material 1. In addition, in consideration of dry film formability (drying capacity, heat capacity) when forming the corrosion prevented treated layer 14 composed of a rare earth oxide by various coating methods using the aforementioned sol of a rare earth oxide, a sodium salt is more preferable from the viewpoint of superior dehydration condensation properties at low temperatures. A water-soluble salt is preferable as a phosphoric acid salt.

The blending ratio of phosphoric acid (or a salt thereof) to cerium oxide is preferably 1 part by weight to 100 parts by weight based on 100 parts by weight of cerium oxide. If the aforementioned blending ratio is equal to or greater than 1 part by weight based on 100 parts by weight of cerium oxide, the cerium oxide sol becomes more stable and the function of the exterior material 1 is improved. The aforementioned blending ratio is more preferably 5 parts by weight or more based on 100 parts by weight of cerium oxide. In addition, if the aforementioned blending ratio is equal to or less than 100 parts by weight based on 100 parts by weight of cerium oxide, a decrease in function of the cerium oxide sol is easily inhibited. The aforementioned blending ratio is more preferably 50 parts by weight or less and even more preferably 20 parts by weight or less based on 100 parts by weight of cerium oxide.

Since the corrosion prevention treated layer 14 formed by the aforementioned rare earth oxide sol consists of an aggregate of inorganic particles, there is the risk of a decrease in the cohesion of the layer per se even after going through a dry curing step. Therefore, the corrosion prevention treated layer 14 in this case is preferably conjugated by an anionic polymer or cationic polymer as indicated below in order to supplement cohesion.

An example of the anionic polymer is a polymer having a carboxyl group, specific examples of which include poly(meth)acrylic acid (or a salt thereof) and copolymers obtained by copolymerizing poly(meth)acrylic acid as a main component thereof.

Examples of copolymerizing components of the aforementioned copolymers include alkyl (meth)acrylate-based monomers (of which examples of alkyl groups include a methyl group, ethyl group, n-propyl group, i-propyl group, n-butyl group, i-butyl group, t-butyl group, 2-ethylhexyl group and cyclohexyl group); amide group-containing monomers such as (meth)acrylamide, N-alkyl(meth)acrylamide, N,N-dialkyl(meth)acrylamide (of which examples of alkyl groups include a methyl group, ethyl group, n-propyl group, i-propyl group, n-butyl group, i-butyl group, t-butyl group, 2-ethylhexyl group and cyclohexyl group), N-alkoxy (meth)acrylamide, N,N-dialkoxy(meth)acrylamide (of which examples of alkoxy groups include a methoxy group, ethoxy group, butoxy group and isobutoxy group), N-methylol (meth)acrylamide or N-phenyl(meth)acrylamide; hydroxyl group-containing monomers such as 2-hydroxyethyl(meth)acrylate or 2-hydroxypropyl(meth)acrylate; glycidyl group-containing monomers such as glycidyl (meth)acrylate or allyl glycidyl ether; silane-containing monomers such as (meth)acryloxypropyl trimethoxysilane or (meth)acryloxypropyl triethoxysilane; and isocyanate group-containing monomers such as (meth)acryloxypropyl isocyanate.

These anionic polymers fulfill the role of improving the stability of the corrosion prevention treated layer 14 (oxide layer) obtained using the rare earth element oxide sol. This is achieved by the effect of protecting a hard, brittle oxide with an acrylic-based resin component as well as the effect of capturing (by functioning as a cation catcher) ionic contaminants (and particularly sodium ions) derived from phosphates contained in the rare earth oxide sol. In other words, if alkaline metal ions such as sodium ions and alkaline earth metal ions in particular are contained in the corrosion prevention treated layer 14 obtained using the rare earth oxide sol, the corrosion prevention treated layer 14 is susceptible to deterioration starting at locations containing those ions. Consequently, the resistance of the corrosion prevention treated layer 14 is improved as a result of the anionic polymer immobilizing sodium ions and the like contained in the rare earth oxide sol.

As a result of combining an anionic polymer and a rare earth element oxide sol, the corrosion prevention treated layer 14 has corrosion prevention performance that is equal to that of the corrosion prevention treated layer 14 formed by carrying out chromate treatment on aluminum foil. The anionic polymer preferably has a structure in which an essentially water-soluble polyanionic polymer is cross-linked. Examples of crosslinking agents used to form this structure include compounds having an isocyanate group, glycidyl group, carboxyl group or oxazoline group.

Examples of compounds having an isocyanate group include diisocyanates such as tolylene diisocyanate, xylylene diisocyanate or hydrogenation products thereof, hexamethylene diisocyanate, 4,4'-diphenylmethane diisocyanate or hydrogenation products thereof, or isophorone diisocyanate; polyisocyanates such as adducts obtained by reacting these isocyanates with a polyvalent alcohol such as trimethylolpropane, biurets obtained by reacting with water, or trimers in the form of isocyanurates; as well as block polyisocyanates obtained by forming blocks of these polyisocyanates with alcohols, lactams or oximes and the like.

Examples of compounds having a glycidyl group include epoxy compounds obtained by allowing epichlorhydrin to act on glycols such as ethylene glycol, diethylene glycol, triethylene glycol, polyethylene glycol, propylene glycol, dipropylene glycol, tripropylene glycol, polypropylene glycol, 1,4-butanediol, 1,6-hexanediol or neopentyl glycol; epoxy compounds obtained by allowing epichlorhydrin to act on polyvalent alcohols such as glycerin, polyglycerin, trimethylolpropane, pentaerythritol or sorbitol; and epoxy compounds obtained by allowing epichlorhydrin to act on dicarboxylic acids such as phthalic acid, terephthalic acid, oxalic acid or adipic acid.

Examples of compounds having a carboxyl group include various types of aliphatic or aromatic dicarboxylic acids. In addition, poly(meth)acrylic acid and alkaline (earth) metal salts of poly(meth)acrylic acid may also be used.

Examples of compounds having an oxazoline group include low molecular weight compounds having two or more oxazoline units, or in the case of using a polymerizable monomer in the manner of isopropenyl oxazoline, copolymers obtained by copolymerizing an acrylic-based monomer such as (meth)acrylic acid, alkyl (meth)acrylic acid ester or hydroxyalkyl (meth)acrylic acid ester.

In addition, a crosslinking point may be siloxane-bonded to an anionic polymer by selectively reacting an amine and a functional group in the manner of a silane coupling agent. In this case, examples of compounds that can be used include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane and γ-isocyanatopropyltriethoxysilane. In particular, epoxysilanes, aminosilanes and isocyanate silanes are preferable in consideration of reactivity with a cationic polymer or copolymer thereof.

The ratio of these crosslinking agents to the cationic polymer is preferably 1 part by weight to 50 parts by weight and more preferably 10 parts by weight to 20 parts by weight based on 100 parts by weight of the cationic polymer. If the ratio of the crosslinking agent is equal to or greater than 1 part by weight based on 100 parts by weight of the cationic polymer, a crosslinked structure is formed with sufficient ease. If the ratio of the crosslinking agent is equal to or less than 50 parts by weight based on 100 parts by weight of the cationic polymer, the pot life of a coating liquid improves.

There are no particular limitations on the aforementioned crosslinking agents, and the method used to crosslink the cationic polymer may be a method consisting of the formation of ionic crosslinks using a titanium or zirconium compound.

Examples of cationic polymers include polymers having an amine, polyethylene imine, ionic polymer complexes composed of polyethylene imine and a polymer having carboxylic acid, primary amine grafted acrylic resin in which a primary amine is grafted to an acrylic backbone, polyamines or derivatives thereof, and aminophenol.

The cationic polymer is preferably combined with the use of a crosslinking agent having a functional group capable of reacting with an amine and/or imine such as a carboxyl group or glycidyl group. A polymer having a carboxylic acid that forms an ionic polymer complex with polyethylene imine can also be used as a crosslinking agent used in combination with the cationic polymer, and examples thereof include polycarboxylic acids (salts) such as polyacrylic acid or an ionic salt thereof, copolymers in which a co-monomer has been introduced therein, and polysaccharides having a carboxyl group such as carboxymethyl cellulose or an ionic salt thereof. Examples of polyallylamines include homopolymers and copolymers of allylamines, allylamine amidosulfate, diallylamines or dimethylallylamine. These amines may be in the form of free amines or may be stabilized by acetic acid or hydrochloric acid. In addition, maleic acid or sulfur dioxide and the like may be used as copolymer components. Moreover, types imparted with thermal crosslinkability by partial methoxylation of a primary amine can also be used, and aminophenol can also be used. Allylamines and derivatives thereof are particularly preferable.

In the present embodiment, cationic polymers are also described as constituent members composing the corrosion prevention treated layer 14. The reason for this is that, as a result of conducting extensive studies using various compounds in order to impart electrolyte resistance and hydrofluoric acid resistance required by exterior materials for lithium ion batteries, it was determined that cationic polymers per se are compounds that are capable of imparting electrolyte resistance and hydrofluoric acid resistance. This is presumed to be the result of inhibiting damage to the aluminum foil by capturing fluorine ions with cationic groups (functioning as an anion catcher).

Cationic polymers are preferable materials from the viewpoint of improving adhesion. In addition, since cationic polymers are water-soluble in the same manner as the aforementioned anionic polymers, it is more preferable to impart moisture resistance by forming a crosslinked structure. The crosslinking agents explained in the section on anionic polymers can be used as a crosslinking agent when forming a crosslinked structure for the cationic polymer. In the case of using a rare earth oxide sol for the corrosion prevention treated layer 14, a cationic polymer may be used for the protective layer thereof instead of using the previously described anionic polymer.

In order to allow a corrosion prevention treated layer subjected to chemical conversion treatment as exemplified by chromate treatment to form an inclined structure with aluminum foil, the aluminum foil is subjected to treatment using a chemical conversion coating agent that incorporates hydrofluoric acid, hydrochloric acid, nitric acid, sulfuric acid or a salt thereof in particular, followed by forming a chemical conversion treated layer on the aluminum foil by allowing a chromium- or non-chromium-based compound to act thereon. However, since the aforementioned chemical conversion treatment uses an acid for the chemical conversion coating agent, this treatment is accompanied by exacerbation of the working environment and corrosion of coating devices. On the other hand, differing from chemical conversion treatment as exemplified by chromate treatment, the aforementioned coated type of corrosion prevention treated layer 14 is not required to form an inclined structure with the aluminum foil layer 13. Consequently, the properties of the coating agent are not subjected to restrictions such as being acidic, alkaline or neutral, thereby making it possible to realize a favorable working environment. In addition, the coated type of corrosion prevention treated layer 14 is also preferable since chromate treatment using a chromium compound requires an alternative in terms of environmental health.

In addition, the corrosion prevention treated layer 14 is not limited to the aforementioned layers. For example, the corrosion prevention treated layer 14 may also be formed using a treatment agent incorporating phosphoric acid and a chromium compound in a resin binder (such as aminophenol) in the manner of a known technology in the form of chromate coating. The use of such a treatment agent enables the formation of a layer that is provided with both a corrosion prevention function and adhesion. In addition, a layer can be obtained that is provided with both a corrosion prevention function and adhesion by using a coating agent in which a rare earth oxide sol and polycationic polymer or polyanionic polymer have been preliminarily incorporated into a single liquid, although the stability of the coating liquid must be taken into consideration.

The weight per unit surface area of the corrosion prevention treated layer 14 is preferably 0.005 mg/m$^2$ to 0.200 mg/m$^2$ and more preferably 0.010 mg/m$^2$ to 0.100 mg/m$^2$. If the aforementioned weight per unit surface area is 0.005 mg/m$^2$ or more, a corrosion prevention function is easily imparted to the aluminum foil layer 13. In addition, even if the aforementioned weight per unit surface area exceeds 0.200 mg/m$^2$, there is little change in corrosion prevention function. On the other hand, in the case of using a rare earth oxide sol, heat-curing during drying may become inadequate if the coated film is excessively thick, thereby resulting in the risk of a decrease in cohesion. Furthermore, the thickness of the corrosion prevention treated layer 14 can be converted from the specific gravity thereof.

[Sealant Layer 16]

The sealant layer 16 is a layer affixed to the aluminum foil layer 13 and the corrosion prevention treated layer 14 with the adhesive resin layer 15 interposed there between, and imparts sealing properties to the exterior material 1 by heat sealing.

Examples of components that compose the sealant layer 16 include polyolefin resins such as low density polyethylene, medium density polyethylene, high density polyethylene, ethylene-α-olefin copolymers, homo-, block- or random polypropylenes or propylene-α-olefin copolymers, ethylene-vinyl acetate copolymers, ethylene-(meth)acrylic acid copolymers and esterification products or ionic crosslinking products thereof.

The sealant layer 16 may be in the form of a single layer composed of one type of the aforementioned components or a blended material composed of two or more types of the aforementioned components, or may be in the form of a multilayer structure in accordance with other performance requirements of the sealant. Examples of the sealant layer 16 having a multilayer structure include sealant layers interposed with a resin having gas impermeability, such as a partially saponified or completely saponified ethylene-vinyl acetate copolymer or partially saponified or completely saponified polyvinyl acetate copolymer.

(Production Method)

The following provides an explanation of production methods of the exterior materials 1 and 2 as examples of production methods of the exterior material according to an embodiment of the present invention. However, the production methods of the exterior materials 1 and 2 are not limited to the methods indicated below.

The production method of the exterior material 1 has the three steps (I-1) to (III-1) indicated below:

(I-1) a step for forming the corrosion prevention treated layer 14 on the aluminum foil layer 13;

(II-1) a step for laminating the base material 11 through the adhesive layer 12 onto the aluminum foil layer 13 on the opposite surface from the surface on which the corrosion prevention treated layer 14 has been formed; and, (III-1) a step for laminating the sealant layer 16 through the adhesive resin layer 15 on the aluminum foil layer 13 on the surface of the corrosion prevention treated layer 14.

Step (I-1):

The corrosion prevention treated layer 14 is formed on a first surface (one surface) of the aluminum foil layer 13 by carrying out degreasing treatment, hot water modification treatment, anodic oxidation treatment, chemical conversion treatment or by applying a coating agent having corrosion prevention performance.

Examples of methods used to carry out degreasing treatment include spraying and immersion.

An example of a method used to carry out hot water modification treatment or anodic oxidation treatment is immersion.

The method used to carry out chemical conversion treatment can be selected from among immersion, spraying and coating corresponding to the type of chemical conversion treatment.

Various types of methods such as gravure coating, reverse coating, roll coating or bar coating can be employed as the method for coating the coating agent having corrosion prevention performance.

The amount of coating agent applied is preferably within a range that satisfies the aforementioned weight per unit surface area of the corrosion prevention treated layer 14. In addition, in the case of requiring dry curing, drying curing can be carried out within a range of 60° C. to 300° C. for the substrate temperature corresponding to the drying conditions used when drying the corrosion prevention treated layer 14.

Step (II-1):

The base material layer 11 is laminated by a method such as dry lamination, non-solvent lamination or wet lamination using an adhesive that forms the adhesive layer 12 on the surface of the aluminum foil layer 13 on the opposite surface from the surface on which the corrosion prevention treated layer 14 has been formed. The dried coated amount of the adhesive is preferably 1 g/m$^2$ to 10 g/m$^2$ and more preferably 3 g/m$^2$ to 7 g/m$^2$.

In step (II-1), aging treatment may also be carried out within a range of room temperature to 100° C. in order to promote adhesion.

Step (III-1):

The sealant layer 16 is laminated through an adhesive resin by sandwich lamination using an extrusion laminator on the surface of the corrosion prevention treated layer 14 of a laminate obtained by laminating the base material layer 11, the adhesive layer 12, the aluminum foil layer 13 and the corrosion prevention treated layer 14 in that order. In this case, heat treatment is preferably carried out on a laminate composed of the base material layer 11, the adhesive layer 12, the aluminum foil layer 13, the corrosion prevention treated layer 14, the adhesive resin layer 15 and the sealant layer 16. As a result of this heat treatment, adhesion is improved between the aluminum foil layer 13, the corrosion prevention treated layer 14, the adhesive resin layer 15 and the sealant layer 16, thereby improving electrolyte resistance and hydrofluoric acid resistance.

The heat treatment temperature is preferably 60° C. to 230° C.

From the viewpoint of productivity and handling ease, the method used to carry out heat treatment preferably consists of passing through a drying oven or baking oven set to a high temperature (such as 100° C. or higher), thermal lamination (thermocompression bonding), or containing in a Yankee dryer (heat dryer) for a short period of time (less than 30 seconds).

In the production method of the exterior material according to an embodiment of the present invention, adhesion with a corrosion prevention treated layer is preferably improved by completely melting the adhesive resin layer.

The exterior material 1 is obtained according to the previously explained steps (I-1) to (III-1).

Furthermore, the production method of the exterior material 1 is not limited to the method consisting of sequentially carrying out the aforementioned steps (I-1) to (III-1). For example, step (I-1) may be carried out after carrying out step (II-1). In addition, the corrosion prevention treated layer may be provided on both sides of the aluminum foil layer. In addition, step (II-1) may be carried out after carrying out step (III-1).

In addition, an example of the production method of the exterior material 2 has the three steps (I-2) to (III-2) indicated below:

(I-2) a step for forming the corrosion prevention treated layer 14 on the aluminum foil layer 13;

(II-2) a step for laminating the base material 11 through the adhesive layer 12 onto the aluminum foil layer 13 on the opposite surface from the surface on which the corrosion prevention treated layer 14 has been formed; and, (III-2) a step for forming the adhesive resin layer 15 on the aluminum foil layer 13 on the surface of the corrosion prevention treated layer 14.

Step (I-2):
Step (I-2) can be carried out in the same manner as step (I-1) in the production method of the exterior material 1.

(Step II-2):
Step (II-2) can be carried out in the same manner as step (II-1) in the production method of the exterior material 1.

(Step III-2):
The adhesive resin layer 15 is formed by sandwich lamination using an extrusion laminator on the surface of the corrosion prevention treated layer 14 of a laminated obtained by laminating the base material layer 11, the adhesive layer 12, the aluminum foil layer 13 and the corrosion prevention treated layer 14 in that order. In this case, heat treatment is preferably carried out on a laminate composed of the base material layer 11, the adhesive layer 12, the aluminum foil layer 13, the corrosion prevention treated layer 14 and the adhesive resin layer 15. As a result of this heat treatment, adhesion is improved between the aluminum foil layer 13, the corrosion prevention treated layer 14 and the adhesive resin layer 15, thereby improving electrolyte resistance and hydrofluoric acid resistance. The same method and conditions as explained in step (III-1) in the production method of the exterior material 1 can be used for the method and conditions of heat treatment.

The exterior material 2 is obtained according to the previously explained steps (I-2) to (III-2).

Furthermore, the production method of the exterior material 2 is not limited to the method consisting of sequentially carrying out the aforementioned steps (I-2) to (III-2). For example, step (I-2) may be carried out after carrying out step (II-2). In addition, the corrosion prevention treated layer may be provided on both sides of the aluminum foil layer. In addition, step (II-2) may be carried out after carrying out step (III-2).

The exterior material according to the previously explained embodiments of the present invention has high withstand voltage and superior electrical insulating properties of the adhesive resin layer. In addition, reducing the thickness of the adhesive resin layer makes it possible to realize both superior moisture resistance and electrical insulating properties.

In general, an acid-modified polyolefin resin graft-modified by maleic anhydride is frequently used as an adhesive resin layer that contacts an aluminum foil layer in thermal laminated configurations. However, this acid-modified polyolefin resin tends to have lower electrical insulating properties in comparison with ordinary polyolefin-based films. Electrical insulating properties of the resin per se are thought to be improved by adding a miscible elastomer that forms a microphase-separated structure to the acid-modified polyolefin resin.

Figure 6:
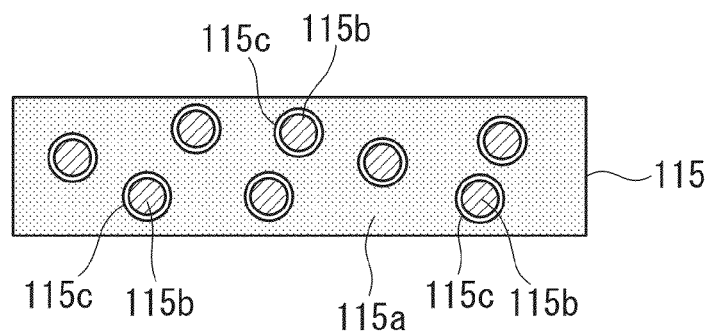
FIG. 6 is a cross-sectional view showing an example of an adhesive resin layer in an exterior material of the prior art.

In addition, an immiscible elastomer that forms a microphase-separated structure in an acid-modified polyolefin resin may be added for the purpose of alleviating stress generated in the case separation occurs at the interface on the surface of an aluminum foil layer. In this case, as shown in FIG. 6, air layers 115c are formed at the interface of a sea-island structure formed by adding an immiscible elastomer 115b to an acid-modified polyolefin resin 115a in an adhesive resin layer 115. Dielectric breakdown of the adhesive resin layer 115 is presumed to occur starting at the portions of the air layers 115c. In contrast, if a miscible elastomer having a microphase-separated structure is added, the miscible elastomer minimizes the air layers 115c at the interface of the aforementioned sea-island structure, and this is thought to improve adhesive strength.

Furthermore, the exterior material according to the embodiments of the present invention is not limited to the aforementioned exterior materials 1 and 2. For example, the corrosion prevention treated layer may at least be provided on the aluminum foil layer on the surface of the adhesive resin layer, or may be provided on both sides of the aluminum foil layer.

EXAMPLES

Although the following provides a detailed explanation of embodiments of the present invention through examples thereof, the present invention is not limited by the following descriptions. Examples 1 to 15 are experimental examples, Examples 18 to 21, 23 and 24 are examples, and Examples 16, 17 and 22 are comparative examples.

<Evaluation of Electrical Insulating Properties in Single Film of Adhesive Resin Layer>

Electrical insulating properties were evaluated by measuring withstand voltage in a single film of an adhesive resin layer. The materials used are indicated below.

[Materials Used]

Acid-modified polyolefin resin E1: Polypropylene-based adhesive resin graft-modified with maleic anhydride (Admer, Mitsui Chemicals Inc.)

Miscible elastomer E2: Hydrogenated styrene-based thermoplastic elastomer (Taftec, Asahi Kasei Chemicals Corp.)

Miscible elastomer E3: Propylene-α-olefin copolymer elastomer (Notio, Mitsui Chemicals Inc.)

[Production Method of Single Film of Elastic Resin Layer]

After adding and mixing miscible elastomers E2 and E3 to the acid-modified polyolefin resin E1 at their respective ratios using a twin-screw extruder, an adhesive resin was obtained by going through water cooling and pelletization steps. Subsequently, an adhesive resin (thickness: 20 μm) was provided by extrusion lamination on a polyethylene terephthalate resin film (not subjected to adhesive promotion treatment) using this adhesive resin, and a laminate consisting of a resin film base material, adhesive resin layer and resin film base material was formed by sandwich lamination using another polyethylene terephthalate resin film. Subsequently, the resin film base material on both sides was peeled from this laminate to obtain a single film of an adhesive resin layer.

[Measurement of Withstand Voltage]

A withstand voltage test was carried out according to the "Testing Methods for Electric Strength of Solid Insulating Materials" defined in JIS-C2110. The Model TOS9201 Withstand Voltage/Insulation Resistance Tester (Kikusui Electronics Corp.) was used for the testing apparatus. A test piece measuring 100 mm long×100 mm wide was cut out from the adhesive resin layer single film obtained in each example, the test piece was placed on a metal plate having a diameter of 75 mm, an electrode having a diameter of 25 mm, height of 25 mm and corner R of 3 mm was then placed on the test piece, and after increasing the voltage to a specified voltage as quickly as possible while being careful not to generate transient overvoltage, this specified voltage was maintained for 60 seconds followed by confirmation of destruction of the test piece. The withstand voltage per 1 μm of thickness (kV/μm) was determined from the maximum voltage at which destruction did not occur. This withstand voltage was measured five times for each example and calculated as the average value thereof. The applied voltage consisted of a maximum applied voltage of 5.2 kV at a sine wave of 50 Hz/60 Hz. The evaluation was carried out using the following criteria, and an evaluation of "Fair" or higher was considered to be acceptable.

Good: Withstand voltage in excess of 0.05 kV/μm
Fair: Withstand voltage of 0.04 kV/μm to 0.05 kV/μm
Bad: Withstand voltage of less than 0.04 kV/μm Example 1

A single film of an adhesive resin layer was produced by using only the acid-modified polyolefin resin E1 without adding the miscible elastomers E2 and E3 followed by measurement of withstand voltage and evaluation of electrical insulating properties. The evaluation results are shown in Table 1.

Examples 2 to 15

Single films of adhesive resin layers were produced using adhesive resins obtained by adding and mixing the miscible elastomers E2 and E3 with the acid-modified polyolefin resin E1 at the ratios shown in Table 1 using a twin-screw extruder followed by measurement of withstand voltage and evaluation of electrical insulating properties. The evaluation results are shown in Table 1.

TABLE 1

| | Added amount of miscible elastomers (wt %) | | Withstand voltage | | |
| --- | --- | --- | --- | --- | --- |
| | E2 | E3 | (kV/μm) | (kV/20 μm) | Evaluation |
| Example 1 | — | — | 0.03 | 0.60 | Bad |
| Example 2 | 5 | — | 0.05 | 1.00 | Fair |
| Example 3 | 10 | — | 0.08 | 1.60 | Good |
| Example 4 | 20 | — | 0.11 | 2.20 | Good |
| Example 5 | 30 | — | 0.12 | 2.40 | Good |
| Example 6 | 40 | — | 0.12 | 2.40 | Good |
| Example 7 | 50 | — | 0.12 | 2.40 | Good |
| Example 8 | 60 | — | 0.12 | 2.40 | Good |
| Example 9 | — | 5 | 0.04 | 0.80 | Fair |
| Example 10 | — | 10 | 0.07 | 1.40 | Good |
| Example 11 | — | 20 | 0.10 | 2.00 | Good |
| Example 12 | — | 30 | 0.11 | 2.20 | Good |
| Example 13 | — | 40 | 0.12 | 2.40 | Good |
| Example 14 | — | 50 | 0.12 | 2.40 | Good |
| Example 15 | — | 60 | 0.12 | 2.40 | Good |

As shown in Table 1, the elastic resin layers of Examples 2 to 15 in which miscible elastomer E2 or E3 dispersed at a dispersed phase size of 1 nm to less than 1 μm was added to the acid-modified polyolefin resin E1 demonstrated higher withstand voltages and superior electrical insulating properties in comparison with the adhesion resin layer of Example 1 in which neither miscible elastomer E2 or E3 was incorporated. In addition, withstand voltage became nearly saturated when the added amount of miscible elastomer E2 or E3 exceeded 20% by weight.

Since withstand voltage per unit thickness is thought to not change that much even at portions of the exterior material that have become thin following deep drawing, withstand voltage of those portions that have become thin following deep drawing are thought to be able to be estimated from the withstand voltage per unit thickness of a single film of the adhesive resin layer.

<Evaluation of Electrical Insulating Properties of Adhesive Resin Layer in Exterior Material>

Figure 3:
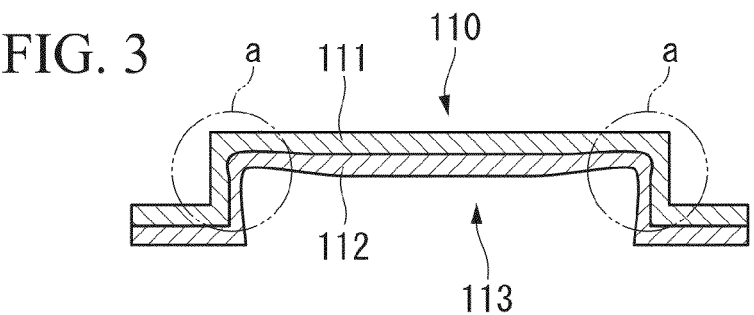
FIG. 3 is a cross-sectional view showing a deep-drawn formed product obtained by deep drawing an exterior material.
Figure 4:
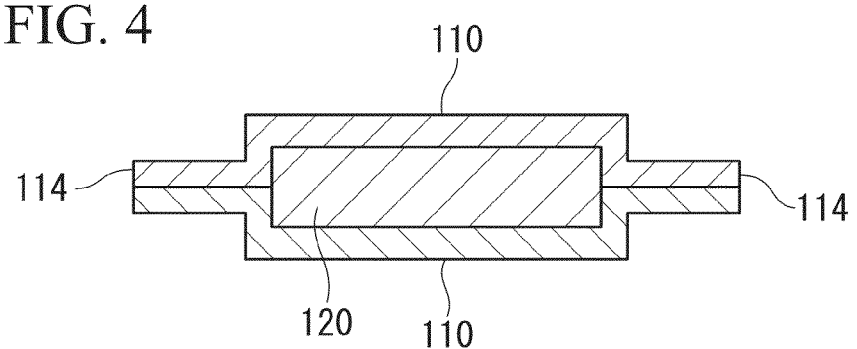
FIG. 4 is a cross-sectional view showing the adhered portion of an exterior material and an electrode tab on the periphery of a battery using a deep-drawn exterior material.
Figure 5:
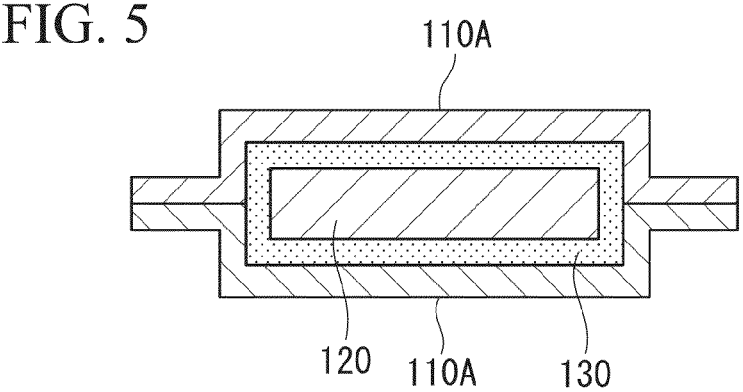
FIG. 5 is a cross-sectional view showing another example of the adhered portion of an exterior material and an electrode tab on the periphery of a battery using a deep-drawn exterior material.

In the case the film thickness of an exterior material at the corners a (FIG. 3) of a recess portion formed following deep drawing of an exterior material, since it is difficult to evaluate electrical insulating properties of an adhesive resin layer at those portions, electrical insulating properties were evaluated using an alternative evaluation by drawing the exterior material with a tensile tester, and measuring withstand voltage of the adhesive resin layer after having deformed to a thickness equal to 50% of that prior to drawing in order to represent deep drawing.

[Materials Used]

The materials used are as indicated below.

(Base Material Layer 11)

Base Material A: Biaxially oriented polyamide film (ON, Unitika Ltd., thickness: 25 μm)

(Adhesive Layer 12)

Adhesive B: Polyurethane-based adhesive incorporating a tolylene diisocyanate adduct-based curing agent in a polyester polyol-based primary agent (Toyo Ink Co., Ltd.)

(Aluminum Foil Layer 13)

Aluminum Foil C: Soft aluminum foil 8079 having a thickness after annealing and degreasing treatment of 40 μm (Toyo Aluminum K.K.)

(Corrosion Prevention Treated Layer 14)

Treatment Agent D-1: Sodium polyphosphate-stabilized cerium oxide sol adjusted to a solid concentration of 10% by weight using distilled water for the solvent. Amount of phosphate made to be 10 parts by weight based on 100 parts by weight of cerium oxide.

Treatment Agent D-2: Composition composed of 90% by weight of polyacrylic acid ammonium salt (Toagosei Co., Ltd.) and 10% by weight of acrylic-isopropylenyl oxazoline copolymer (Nippon Shokubai Co., Ltd.) adjusted to a solid concentration of 5% by weight using distilled water for the solvent.

Treatment Agent D-3: Composition composed of 90% by weight of polyallylamine (Nitto Boseki Co., Ltd.) and 10% by weight of polyglycerol polyglycidyl ether (Nagase Chemtex Corp.) adjusted to a solid concentration of 5% by weight using distilled water for the solvent.

Treatment Agent D-4: Chemical conversion coating agent prepared by adding chromium fluoride ($CrF_3$) to a water-soluble phenol resin (Sumitomo Bakelite Co., Ltd.), adjusted to a solid concentration of 1% by weight using an aqueous phosphoric acid solution having a concentration of 1% as solvent, and adjusting the concentration to 10 mg/m$^2$ as the amount of Cr present in the final dry coating.

(Adhesive Resin Layer 15)

Adhesive Resin E-1: Resin composition obtained by adding an immiscible elastomer in the form of Tafmer manufactured by Mitsui Chemicals Inc. to a polypropylene-based adhesive resin graft-modified with maleic anhydride (Admer manufactured by Mitsui Chemicals Inc.) to a content of 25% by weight.

Adhesive Resin E-2: Adhesive composition obtained by adding an immiscible elastomer in the form of Tafmer manufactured by Mitsui Chemicals Inc. to a polypropylene-based adhesive resin graft-modified with maleic anhydride (Admer manufactured by Mitsui Chemicals Inc.) to a content of 25% by weight, and further adding a hydrogenated styrene-based thermoplastic elastomer (Taftec manufactured by Asahi Kasei Chemicals Corp.) to a content of 15% by weight.

Adhesive Resin E-3: Adhesive composition obtained by adding an immiscible elastomer in the form of Tafmer manufactured by Mitsui Chemicals Inc. to a polypropylene-based adhesive resin graft-modified with maleic anhydride (Admer manufactured by Mitsui Chemicals Inc.) to a content of 25% by weight, and further adding a propylene-α-olefin copolymer elastomer (Notio manufactured by Mitsui Chemicals Inc.) to a content of 15% by weight.

[Production Method of Exterior Material 2]

Step (I-2):

The corrosion prevention treated layer 14 was provided on a first surface (one surface) of the Aluminum Foil C by microgravure coating. The coated amount was set to 70 mg/m$^2$ to 100 mg/m$^2$ as the dry coated amount of the treatment agent (coating agent), and baking treatment was carried out in a drying unit at 150° C. to 250° C. corresponding to the type of treatment agent. The final dry coated amount was made to be 70 mg/m$^2$ to 100 mg/m$^2$ and baking treatment conditions were made to be within the range of 150° C. to 250° C. both in the case the formed corrosion prevention treated layer 14 consisted of a single layer and in the case of multiple layers.

Step (II-2):

The base material layer 11 was provided on the aluminum foil layer 13 provided with the corrosion prevention treated layer 14 on the opposite surface from the corrosion prevention treated layer using the Adhesive B by dry lamination.

Step (III-2):

The laminated obtained in step (II-2) was placed on the unwinding unit of a extrusion laminator equipped with an anchor coating unit, the Adhesive Resins E1 to E3 were extruded from an extruder at 290° C. and a laminate composed of the base material layer 11, the adhesive layer 12, the aluminum foil layer 13, the corrosion prevention treated layer 14 and the adhesive resin layer 15 was obtained by sandwich lamination at a processing speed of 10 m/min followed by heat-treating by thermal lamination (190° C.) to obtain the exterior material 2. The thickness of the adhesive resin layer 15 was 20 μm. Furthermore, each of the materials of the Adhesive Resins E-2 and E-3 were mixed in advance using a twin-screw extruder, and were used in the aforementioned extrusion lamination after having been prepared by going through water cooling and pelletization steps.

[Measurement of Withstand Voltage]

After drawing the exterior material 2 obtained in each example until the thickness of the adhesive resin layer 15 reached 50% (thickness: 10 μm) using a tensile tester, withstand voltage was measured in the same manner as in the case of aforementioned single film of an adhesive resin layer.

Examples 16 to 21

Exterior materials 2, in which the corrosion prevention treated layer 14 and the adhesive resin layer 15 had the configurations shown in Table 2, were produced according to the aforementioned production method followed by evaluation of electrical insulating properties. The evaluation results are shown in Table 2.

TABLE 2

|  | Ex. 16 | Ex. 17 | Ex. 18 | Ex. 19 | Ex. 20 | Ex. 21 |
| --- | --- | --- | --- | --- | --- | --- |
| Corrosion prevention treated layer 14 | D-1/D-2/D-3 | D-4 | D-1/D-2/D-3 | D-1/D-2/D-3 | D-4 | D-4 |
| Adhesive resin layer 15 | E-1 | E-1 | E-2 | E-3 | E-2 | E-3 |
| Thickness of adhesive resin layer 15 after drawing (μm) | 10 | 10 | 10 | 10 | 10 | 10 |
| Withstand voltage (kV/μm) | 0.02 | 0.02 | 0.05 | 0.04 | 0.05 | 0.04 |
| Withstand voltage (kV/10 μm) | 0.20 | 0.20 | 0.50 | 0.40 | 0.50 | 0.40 |
| Withstand voltage (kV/20 μm) | 0.40 | 0.40 | 1.00 | 0.80 | 1.00 | 0.80 |

Examples 18 to 21, in which the adhesive resin layer 15 was formed with an adhesive resin obtained by adding a miscible elastomer dispersed at a dispersed phase size of 1 nm to less than 1 μm to an acid-modified polyolefin resin, demonstrated high withstand voltage and superior electrical insulating properties in comparison Examples 16 and 17, in which the adhesive resin layer was formed using only an acid-modified polyolefin resin, even if the thickness of the adhesive resin layer 15 was halved by drawing.

<Evaluation of Moisture Resistance of Exterior Material>

Moisture resistance was evaluated by measuring moisture permeability of the exterior materials.

[Materials Used]

The same materials as those used in the evaluation of electrical insulating properties of the aforementioned adhesive resin layer in the exterior material 2 were used for the materials used to form the base material layer 11, the adhesive layer 12, the aluminum foil layer 13, the corrosion prevention treated layer 14 and the adhesive resin layer 15.

(Sealant Layer 16)

Film F: A multilayer film composed of two types and three layers consisting of random PP (polypropylene), block PP and random PP having a total thickness of 40 μm (Tm=high temperature side melting point of block PP (approx. 160° C.), Okamoto Co., Ltd.) was used.

[Production Method of Exterior Material 1]

Steps (I-1) and (II-1): These steps were carried out in the same manner as the aforementioned steps (I-2) and (II-2).

Step (III-1):

The laminated obtained in step (II-1) was placed on the unwinding unit of a extrusion laminator equipped with an anchor coating unit, the Film F from the sandwiched base material portion and Adhesive Resins E1 and E2 were extruded from an extruder at 290° C., and a laminate composed of the base material layer 11, the adhesive layer 12, the aluminum foil layer 13, the corrosion prevention treated layer 14, the adhesive resin layer 15 and the sealant layer 16 was obtained by sandwich lamination at a processing speed of 80 m/min followed by heat-treating by thermal lamination (190° C.) to obtain the exterior material 1. The thickness of the adhesive resin layer 15 in each example was set so that the overall withstand voltage of the adhesive resin layer 15 was nearly equal based on the results of Table 2. Furthermore, each of the materials of the Adhesive Resins E-2 and E-3 were mixed in advance using a twin-screw extruder, and were used in the aforementioned extrusion lamination after having been prepared by going through water cooling and pelletization steps.

[Measurement of Moisture Permeability]

An electrolytic solution (3 g), obtained by dissolving LiPF$_6$ (lithium hexafluorophosphate) in a mixture of ethylene carbonate, dimethyl carbonate and diethyl carbonate at a weight ratio of 1:1:1 and adjusting to a concentration of 1.5 M, was filled into the exterior materials 1 obtained in each example by heat sealing both ends to form a pouch, and after sealing the remaining ends by heat sealing, the exterior materials 1 were allowed to stand in an environment at 60° C. and 90% RH for 500 hours followed by measurement of the weight of moisture thereof with respect to 3 g of electrolytic solution before and after testing using the Karl Fischer method.

Examples 22 to 24

Exterior materials 1, in which the corrosion prevention treated layer 14 and the adhesive resin layer 15 had the configurations shown in Table 3, were produced according to the aforementioned production method followed by evaluation of moisture resistance. In addition, the withstand voltage of the exterior materials 1 were measured in the same manner as in the case of the aforementioned exterior material 2. The evaluation results are shown in Table 3.

TABLE 3

|  | Ex. 22 | Ex. 23 | Ex. 24 |
|---|---|---|---|
| Corrosion prevention treated layer 14 | D-1/D-2/D-3 | D-1/D-2/D-3 | D-4 |
| Adhesive resin layer 15 | E-1 | E-2 | E-2 |
| Thickness of adhesive resin layer 15 (μm) | 40 | 20 | 20 |
| Withstand voltage of adhesive resin layer 15 (kV) | 1.2 | 1.2 | 1.0 |
| Moisture permeability (μg/3 μg) | 0.3 | 0.2-0.25 | 0.2-0.25 |

Examples 23 and 24, in which the adhesive resin layer 15 was formed with an adhesive resin obtained by adding a miscible elastomer dispersed as a dispersed phase size of 1 nm to less than 1 μm to an acid-modified polyolefin resin required that only the thickness of the adhesive resin layer 15 be reduced in order obtain an equal level of withstand voltage, and demonstrated low moisture permeability and superior moisture resistance in comparison with Example 22, in which the adhesive resin layer was formed using only an acid-modified polyolefin resin.

Second Embodiment

The following provides a detailed explanation of a lithium ion battery exterior material according to a second embodiment of the present invention.

Embodiment 2-1

Figure 7:
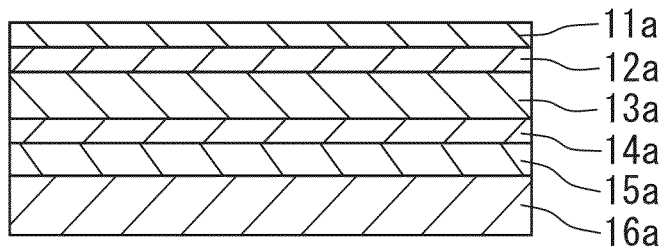
FIG. 7 is a cross-sectional view showing an example of a lithium ion battery exterior material according to a second embodiment of the present invention.

As shown in FIG. 7, a lithium ion battery exterior material 1a of the present embodiment (to be referred to as the "exterior material 1a") is a laminate obtained by sequentially laminating an adhesive layer 12a, a metal foil layer 13a, a corrosion prevention treated layer 14a, an adhesive resin layer 15a and a sealant layer 16a on a first surface (one surface) of a base material layer 11a.

(Base Material Layer 11a)

The base material layer 11a fulfills the role of imparting heat resistance in the sealing step during production of a lithium ion battery and inhibiting the formation of pinholes that can occur during processing and distribution. Moreover, it also fulfills the role of preventing rupture of the metal foil layer 13a during embossing as well as imparting insulating properties between the metal foil layer 13a and other metals.

Examples of the base material layer 11a include drawn or non-drawn films such as a polyester film, polyamide film or polypropylene film. In particular, a biaxially oriented polyamide film or biaxially oriented polyester film is preferable from the viewpoint of improving moldability, heat resistance, pinhole resistance and insulating properties.

The base material layer 11a may consist of a single layer or a laminated film obtained by laminating two or more layers of films. In the case the base material layer 11a is a single-layer film, either a biaxially oriented polyester film or biaxially oriented polyamide film is preferable. In the case the base material layer 11a is a laminated film, a laminated film consisting of a biaxially oriented polyester film and a biaxially oriented polyamide film is preferable, and a laminated film obtained by laminating a biaxially oriented polyester film and biaxially oriented polyamide film in that order when viewed from the outside is more preferable.

An additive such as a flame retardant, slipping agent, antiblocking agent, antioxidant, photostabilizer or pressure-sensitive adhesion promoter may be dispersed in the base material layer 11a or may be applied to the surface thereof.

Examples of slipping agents include fatty acid amides (such as oleic acid amide, erucic acid amide, stearic acid amide, behenic acid amide, ethylenebis oleic acid amide or ethylenebis erucic acid amide).

Examples of anti-blocking agents include silica and various other types of filler-based anti-blocking agents.

One type of additive may be used alone or two or more types may be used in combination.

The thickness of the base material layer 11a is preferably 6 µm to 50 µm and more preferably 10 µm to 40 µm.

(Adhesive Layer 12a)

The adhesive layer 12a is formed between the base material layer 11a and the metal foil layer 13a. The adhesive layer 12a it not only required to have adhesive strength required to firmly adhere the base material layer 11a and the metal foil layer 13a, but is also required to have conformability in order to protect the metal foil layer 13a from being ruptured by the base material layer 11a during embossing.

A two-liquid curing-type polyurethane-based adhesive obtained by allowing a curing agent in the form of an aromatic or aliphatic isocyanate compound to act on a primary agent such as a polyester polyol, polyether polyol or acrylic polyol is preferable for the material of the adhesive layer 12a. The molar ratio (NCO/OH) of isocyanate groups of the curing agent to hydroxyl groups of the primary agent in the aforementioned polyurethane-based adhesive is preferably 1 to 10 and more preferably 2 to 5.

From the viewpoints of adhesive strength, conformability and processability, the thickness of the adhesive layer 12a is preferably 1 µm to 10 µm and more preferably 2 µm to 6 µm.

(Metal Foil Layer 13a)

The metal foil layer 13a is provided to prevent entry of moisture into the lithium ion battery. The metal foil layer 13a is required to have superior extendability with respect to embossing and allow deep drawing. Various types of metal foils such as aluminum or stainless steel foil can be used for the metal foil layer 13a, and aluminum foil is preferable from the viewpoints of moisture resistance, processability such as extendability and cost.

A known soft aluminum foil, for example, can be used for the aluminum foil, and iron-containing aluminum foil is preferable from the viewpoints of pinhole resistance and extendability during molding. The iron content of the aluminum foil (100% by weight) is preferably 0.1% by weight to 9.0% by weight and more preferably 0.5% by weight to 2.0% by weight. If the iron content is equal to or greater than the lower limit value, pinhole resistance and extendability improve. If the iron content is equal to or less than the upper limit value, flexibility improves.

The thickness of the metal foil layer 13a is preferably 10 µm to 100 µm and more preferably 15 µm to 80 µm from the viewpoints of bather properties, pinhole resistance and processability.

Although untreated aluminum foil may be used for the metal foil layer 13a, aluminum foil that has been subjected to degreasing treatment is preferable. Degreasing treatment is broadly classified into a wet type and a dry type.

Examples of wet type degreasing treatment include acid degreasing and alkaline degreasing. Examples of acids used for acid degreasing include inorganic acids such as sulfuric acid, nitric acid, hydrochloric acid or hydrofluoric acid. One type of these acids may be used alone or two or more types may be used in combination. In addition, various types of metal salts serving as supply sources of iron (III) ions or cerium (III) ions and the like may be incorporated as necessary from the viewpoint of improving etching effects of the aluminum foil. Examples of bases used for alkaline degreasing include sodium hydroxide because of its high etching effects. In addition, other examples include weak bases and those incorporating surfactants. Wet type degreasing treatment is carried out by immersion or spraying.

An example of dry type degreasing treatment is a method in which degreasing treatment is carried out by prolonging treatment time in a step in which aluminum foil is subjected to annealing treatment. In addition, other examples of this degreasing treatment include flame treatment and corona treatment. Moreover, another example of degreasing treatment consists of oxidatively decomposing and removing contaminants with active oxygen generated by irradiating with ultraviolet light of a specific wavelength.

(Corrosion Prevention Treated Layer 14a)

The corrosion prevention treated layer 14a fulfills the role of firmly adhering the metal foil layer 13a and the adhesive resin layer 15 by functioning as an anchor, and fulfills the role of protecting the metal foil layer 13a from electrolytic solution and hydrofluoric acid generated from the electrolytic solution.

The corrosion prevention treated layer 14a can be formed by, for example, chromate treatment with a corrosion prevention treatment agent composed of a chromic acid salt, phosphoric acid salt, fluoride and various types of thermosetting resins, or ceria sol treatment with a corrosion prevention treatment agent composed of an oxide of a rare earth element (such as cerium oxide or zirconium oxide), phosphoric acid salt and various types of thermosetting resins. The corrosion prevention treated layer 14a is not limited to a coated film formed by the aforementioned treatment provided it is a coated film that allows the obtaining of adequate corrosion resistance for the metal foil layer 13a. For example, the corrosion prevention treated layer 14a may also be formed by phosphate treatment or boehmite treatment.

The corrosion prevention treated layer 14a may be a single layer or composed of multiple layers.

The thickness of the corrosion prevention treated layer 14a is preferably 5 nm to 1 µm and more preferably 10 nm to 200 nm from the viewpoint of corrosion prevention function and functioning as an anchor.

(Adhesive Resin Layer 15a)

Examples of materials of the adhesive resin layer 15a include polyolefin-based resins, and acid-modified polyolefin-based resins in which a polyolefin-based resin has been graft-modified with an acid such as maleic anhydride, an acid-modified polyolefin-based resin is preferable, and a maleic anhydride-modified polyolefin-based resin that has been graft-modified with maleic anhydride is more preferable. Since the adhesive resin layer 15a has polar groups if an acid-modified polyolefin-based resin is used for the adhesive resin layer 15a, in the case the sealant layer 16a is non-polar, it can be strongly adhered to both sides of the polar corrosion prevention treated layer 14a and the non-polar sealant layer 16a. In addition, if the adhesive resin layer 15a is formed with a polyolefin-based resin or acid-modified polyolefin-based resin, resistance to battery contents such as electrolytic solution improves, thereby making it possible to inhibit decreases in adhesive strength caused by deterioration of the adhesive even if hydrofluoric acid is formed.

Examples of polyolefin-based resins include low density polyethylene, medium density polyethylene, high density polyethylene, ethylene-α-olefin copolymers, homo-, block- or random polypropylenes, and propylene-α-olefin copolymers. In addition, other examples include copolymers obtained by copolymerizing the aforementioned polyolefin-based resins with polar molecules of acrylic acid or methacrylic acid and the like, as well as polymers of crosslinked polyolefins, and resins that have undergone dispersion or copolymerization and the like can be employed. In particular, the polyolefin-based resin is preferably one or more types of resins selected from the group consisting of homopolypropylene, block polypropylene and random polypropylene. One type of these polyolefin-based resins may be used alone or two or more types may be used in combination.

A maleic anhydride-modified polypropylene resin is particularly preferable for the maleic anhydride-modified polyolefin-based resin. The modification rate of maleic anhydride in the maleic anhydride-modified polypropylene resin is preferably 0.01% by weight to 10% by weight and more preferably 0.1% by weight to 5% by weight. The aforementioned modification rate refers to the weight ratio of the portion of the maleic anhydride-modified polypropylene resin derived from maleic anhydride.

One type of adhesive resin may be used alone in the adhesive resin layer 15a or two or more types of adhesive resins may be used in combination.

A styrene-based or olefin-based elastomer may also be added to the adhesive resin layer 15a. As a result, in addition to improvement of resistance to drawing-induced a whitening phenomenon attributable to cracks formed during embossing, adhesive strength improves due to improved wettability and other characteristics such as film-forming properties also improve due to reduced anisotropy. These elastomers are preferably dispersed at a nanometer size. Dispersion at a nanometer size refers to the diameter of the dispersed phase being 1 nm to less than 1 μm. In addition, the diameter of the dispersed phase refers to the longest axis of an oval that forms the dispersed phase.

Examples of commercially available products of styrene-based elastomers include Taftec (trade name) manufactured by Asahi Kasei Chemicals Corp. and Dynalon (trade name) manufactured by JSR Corp.

Examples of commercially available products of olefin-based elastomers include Notio (trade name) manufactured by Mitsui Chemicals Inc. and Zelas (trade name) manufactured by Mitsubishi Chemical Corp.

The melt flow rate (MFR) of the adhesive resin that forms the adhesive resin layer 15a is preferably 4 g/10 minutes to 30 g/10 minutes under conditions of a temperature of 230° C. and load of 2.16 kgf.

The thickness of the adhesive resin layer 15a is preferably 2 μm to 50 μm.

(Sealant Layer 16a)

The sealant layer 16a serves as the inner layer of the exterior material 1a and is heat-fused during battery assembly. In other words, the sealant layer 16a is a layer that is composed of a heat-fusible film. A lithium ion battery can be sealed by aligning sealant layers 16a of the exterior material 1a to be facing each other and heat-sealing at a temperature equal to or higher than the melting temperature of the sealant layer 16a.

Examples of materials of the sealant layer 16a include polyolefin-based resins and acid-modified polyolefin-based resins in which the polyolefin-based resin has been graft-modified with an acid such as maleic anhydride, and polyolefin-based resins are preferable. Examples of polyolefin-based resins include low density polyethylene, medium density polyethylene, high density polyethylene, ethylene-α-olefin copolymers, homo-, block- or random polypropylenes and propylene-α-olefin copolymers. In particular, the polyolefin-based resin is preferably one or more types of resins selected from the group consisting of homopolypropylene, block polypropylene and random polypropylene. One type of these polyolefin-based resins may be used alone or two or more types may be used in combination.

The sealant layer 16a may be a layer composed of a single layer film or a laminate composed of a multilayer film. For example, a multilayer film may be used in which an ethylene-cyclic olefin copolymer or a resin such as polymethylpentene is interposed for the purpose of imparting moisture resistance.

The sealant layer 16a may also contain various types of additives such as a slipping agent, anti-blocking agent, anti-static agent or nucleating agent. One type of additive such as a slipping agent or anti-blocking agent may be used alone or two or more types may be used in combination.

The MFR of the sealant layer 16a is preferably 1 g/10 minutes to 15 g/10 minutes under conditions of a temperature of 230° C. and load of 2.16 kgf.

The thickness of the sealant layer 16a is preferably 10 μm to 80 μm.

In the exterior material 1a, the adhesive resin layer 15a is preferably formed from an acid-modified polyolefin-based resin, and the sealant layer 16a is preferably formed from a film composed of a polyolefin-based resin. In addition, the adhesive resin layer 15a is more preferably formed from a maleic anhydride-modified polyolefin-based resin. More preferably, at least one of a styrene-based elastomer and olefin-based elastomer is dispersed in the adhesive resin layer 15a at a nanometer size.

The laminated portion of the sealant layer 16a and the adhesive resin layer 15a in the exterior material 1a (to be referred to as the "laminated portion A") satisfies the following conditions (1) and (2). As a result, interface strain caused by resin flow during heat sealing can be inhibited, and penetration of moisture through seal end surfaces can be reduced over a long period of time:

(1) heat of fusion ΔH as measured by differential scanning calorimetry is 15 J/g to 80 J/g and melting temperature Tm is 130° C. to 170° C.; and, (2) melt viscosity η at a shear velocity of $1\times10^{-2}$/second and temperature 30° C. higher than the melting temperature Tm of the laminated portion A of the sealant layer and the adhesive resin layer is 1000 Pa·s to 7000 Pa·s.

(Condition (1))

In lithium ion batteries, if moisture penetrates into the battery from the seal end surfaces thereof, it reacts with electrolyte and the generated hydrofluoric acid corrodes the metal foil layer resulting in the risk of a decrease in cycling characteristics. In the past, since an adhesive layer using a two-liquid curing-type polyester urethane resin was formed between the metal foil layer and the sealant layer of exterior materials employing a dry laminated configuration, even if a polyolefin-based resin having high barrier properties was used for the sealant layer, there was considerable penetration of moisture from the seal end surfaces. It is important to reduce moisture permeability of both the adhesive resin layer 15a and the sealant layer 16a in order to reduce the amount of moisture entering through the seal end surfaces. In other words, it is necessary to integrate the adhesive resin layer 15a and the sealant layer 16a into a single layer to control moisture permeability.

Moisture permeability of a polymer is thought to be proportional to the product of the solubility coefficient and the diffusion coefficient. In particular, since crystalline polymers such as polypropylene used in the sealant layer 16a and adhesive resin layer 15a have a small solubility coefficient with respect to water, the diffusion coefficient, which indicates the diffusion of water within the polymer, is considered to have a significant effect. In the case of crystalline polymers having a crystalline portion and amorphous portion in a molecule thereof, the diffusion coefficient is dependent on the ratio between the crystalline portion and amorphous portion, namely the degree of crystallization. In other words, a high value for the degree of crystallization means that the ratio of the amorphous portion is low and less water passes through this amorphous portion. In this embodiment of the present invention, the heat of fusion ΔH and the melting temperature Tm, as determined by measuring the laminated portion A of the adhesive resin layer 15a and the sealant layer 16a with a differential scanning calorimeter (DSC), are controlled to be within a specific range.

The heat of fusion ΔH of the laminated portion A is 15 J/g to 80 J/g. If the heat of fusion ΔH is equal to or greater than 15 μg, the ratio of the highly crystalline portion of the laminated portion A increases and penetration of moisture through the seal end surfaces can be reduced. If the heat of fusion ΔH of the laminated portion A is equal to or less than 80 J/g, the crystalline portion of the laminated portion A becomes excessively large, and decreases in flexibility can be inhibited.

The heat of fusion ΔH of the laminated portion A is preferably 20 J/g to 75 J/g and more preferably 25 J/g to 70 J/g.

The melting temperature Tm of the laminated portion A is 130° C. to 170° C. If the melting temperature Tm of the laminated portion A is 135° C. or higher, adequate heat resistance is obtained. If the melting temperature Tm of the laminated portion A is 170° C. or lower, heat sealing can be carried out at a lower temperature, thereby making it possible to inhibit local decreases in peel strength.

The melting temperature Tm of the laminated portion A is preferably 135° C. to 165° C.

The heat of fusion ΔH and melting temperature Tm of the laminated portion A can be controlled according to the crystallinity of the materials used and the combination of materials used.

Measurement conditions of the heat of fusion ΔH and melting temperature Tm of the laminated portion A consist of sealing 3 mg to 5 mg of sample in an aluminum container, and after heating to 200° C. and holding at that temperature for 5 minutes, cooling at the rate of 10° C./min to 0° C. and then reheating to 200° C. at the rate of 10° C./min. The heat of fusion ΔH can be determined by calculating the total area from integral values of the amount of endothermic energy. The melting temperature Tm can be calculated from the peak value of the exothermic peak. In the case of multiple melting temperature peaks, the highest temperature peak is used for the value of melting temperature Tm. The Model DSC6220 differential scanning calorimeter (Seiko Instruments Inc.), for example, can be used to measure heat of fusion ΔH and melting temperature Tm of the laminated portion A.

The heat of fusion ΔH and melting temperature Tm of the laminated portion A of the exterior material 1a can be measured by, for example, separating the base material layer 11a adhesive layer 12a by dissolving the metal foil layer 13a with an acidic or alkaline solution.

(Condition (2))

When heat sealing during battery production, the exterior material 1a is heat-pressed at a temperature equal to or higher than the melting temperatures of the sealant layer 16a and the adhesive resin layer 15a. Consequently, the resins that form the sealant layer 16a and the adhesive resin layer 15a easily flow around the heat sealed portions, resulting in the risk of the generation of strain at the interface with the heat sealed portions, a decrease in peel strength due to a decrease in thickness of the heat sealed portions, or a decrease in electrical insulating properties. It is necessary to control both the sealant layer 16a and the adhesive resin layer 15a in order to control the fluidity of the resins at the heat sealed portion. In this embodiment of the present invention, the melt viscosity η of the laminated portion A is controlled to be within a specific range.

The melt viscosity η of the laminated portion A under conditions of a shear velocity of $1 \times 10^{-2}$/second and temperature 30° C. higher than the melting temperature Tm of the laminated portion A is 1000 Pa·s to 7000 Pa·s. Heat sealing is required to be carried out at a temperature equal to or higher than the melting temperature Tm of the sealant layer 16a and the adhesive resin layer 15a, and particularly in the case of requiring high peel strength, fusion is required to extend to inside the sealant layer 16a and adhesive resin layer 15a. Consequently, the melt viscosity η is a temperature at which the laminated portion A of the sealant layer 16a and the adhesive resin layer 15a melts sufficiently. A value at a temperature 30° C. higher than the melting temperature Tm is employed. In addition, since the rate at which resin is extruded around the heat sealed portions during heat sealing is extremely slow, a value at a shear velocity of $1 \times 10^{-2}$/second is employed.

If the melt viscosity η is 1000 Pa·s or more, viscosity of the resin at a temperature equal to or higher than the melting temperature Tm is adequately obtained and the flow of resin around the heat sealed portions decreases, thereby making it possible to inhibit the generation of strain at the interface of the heat sealed portions or inhibit the heat sealed portions from becoming excessively thin. If the melt viscosity η is equal to or less than 7000 Pa·s, since resin viscosity can be inhibited from becoming excessively high, molecules of the sealant layer 16a laminated affixed during heat sealing become adequately entangled and adequate peel strength is obtained.

The melt viscosity η of the laminated portion A is preferably 1500 Pa·s to 6500 Pa·s and more preferably 2000 Pa·s to 6000 Pa·s.

The melt viscosity η can be controlled by controlling the molecular weight and molecular weight distribution of the resins used.

The melt viscosity η of the laminated portion A of the exterior material 1a can be measured in the same manner as measuring the heat of fusion ΔH and the melting temperature Tm by, for example, separating the base material layer 11a and the adhesive layer 12a by dissolving the metal foil layer 13a with an acidic or alkaline solution.

The melt viscosity η of the laminated portion A is measured according to the circular parallel plate method using the Model AR2000X dynamic melt viscosity analyzer (TA Instruments, Inc.). Specific measurement conditions consist of using aluminum flat plates having a diameter of 25 mm, setting the gap to 300 μm, and measuring at a shear velocity of $1 \times 10^{-2}$/second and temperature 30° C. higher than the melting temperature Tm.

(Production Method)

The following provides an explanation of a production method of the exterior material 1a. However, the production method of the exterior material 1a is not limited to the method indicated below.

The production method of the exterior material 1a has the three steps (I-1) to (III-1) indicated below:

(I-1) a step for forming the corrosion prevention treated layer 14a on the metal foil layer 13a;

(II-1) a step for laminating the base material 11a through the adhesive resin layer 12a onto the metal foil layer 13a on the opposite surface from the surface on which the corrosion prevention treated layer 14a has been formed; and, (III-1) a step for laminating the sealant layer 16a through the adhesive resin layer 15a on the metal foil layer 13a on the surface of the corrosion prevention treated layer 14a.

Step (I-1):

A corrosion prevention treatment agent is applied to a first surface (one side) of the metal foil layer 13a followed by drying and curing to form the corrosion prevention treated layer 14a. Examples of corrosion prevention treatment agents include a corrosion prevention treatment agent for coating chromate treatment.

There are no particular limitations on the method used to coat the corrosion prevention treatment agent, and examples thereof include gravure coating, gravure reverse coating, roll coating, reverse roll coating, die coating, bar coating, kiss coating and comma coating.

Furthermore, untreated metal foil may also be used for the metal foil layer 13a, and metal foil may be used that has been subjected to wet or dry type degreasing treatment.

Step (II-1):

The base material layer 11a is laminated on the surface of the metal foil layer 13a on the opposite surface from the surface on which the corrosion prevention treated layer 14a has been formed using the adhesive that forms the adhesive layer 12a.

Examples of the lamination method include dry lamination, non-solvent lamination and wet lamination.

In step (II-1), aging treatment may also be carried out within a range of room temperature to 100° C. in order to promote adhesion.

Step (III-1):

The sealant layer 16 is laminated through the adhesive resin that forms the adhesive resin layer 15a on the surface of the corrosion prevention treated layer 14a of a laminate obtained by laminating the base material layer 11a, the adhesive layer 12a, the metal foil layer 13a and the corrosion prevention treated layer 14a in that order.

An example of the method used to laminate the sealant layer 16a consists of extrusion laminating an adhesive resin onto the corrosion prevention treated layer 14a of the aforementioned laminate and then laminating a film that forms the sealant layer 16a obtained by inflation molding or casting. Subsequently, heat treatment (such as aging treatment or thermal lamination) may be carried out for the purpose of improving adhesion between the corrosion with the corrosion prevention treated layer 14a and the adhesive resin layer 15a.

In addition, the sealant layer 16a may also be laminated through the adhesive resin layer 15a by fabricating a multi-layer film obtained by laminating the adhesive resin layer 15a and the sealant layer 16a by inflation molding or casting, and then laminating this multilayer film on the aforementioned laminate by thermal lamination.

The exterior material 1a is obtained according to the previously explained steps (I-1) to (III-1).

Furthermore, the production method of the exterior material 1a is not limited to the method consisting of sequentially carrying out the aforementioned steps (I-1) to (III-1). For example, step (I-1) may be carried out after carrying out step (II-1). In addition, formation of the corrosion prevention treated layer 14a may be carried out in-line during extrusion lamination for laminating the sealant layer 16a.

Embodiment 2-2

Next, an explanation is provided of a lithium ion battery exterior material 2a (to be referred to as "exterior material 2a") as another example of the lithium ion battery exterior material according to a second embodiment of the present invention. The same reference numerals are used to indicate those portions of the exterior material 2a that are the same as those of the exterior material 1a, and explanations thereof are omitted.

Figure 8:
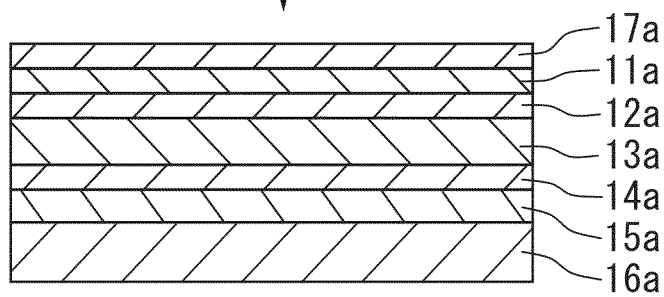
FIG. 8 is a cross-sectional view showing another example of a lithium ion battery exterior material according to a second embodiment of the present invention.

As shown in FIG. 8, a lithium ion battery exterior material 2a of the present embodiment is a laminate obtained by sequentially laminating the adhesive layer 12a, the metal foil layer 13a, the corrosion prevention treated layer 14a, the adhesive resin layer 15a and the sealant layer 16a on a first surface (one surface) of the base material layer 11a, and laminating a protective layer 17a on a second surface (other surface) of the base material layer 11a.

(Protective Layer 17a)

The protective layer 17a is formed on the surface of the base material layer 11a on the opposite surface from the metal foil layer 13a corresponding to the desired properties. Formation of the protective layer 17a makes it possible to scratch resistance and chemical resistance or improve moldability and the like by imparting functions such as slippage and deep drawing.

Examples of materials of the protective layer 17a include polyolefin resins, polyacrylic resins, polyurethane resins, polyester resins, epoxy resins, fluororesins, silicon resins, alkyd resins, melamine resins, siloxane resins, amide resins, imide resins, cellulose resins and vinyl acetate resins.

A flame retardant, slipping agent, anti-blocking agent, antioxidant, photostabilizer or pressure-sensitive adhesion promoter may be dispersed in the protective layer 17a or may be applied to the surface thereof.

The thickness of the protective layer 17a is preferably 0.01 μm to 50 μm and more preferably 0.1 μm to 30 μm from the viewpoints of conformability and processability.

(Production Method)

The exterior material 2a can be produced in the same manner as the exterior material 1a with the exception of providing the protective layer 17a on the base material layer 11a on the opposite surface from the surface laminated with the metal foil layer 13a.

Examples of methods for forming the protective layer 17a include a method consisting of diluting an adhesive with a solvent and forming an adhesive layer by a known method such as coating, dipping or spraying to form a film that forms the protective layer 17a, and a method that uses extrusion molding.

There are no particular limitations on the order in which the protective layer 17a is formed.

Embodiment 2-3

Next, an explanation is provided of a lithium ion battery exterior material 3a (to be referred to as "exterior material 3a") as another example of the lithium ion battery exterior material according to a second embodiment of the present invention. The same reference numerals are used to indicate those portions of the exterior material 3a that are the same as those of the exterior material 1a, and explanations thereof are omitted.

Figure 9:
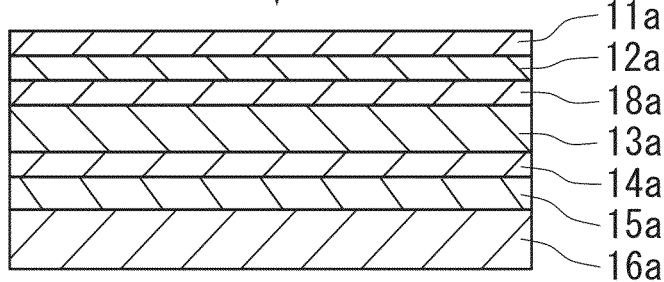
FIG. 9 is a cross-sectional view showing another example of a lithium ion battery exterior material according to a second embodiment of the present invention.

As shown in FIG. 9, a lithium ion battery exterior material 3a of the present embodiment is a laminate obtained by sequentially laminating the adhesive layer 12a, a molding improvement layer 18a, the metal foil layer 13a, the corrosion prevention treated layer 14a, the adhesive resin layer 15a and the sealant layer 16a on a first surface (one surface) of the base material layer 11a.

(Molding Improvement Layer 18a)

The molding improvement layer 18a is a layer that fulfills the role of improving moldability of the exterior material 3a.

Examples of components that compose the molding improvement layer 18a include one or more types of resins (X) selected from the group consisting of polyolefin resins, polyether resins, polyester resins, polyurethane resins, polyvinyl resins, polystyrene resins, polyacrylic resins, polyamide resins, phenolic resins, melamine resins, epoxy resins, unsaturated polyester resins, silicone resins, polysulfone resins, polycarbonate resins, polyallyl resins and ionomer resins, and one or more types of coupling agents (Y) selected from the group consisting of silane coupling agents, titanate coupling agents, aluminate coupling agents and zirconate coupling agents. The aforementioned resin (X) may be a modified resin. In addition, the aforementioned resin (X) and coupling agent (Y) may be used alone or in combination.

Examples of polyolefin resins used in the molding improvement layer 18a include polyethylene, polypropylene, polybutene, α-polyolefins and polymethylpentene.

Examples of polyether resins include polyether ketone and polyether ether ketone.

Examples of polyester resins include polyethylene terephthalate, polyethylene naphthalate, polytrimethylene terephthalate, polybutylene terephthalate and polybutylene naphthalate.

Examples of polyurethane resins include poly-n-butyl isocyanate, poly-n-hexyl isocyanate and 2,6-polyurethane.

Examples of polyvinyl resins include ethylene-vinyl acetate copolymer, polyvinyl chloride, vinyl styrene and vinyl acetate.

Examples of polystyrene resins include styrene-acrylonitrile copolymer, acrylonitrile-butadiene-styrene resin and high-impact polystyrene.

Examples of polyacrylic resins include polymethyl methacrylate, ethylene-methyl acrylate copolymer and polycarboxylic acid.

Examples of phenolic resins include random novolac resin, high-ortho novolac resin, alkaline resol resin, ammonia resol resin and benzyl ether resol resin.

Examples of polyamide resins include Nylon 6, Nylon 11, Nylon 12, Nylon 66, Nylon 610 and Nylon 612.

Examples of melamine resins include guanamine and aniline

Examples of epoxy resins include glycidyl ester resin, glycidyl amine resin and alicyclic resin.

Examples of unsaturated polyester resins include orthophthalic acid resin, isophthalic acid resin, terephthalic acid resin, dicyclo resin, aliphatic saturated acid resin and bisphenol resin.

Examples of silicone resins include polydimethylsiloxane, polydiethylsiloxane and polymethylphenylsiloxane.

Examples of polysulfone resins include polyethersulfone, polysulfone, polyallylsulfone and allylpolyphenylsulfone.

Examples of polycarbonate resins include polytetramethylene carbonate, polypentamethylene carbonate and polyhexamethylene carbonate.

Examples of polyallyl resins include polyallylamine, polyallylamide, polyallylether and polyallyletherketone.

Examples of ionomer resins include those obtained by copolymerizing an ethylene-based, styrene-based or elastomer-based resin or ethylene-carboxylic acid copolymer with an ion source such as Na, K, Li or Zn.

Examples of silane coupling agents used in the molding improvement layer 18a include trimethoxysilane, tetramethoxysilane, diphenyldimethoxysilane and diphenyldiethoxysilane.

Examples of titanate coupling agents include trimethoxytitanate, tetramethoxytitanate, tetrapropoxytitanate, chlorotrimethoxytitanate, methyltriethoxytitanate, diethyldiethoxytitanate and phenyltrimethoxytitanate.

Examples of aluminate coupling agents include trimethoxyaluminate, triethoxyaluminate, tripropoxyaluminate and tetraethoxyaluminate.

Examples of zirconate coupling agents include trimethoxyzirconate, tetramethoxyzirconate, tetrapropoxyzirconate, chlorotriethoxyzirconate, ethyltrimethoxyzirconate and phenyltrimethoxyzirconate.

Adhesive strength between the base material layer 11a and the metal foil layer 13a is increased by providing the molding improvement layer 18a between the base material layer 11a and the metal foil layer 13a in the exterior material 3a. Thus, even if tension and compressive stress is imparted to the exterior material 3a during cold forming, adhesion between the base material layer 11a and the metal foil layer 13a can be adequately secured. As a result, superior moldability is obtained. In other words, by inhibiting separation of the base material layer 11a and the metal foil layer 13a, rupturing of the metal foil layer 13a from that portion and the formation of pinholes can be inhibited.

In addition, the molding improvement layer 18a also functions as a buffer layer between the base material layer 11a and the metal foil layer 13a. In other words, since stress acting during molding and rupturing of the metal foil layer 13a during molding can be inhibited by the molding improvement layer 18a, superior moldability is obtained. In the case of having formed the molding improvement layer 18a with the resin (X) in particular, the effect as a buffer layer during molding is more favorably demonstrated. On the other hand, in the case of having formed the molding improvement layer 18a with the coupling agent (Y), adhesion between the metal foil layer 13a and the adhesive layer 12a increases and moldability improves.

The thickness of the molding improvement layer 18a is preferably 20 nm to 50 μm.

In addition, in the case of the coupling agent (Y) and a comparatively hard component (such as a polystyrene resin or epoxy resin), the thickness of the molding improvement layer 18a is more preferably 20 nm to 500 nm. In the case of imparting a function that alleviates stress by using a miscible rich in elasticity for the molding improvement layer 18a (such as a polyurethane resin or silicone resin), the thickness of the molding improvement layer 18a is more preferably 500 nm to 50 μm.

The exterior material 2a is more preferable than the exterior material 1a from the viewpoint of having superior moldability due to the molding improvement layer 18a.

(Production Method)

The exterior material 3a can be produced in the same manner as the exterior material 1a with the exception of forming the molding improvement layer 18a on the metal foil layer 13a on the opposite surface from the surface on which the corrosion prevention treated layer 14a is formed, followed by laminating the base material layer 11a through the adhesive layer 12a.

The molding improvement layer 18a can be formed by, for example, suitably diluting the aforementioned resin (X) and coupling agent (Y) with a solvent such as water or organic solvent, applying the coated liquid, and coating onto the metal foil layer 13a on the opposite surface from the corrosion prevention treated layer 14a by a known method such as dipping or spraying followed by suitably drying. A known coating method as exemplified in the aforementioned step (I-1) can be employed.

In addition, in the case of using the resin (X), the molding improvement layer 18a may also be formed by a method such as extrusion by melting at a temperature higher than the melting point of the resin (X).

Embodiment 2-4

Next, an explanation is provided of a lithium ion battery exterior material 4a (to be referred to as "exterior material 4a") as another example of the lithium ion battery exterior material according to a second embodiment of the present invention. The same reference numerals are used to indicate those portions of the exterior material 4a that are the same as those of the exterior material 1a, and explanations thereof are omitted.

Figure 10:
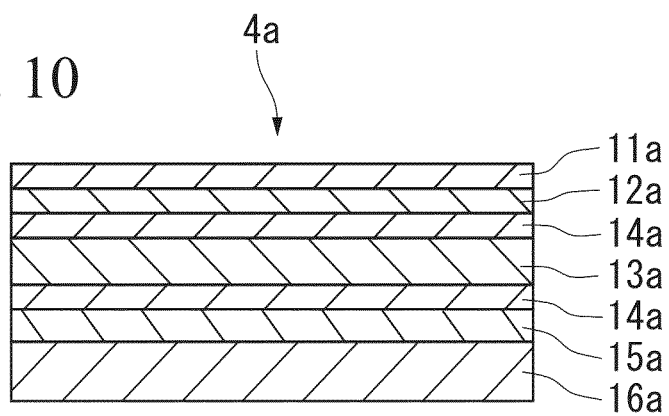
FIG. 10 is a cross-sectional view showing another example of a lithium ion battery exterior material according to a second embodiment of the present invention.
Figure 11:
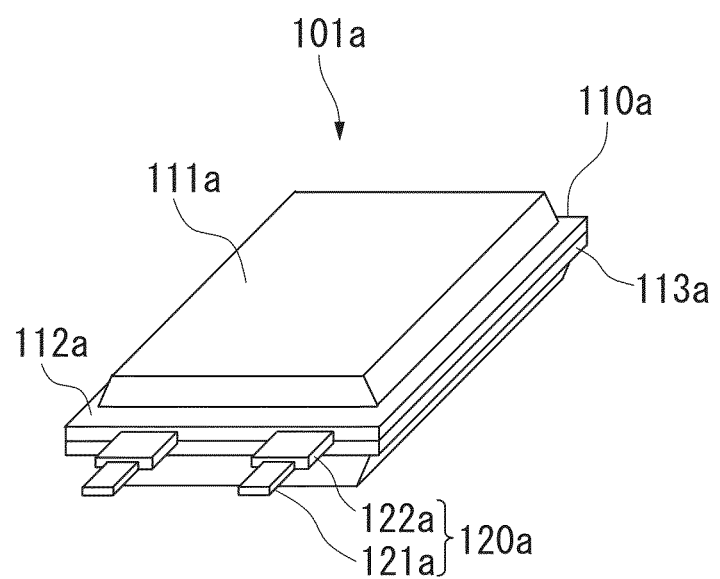
FIG. 11 is a perspective view showing an example of a lithium ion battery.

As shown in FIG. 10, the exterior material 4a of the present embodiment is a laminate obtained by sequentially laminating the adhesive layer 12a, the corrosion prevention treated layer 14a, the metal foil layer 13a, the corrosion prevention treated layer 14a, the adhesive resin layer 15a and the sealant layer 16a on a first surface (one surface) of the base material layer 11a. The exterior material 4a is the same as the exterior material 1a with the exception of forming the corrosion prevention treated layer 14a on both sides of the metal foil layer 13a.

(Production Method)

The exterior material 3a can be produced in the same manner as the exterior material 1a with the exception of providing the corrosion prevention treated layer 14a on both sides of the metal foil layer 13a.

Each of the corrosion prevention treated layers 14a on both sides of the metal foil layer 13a may be formed sequentially or both may be formed at one time.

Since the laminated portion A consisting of the sealant layer 16a and adhesive resin layer 15a of the lithium ion battery exterior materials of the present invention explained above satisfy the aforementioned conditions (1) and (2), interface strain around heat sealed portions caused by resin flow during heat sealing can be inhibited, adequate peel strength is obtained, and moisture permeation from seal end surfaces can be stably reduced over a long period of time.

Furthermore, the lithium ion battery exterior material according to the embodiments of the present invention is not limited to the previously described exterior materials 1a to 4a. For example, although the exterior material 3a is in a form in which the molding improvement layer 18a and the adhesive layer 12a are provided separately, the molding improvement layer 18a may also be allowed to serve as an adhesive layer without providing the adhesive layer 12a. More specifically, a molding improvement layer that also serves as an adhesive layer may also be formed by using a mixture that contains at least one of the resin (X) and coupling agent (Y) that form the molding improvement layer 18a and an adhesive for dry lamination. In addition, a molding improvement layer that also serves as an adhesive layer may also be formed by using heat-fusible resin for the resin (X).

In addition, in the exterior material 3a, although the laminated configuration of the molding improvement layer 3a and the adhesive layer 12a is obtained by sequentially laminating the molding improvement layer 18a and the adhesive layer 12a in that order on the base material layer 11a, the lamination order may also consist of the adhesive layer 12a followed by the molding improvement layer 18a, or the lamination order may consist of the molding improvement layer 18a followed by the adhesive layer 12a followed by the molding improvement layer 18a.

A lithium ion battery that uses the lithium ion battery outer cover material according to the embodiments of the present invention can be produced by a known method with the exception of using the lithium ion battery exterior material according to the embodiments of the present invention. For example, a lithium ion battery can be obtained in the manner described below.

A recess portion is formed in the lithium ion battery exterior material according to the embodiments of the present invention by cold forming, this exterior material is then folded back to align the sealant layers to as to be facing each other, a positive electrode, negative electrode, separator and tabs connected to the positive electrode and negative electrode are housed within the recess portion, and two sides of the exterior material are heat-sealed in a state in which the tab leads are led out by sandwiching between the sealant layers. Subsequently, electrolytic solution is injected through the remaining side in a vacuum followed by finally sealing the inside by heat-sealing the remaining side to obtain a lithium ion battery.

Furthermore, a lithium ion battery that uses the lithium ion battery exterior material according to the embodiments of the present invention is not limited to that produced according to the aforementioned method.

EXAMPLES

Although the following provides a detailed explanation of embodiments of the present invention through examples thereof, the present invention is not limited by the following descriptions.

[Materials Used]

Raw materials used in the present embodiment are indicated below.

(Base Material 11a)

Base Material A-1: Biaxially oriented polyamide film (Emblem ON, Unitika Ltd., thickness: 25 μm)

(Adhesive Layer 12a)

Adhesive B-1: Polyurethane-based adhesive (Mitsui Chemicals Inc., A525/A50, thickness: 4 μm)

(Aluminum Foil Layer 13a)

Aluminum Foil C-1: Soft aluminum foil (Toyo Aluminum K.K., Material 8079, thickness: 40 μm)

(Corrosion Prevention Treated Layer 14a)

Treatment Agent D-1: Treatment agent for chromium coating treatment consisting mainly of trivalent chromium, phosphoric acid and acrylic resin (Adhesive Resin Layer 15a)

E-1: Maleic anhydride-modified polypropylene (thickness: 20 μm, random polypropylene (70% by weight)+propylene-based elastomer (30% by weight))

E-2: Maleic anhydride-modified polypropylene (thickness: 20 μm, random polypropylene (100% by weight))

E-3: Maleic anhydride-modified polypropylene (thickness: 20 μm, random polypropylene (100% by weight))

E-4: Maleic anhydride-modified polypropylene (thickness: 20 μm, block polypropylene (100% by weight))

E-5: Maleic anhydride-modified polypropylene (thickness: 20 μm, random polypropylene (80% by weight)+propylene-based elastomer (20% by weight))

E-6: Maleic anhydride-modified polypropylene (thickness: 20 μm, block polypropylene (100% by weight))

(Sealant Layer 16a)

F-1: Polypropylene (thickness: 30 μm, random polypropylene (70% by weight)+propylene-based elastomer (30% by weight))

F-2: Polypropylene (thickness: 30 μm, block polypropylene (100% by weight))

F-3: Polypropylene (thickness: 30 μm, block polypropylene (100% by weight))

F-4: Polypropylene (thickness: 30 μm, homopolypropylene (100% by weight))

F-5: Polypropylene (thickness: 30 μm, random polypropylene (80% by weight)+propylene-based elastomer (20% by weight))

F-6: Polypropylene (thickness: 30 μm, random polypropylene (100% by weight))

[Fabrication Method of Lithium Ion Battery Outer Cover Material]

Treatment agent D-1 was applied to metal foil C-1 with a bar coater followed by subjecting to baking treatment in a drying unit at 180° C. to form the corrosion prevention treated layer 14a having a dry thickness of 30 nm. Next, base film A-1 was laminated into a surface (second surface) of the metal foil layer 13a on the opposite surface from the corrosion prevention treated layer 14a by dry lamination using adhesive B-1 followed by aging for 7 days at 40° C. to thermal crosslink the adhesive B-1 and laminate the base material layer 11a through the adhesive layer 12a (thickness: 4 μm). Next, the adhesive resin layer 15a and the sealant layer 16a were extruded from an extrusion molding machine at a thickness of 20 μm and 30 μm, respectively, and laminated into a laminate consisting of the corrosion prevention treated layer 14a, metal foil layer 13a, adhesive layer 12a and base material layer 11a. Subsequently, the laminated was subjected to thermocompression with a thermal laminator under conditions of 180° C., 4 kg/cm$^2$ and 2 m/min followed by cooling to obtain the exterior material 1a exemplified in FIG. 7.

[Heat of Fusion ΔH and Melting Temperature Tm]

The heat of fusion ΔH and melting temperature Tm of the laminated portion A were measured by dissolving the metal foil layer 13a in sodium hydroxide solution and separating the base material layer 11a and the adhesive layer 12a, followed by collecting 3 mg to 5 mg of sample, placing the sample in an aluminum container and sealing therein, and measuring under conditions of a heating rate of 10° C./minute using the Model DSC6220 differential scanning calorimeter (Seiko Instruments Inc.). The heat of fusion ΔH was determined by calculating the total area from integral values of the amount of endothermic energy. The melting temperature Tm was calculated from the peak value of the exothermic peak. In the case of multiple melting temperature peaks, the highest temperature peak was used for the value of melting temperature Tm.

[Melt Viscosity η]

Melt viscosity η of the laminated portion A was measured by dissolving the metal foil layer 13a in an aqueous sodium hydroxide solution and separating the base material layer 11a and the adhesive layer 12a, followed by measuring according to the circular parallel plate method using the Model AR2000X dynamic melt viscosity analyzer (TA Instruments, Inc.). Flat plates having a diameter of 25 mm were used for measurement, the gap was set to 200 μm, and measurement was carried out at a shear velocity of $1 \times 10^{-2}$/second and temperature 30° C. higher than the melting temperature Tm.

[Evaluation Methods]

(Moisture Permeation)

A test piece measuring 240 mm long×70 mm wide was cut out from the exterior material 1a obtained in each example, and the test piece was folded back so as to align the short sides to obtain a sample pouch by heat sealing those portions where the long ends on both sides were aligned at a seal width of 3 mm. Subsequently, 3 mg of an electrolytic solution (consisting of ethylene carbonate, dimethyl carbonate and diethyl carbonate at a weight ratio of 1:1:1) having a moisture content of 20 ppm or less were injected through the opening in the sample pouch, and the opening was sealed by heat sealing at a seal width of 3 mm to fabricate a sample for measuring moisture permeation (120 mm long×70 mm wide). After allowing the fabricated sample to stand undisturbed for 4 weeks in an environment at a temperature of 60° C. and humidity of 90%, the moisture content of the electrolytic solution was measured with a Karl Fischer tester, and the moisture content of the electrolytic solution before testing was subtracted to calculate the amount of moisture than penetrated through the seal end surfaces. The evaluation was carried out in the form of a relative evaluation based on a value of 100 for the amount of moisture that penetrated through the seal end surfaced in Example 2-1.

Good: Relative moisture content of 80% or more
Bad: Relative moisture content of less than 80%

(Moldability)

A test piece measuring 200 mm long×100 mm wide was cut out from the exterior material obtained in each example, and the test piece was subjected to cold forming at a depth of 6 mm in the form of a strip measuring 100 mm long×50 mm wide using a cold forming apparatus enabling draw depth to be adjusted up to 10 mm, followed by evaluation of the presence or absence of rupturing. The evaluation was carried out using the following criteria.

Good: Rupturing did not occur
Bad: Rupturing occurred (Overall Evaluation (1))

An overall evaluation was carried out using the following criteria.

Good: Evaluation results of "Good" for both moisture permeation and moldability
Bad: Evaluation result of "Bad" for either moisture permeation or moldability (Evaluation of Interface Strain Around Heat Sealed Portions)

Two test pieces measuring 100 mm long×30 mm wide were cut out from the exterior material obtained in each example, and the test pieces were heat-sealed at a temperature 30° C. higher than the melting temperature of the laminated portion A under conditions of a contact pressure of 0.1 MPa for 3 seconds. Subsequently, the heat sealed portions were separated followed by an evaluation of interface strain. The evaluation was carried out using the following criteria.

Good: Strain caused by resin flow occurring at interface of less than 1 mm
Bad: Strain caused by resin flow occurring at interface of 1 mm or more (Peel Strength)

Two test pieces measuring 100 mm long×30 mm wide were cut out from the exterior material obtained in each example, and the test pieces were heat-sealed at a temperature 30° C. higher than the melting temperature of the laminated portion A under conditions of a contact pressure of 0.1 MPa for 3 seconds. Subsequently, both ends of the sample were cut to make the size of the sample to be 100 mm long×15 mm wide followed by measurement of peel strength (units: N/15 mm) at a tension speed of 300 mm/min Good: Peel strength of 80 N/15 mm or more
Bad: Peel strength of less than 80 N/15 mm (Overall Evaluation (2))

An overall evaluation was carried out using the following criteria.

Good: Evaluation results of "Good" for both interface strain around heat sealed portions and peel strength
Bad: Results other than that indicated above Examples 2-1 and 2-2 and Comparative Examples 2-1 and 2-2

Exterior materials were fabricated according to the aforementioned fabrication method using the materials shown in Table 4 followed by evaluations of their moisture permeation and moldability. The results are shown in Table 4.

TABLE 4

|  |  | Ex. 2-1 | Ex. 2-2 | Comp. Ex. 2-1 | Comp. Ex. 2-2 |
|---|---|---|---|---|---|
| Base material layer 11a | | A-1 | A-1 | A-1 | A-1 |
| Adhesive layer 12a | | B-1 | B-1 | B-1 | B-1 |
| Metal foil layer 13a | | C-1 | C-1 | C-1 | C-1 |
| Corrosion prevention treated layer 14a | | D-1 | D-1 | D-1 | D-1 |
| Adhesive resin layer 15a | | E-2 | E-3 | E-1 | E-4 |
| Sealant layer 16a | | F-2 | F-3 | F-1 | F-4 |
| Laminated portion A | Heat of fusion ΔH (J/g) | 46 | 53 | 13 | 87 |
| | Melting temp. (° C.) | 162 | 161 | 137 | 161 |
| | Melt viscosity η (Pa·s) | 4200 | 3500 | 3800 | 3300 |
| Evaluation | Moisture permeation | 100(Good) | 94(Good) | 127(Good) | 78(Bad) |
| | Moldability | Good | Good | Good | Bad |
| | Overall evaluation(1) | Good | Good | Bad | Bad |

As shown in Table 4, Examples 2-1 and 2-2, which used exterior materials according to embodiments of the present invention in which the laminated portion A satisfied conditions (1) and (2), demonstrated little moisture permeation and superior moldability. In addition, when comparing Examples 2-1 and 2-2, a larger heat of fusion ΔH of the laminated portion A resulted in less moisture permeation.

On the other hand, Comparative Example 2-1, which used an exterior material in which the heat of fusion ΔH of the laminated portion A was less than the lower limit value of condition (1), demonstrated low crystallinity of the laminated portion A and a high level of moisture permeation. In addition, Comparative Example 2-2, in which the heat of fusion ΔH of the laminated portion A exceeded the upper limit value of condition (1), demonstrated high crystallinity of the laminated portion A and decreased flexibility, thereby resulting in inferior moldability as compared with Examples 2-1 and 2-2.

Examples 2-3 and 2-4 and Comparative Examples 2-3 and 2-4

Exterior materials were fabricated according to the aforementioned fabrication method using the materials shown in Table 5, followed by an evaluation of interface strain around heat sealed portions and peel strength. The results are shown in Table 5.

TABLE 5

|  |  | Ex. 2-3 | Ex. 2-4 | Comp. Ex. 2-3 | Comp. Ex. 2-4 |
|---|---|---|---|---|---|
| Base material layer 11a | | A-1 | A-1 | A-1 | A-1 |
| Adhesive layer 12a | | B-1 | B-1 | B-1 | B-1 |
| Metal foil layer 13a | | C-1 | C-1 | C-1 | C-1 |
| Corrosion prevention treated layer 14a | | D-1 | D-1 | D-1 | D-1 |
| Adhesive resin layer 15a | | E-2 | E-3 | E-5 | E-6 |
| Sealant layer 16a | | F-2 | F-3 | F-5 | F-6 |
| Laminated portion A | Heat of fusion ΔH (J/g) | 46 | 53 | 24 | 78 |
| | Melting temp. (° C.) | 162 | 161 | 136 | 162 |
| | Melt viscosity η (Pa·s) | 4200 | 3500 | 900 | 7200 |
| Evaluation | Peel strength (N/15 mm) | 112(Good) | 107(Good) | 87(Good) | 64(Bad) |
| | Interface strain | Good | Good | Bad | Good |
| | Overall evaluation(2) | Good | Good | Bad | Bad |

As shown in Table 5, Examples 2-3 and 2-4, which used exterior materials according to embodiments of the present invention in which the laminated portion A satisfied conditions (1) and (2), demonstrated little interface strain around heat sealed portions and high peel strength.

On the other hand, Comparative Example 2-3, which used an exterior material in which melt viscosity η was less than the lower limit value of condition (2), demonstrated a large flow of resin outside the heat sealed portions and the generation of strain at the interface. In addition, although Comparative Example 2-4, which used an exterior material in which melt viscosity η exceeded the upper limit value of condition (2), was resistant to decreases in melt viscosity during heat sealing, it demonstrated poor resin wettability and did not allow the obtaining of adequate peel strength.

Third Embodiment

The following provides a detailed explanation of a third embodiment of the present invention. The third embodiment of the present invention is a lithium ion battery exterior material that uses an aluminum laminate obtained by sequentially laminating at least a base material film layer, adhesive layer, aluminum layer and adhesive resin layer, and by incorporating a miscible elastomer component in the adhesive resin layer, results in a lithium ion battery exterior material having an effect that inhibits a whitening phenomenon during forming and heat resistance.

Figure 12:
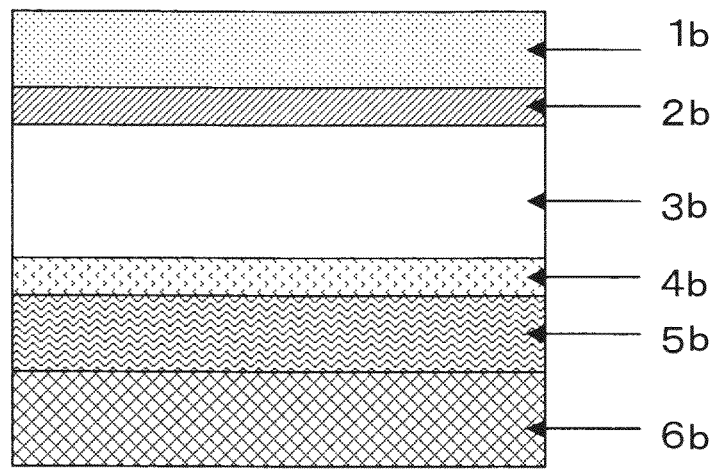
FIG. 12 is a cross-sectional view of a lithium ion battery exterior material according to a third embodiment of the present invention.
Figure 13:
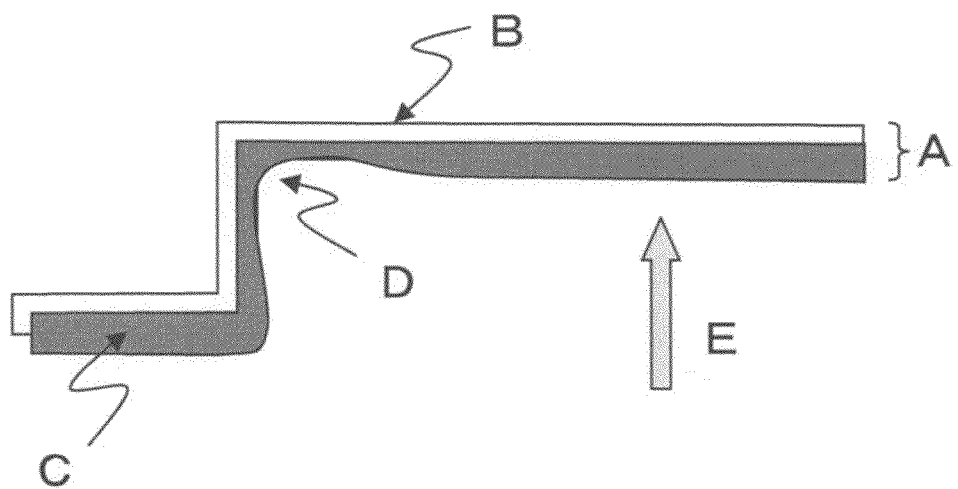
FIG. 13 is a cross-sectional view showing an example of changes in thickness during deep-drawing.

FIG. 12 shows a multilayer configuration including a corrosion prevention treated layer on an aluminum layer as an example according to the third embodiment of the present invention. For example, the lithium ion battery exterior material according to the third embodiment of the present invention is composed of a base material film 1b, an adhesive layer 2b, an aluminum layer 3b, a corrosion prevention treated layer 4b, an adhesive resin layer 5b and a sealant layer 6b. Although the following provides a stepwise description of a production method of this lithium ion battery exterior material, the production method is not limited thereto.

<Base Material Film Layer>

The base material film layer 1b is provided for the purpose of imparting heat resistance in the sealing step during lithium battery production and providing countermeasures against the formation of pinholes that can occur during processing and distribution, and an insulating resin layer is used preferably. Examples of such resin films that can be used include single layer or multilayer films of two or more layers of drawn or non-drawn films such as polyester film, polyamide film or polypropylene film. A film having a thickness of 6 µm or more is preferable for improving pinhole resistance and insulating properties, while that having a thickness of 40 µm or less is preferable in consideration of formability, and that having a thickness of 10 µm to 25 µm is used preferably.

<Adhesive Layer>

An example of the adhesive layer 2b is a polyurethane resin obtained by allowing an isocyanate compound having two or more functional groups to act on a primary agent such as a polyester polyol, polyether polyol, acrylic polyol or carbonate polyol.

An example of a polyester polyol is that obtained by polymerization of a dibasic acid and a diol compound.

Examples of the aforementioned dibasic acid include one or more compounds selected from the group consisting of aliphatic dibasic acids such as succinic acid, glutaric acid, adipic acid, pimelic acid, suberic acid, azelaic acid, sebacic acid or brazilic acid, and aromatic dibasic acids such as isophthalic acid, terephthalic acid or naphthalene dicarboxylic acid.

Examples of the aforementioned diol compound include one or more compounds selected from the group consisting of aliphatic diols such as ethylene glycol, propylene glycol, butanediol, neopentyl glycol, methyl pentanediol, hexanediol, heptanediol, octanediol, nonanediol, decanediol or dodecanediol, alicyclic diols such as cyclohexanediol or hydrogenated xylylene glycol, and aromatic diols such as xylylene glycol.

In addition, polyester polyols, in which hydroxyl groups on both ends of the polyester polyol have been substituted with an isocyanate compound, may be used for the polyester polyol, examples of which include an isocyanate compound alone or at least one compound selected from the group consisting of 2,4-tolylene diisocyanate, 2,6-tolylene diisocyanate, xylylene diisocyanate, 4,4'-diphenylmethane diisocyanate, methylene diisocyanate, isopropylene diisocyanate, lysine diisocyanate, 2,2,4-trimethylhexamethylene diisocyanate, 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate and isopropylidene dicyclohexyl-4,4'-diisocyanate. Other examples of these polyester polyols include polyester urethane polyols that have undergone chain elongation using an adduct, biuret or isocyanurate form composed of these isocyanate compounds.

Examples of polyether polyols that can be used include ether-based polyols such as polyethylene glycol or polypropylene glycol, and polyether urethane polyols obtained by allowing a chain extender in the form of the aforementioned isocyanate compounds to act on the aforementioned polyether polyols.

Examples of acrylic polyols that can be used include acrylic resins obtained by polymerization using the previously described acrylic monomers.

Carbonate polyols can be obtained by reacting a carbonate compound with a diol.

Examples of carbonate compounds that can be used include dimethyl carbonate, diphenyl carbonate and ethylene carbonate. Examples of diols that can be used include aliphatic diols such as ethylene glycol, propylene glycol, butanediol, neopentyl glycol, methyl pentanediol, hexanediol, heptanediol, octanediol, nonanediol, decanediol or dodecanediol, alicyclic diols such as cyclohexanediol or hydrogenated xylylene glycol, and aromatic diols such as xylylene glycol. Carbonate polyols in which one type or a mixture of two or more types of these carbonate compounds and diols are used, or polycarbonate urethane polyols, which have been subjected to elongation with the aforementioned isocyanate compounds, can also be used. One type of these various types of polyols may be used alone or two or more types may be used as a blend corresponding to the required functions and performance.

The use of the aforementioned polyisocyanate compound as a curing agent in these primary agents enables them to be used as polyurethane-based adhesives.

Moreover, a carbodiimide compound, oxazoline compound, epoxy compound, phosphorous compound or silane coupling agent and the like may be incorporated to promote adhesion.

Examples of carbodiimide compounds include N,N'-di-o-tolylcarbodiimide, N,N'-diphenylcarbodiimide, N,N'-di-2,6-dimethylphenylcarbodiimide, N,N'-bis(2,6-diisopropylphenyl) carbodiimide, N,N'-dioctyldecylcarbodiimide, N-tolyl-N'-cyclohexylcarbodiimide, N,N'-di-2,2-di-t-butylphenylcarbodiimide, N-triyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide and N,N'-di-p-tolylcarbodiimide.

Examples of oxazoline compounds include monooxazoline compounds such as 2-oxazoline, 2-methyl-2-oxazoline, 2-phenyl-2-oxazoline, 2,5-dimethyl-2-oxazoline or 2,4-diphenyl-2-oxazoline; and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline) or 2,2'-(1,4-phenylene)-bis(2-oxazoline).

Similarly, examples of epoxy compounds include diglycidyl ethers of aliphatic diols such as 1,6-hexanediol, neopentyl glycol or polyalkylene glycol; polyglycidyl ethers of aliphatic polyols such as sorbitol, sorbitan, polyglycerol, pentaerythritol, diglycerol, glycerol or trimethylolpropane; polyglycidyl ethers of alicyclic diols such as cyclohexane dimethanol; diglycidyl esters or polyglycidyl esters of aliphatic and aromatic polyvalent carboxylic acids such as terephthalic acid, isophthalic acid, naphthalene dicarboxylic acid, trimellitic acid, adipic acid or sebacic acid; diglycidyl ethers or polyglycidyl ethers of polyvalent phenols such as resorcinol, bis-(p-hydroxyphenyl)methane, 2,2-bis-(p-hydroxyphenyl) propane, tris-(p-hydroxyphenyl)methane or 1,1,2,2-tetrakis(p-hydroxyphenyl)ethane; N-glycidyl derivatives of amines such as N,N'-diglycidyl aniline, N,N,N-diglycidyl toluidine or N,N,N',N'-tetraglycidyl-bis-(p-aminophenyl)methane; triglycidyl derivatives of aminophenols; and triglycidyltris(2-hydroxyethyl)isocyanurate, triglycidyl isocyanurate, ortho-cresol epoxies and phenol novolac epoxies.

Examples of phosphorous-based compounds include tris (2,4-di-t-butylphenyl) phosphite, tetrakis(2,4-di-t-butylphenyl)4,4'-biphenylene phosphonite, bis(2,4-di-t-butylphenyl) pentaerythritol-di-phosphite, bis(2,6-di-t-butyl-4-methylphenyl)pentaerythritol-di-phosphite, 2,2-methylenebis(4,6-di-t-butylphenyl)octyl phosphite, 4,4'-butylidene-bis(3-methyl-6-t-butylphenyl-di-tridecyl) phosphite, 1,1,3-tris(2-methyl-4-ditridecylphosphite-5-t-butyl-phenyl)butane, tris(mixed mono- and di-nonylphenyl) phosphite, tris(nonylphenyl)phosphite and 4,4'-isopropylidenebis(phenyl-dialkylphosphite).

Examples of silane coupling agents that can be used include various types of silane coupling agents such as vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane or N-β(aminoethyl)-γ-aminopropyltrimethoxysilane. In addition, various types of other additives and stabilizers may be incorporated according to the performance required of the adhesive.

<Aluminum Layer>

The aluminum layer 3b is used at a thickness within the range of 9 μm to 200 μm and preferably 15 μm to 100 μm in consideration of bather properties, pinhole resistance and processability. In addition, although ordinary soft aluminum foil can be used for the material thereof, aluminum foil having an iron content within the range of 0.1% by weight to 9.0% by weight and preferably 0.5% by weight to 2.0% by weight is used preferably from the viewpoints of imparting greater pinhole resistance and extendability during forming. If the iron content is less than 0.1% by weight, pinhole resistance and extendability cannot be adequately imparted, while if the iron content exceeds 9.0% by weight, flexibility is impaired.

Aluminum foil that has been subjected to degreasing treatment is used preferably. Although degreasing treatment has been partially described in the following section on the corrosion prevention treated layer, the degreasing process is broadly classified into a wet type degreasing treatment and a dry type degreasing treatment.

Examples of the wet type degreasing treatment include the previously described acid degreasing and alkaline degreasing. An example of a method used for acid degreasing uses an inorganic acid such as sulfuric acid, nitric acid, hydrochloric acid or hydrofluoric acid or that obtained by mixing these inorganic acids. In addition, there are also cases in which various types of metal salts serving as supply sources of Fe ions or Ce ions and the like are incorporated as necessary from the viewpoint of improving aluminum etching effects.

An example of alkaline degreasing involves the use of a strong etching type degreasing treatment of base such as sodium hydroxide, and there are also cases in which a weak base or surfactant is incorporated. This degreasing and etching are carried out by immersion or spraying.

An example of a method for dry type degreasing treatment is a method carried out in a step in which aluminum is subjected to annealing treatment. In addition, other examples of this degreasing treatment include flame treatment and corona treatment. Moreover, another example of degreasing treatment consists of oxidatively decomposing and removing contaminants with active oxygen generated by irradiating with ultraviolet light of a specific wavelength. Degreasing treatment may be carried out on one surface or on both surfaces of the aluminum foil, and there are no particular restrictions thereon.

<Corrosion Prevention Treated Layer>

The corrosion prevention treated layer 4b according to this embodiment of the present invention is provided for the purpose of preventing corrosion of the aluminum foil. Here, examples of layers provided for the purpose of preventing corrosion of aluminum include layers subjected to degreasing treatment, hot water modification treatment, anodic oxidation treatment, chemical conversion treatment or a combination thereof.

Examples of degreasing treatment include acid degreasing and alkaline degreasing, and examples of acid degreasing include methods using an inorganic acid such as sulfuric acid, nitric acid, hydrochloric acid or hydrofluoric acid either alone or as a mixture thereof. In addition, by using an acid degreasing agent obtained by dissolving a fluorine-containing compound such as monosodium ammonium bifluoride with the aforementioned inorganic acids for acid degreasing, in addition to obtaining aluminum degreasing effects, fluorides of aluminum in a passive state can be formed, which are effective in terms of hydrofluoric acid resistance. Examples of alkaline degreasing include methods using sodium hydroxide and the like.

Examples of hot water modification treatment include boehmite treatment consisting of immersing aluminum foil in boiling water containing triethanolamine. An example of anodic oxidation treatment is alumite treatment.

Examples of chemical conversion treatment include chromate treatment, zirconium treatment, titanium treatment, vanadium treatment, molybdenum treatment, calcium phosphate treatment, strontium hydroxide treatment, cerium treatment, ruthenium treatment and various types of chemical conversion treatment composed of mixed phases thereof.

This corrosion prevention treated layer may be a single layer or composed of multiple layers. The aforementioned degreasing treatment is preferably carried out prior to the hot water modification treatment, anodic oxidation treatment and chemical conversion treatment.

In addition, among the aforementioned treatments, hot water modification treatment and anodic oxidation treatment in particular cause the surface of the aluminum foil to be dissolved by a treatment agent resulting in the formation of an aluminum compound (boehmite or alumite) that has superior corrosion resistance. Thus, since this results in the formation of a common continuous structure extending from the aluminum foil to the corrosion prevented treated layer, it allows the formation of a corrosion prevention treated layer by a simple coating method, which is included in the definition of chemical conversion treatment but not included in the definition of chemical conversion treatment to be subsequently described.

This method is a method consists of using a sol of a rare earth element-based oxide in the manner of cerium oxide having a mean particle diameter of 100 nm or less that has aluminum corrosion preventive effects (inhibitory effects) and is also a preferable material in terms of environmental aspects. The use of this method makes it possible to impart corrosion preventive effects to metal foils such as aluminum foil even when using an ordinary coating method.

Examples of the aforementioned sols of rare earth element-based oxides in the manner of cerium oxide include sols using various types of solvents such as aqueous, alcohol, hydrocarbon, ketone, ester and ether-based solvents, and aqueous sols are used preferably for the reasons to be subsequently described.

An inorganic acid such as nitric acid, hydrochloric acid or phosphoric acid or a salt thereof, or an organic acid such as acetic acid, malic acid, ascorbic acid or lactic acid, is normally used as a dispersion stabilizer in the aforementioned sol of a rare earth element-based oxide in order to stabilize the dispersion thereof. Among these dispersion stabilizers, phosphoric acid in particular is expected to not only stabilize dispersion of the sol, but also improve adhesion of the aluminum foil by utilizing the aluminum chelating ability of phosphoric acid, impart electrolyte resistance by scavenging (forming a passive state) aluminum ions that have eluted due to the effects of hydrofluoric acid, and improve cohesion of the oxide layer by facilitating the occurrence of dehydration condensation of phosphoric acid even at low temperatures.

Examples of the aforementioned phosphoric acid and salts thereof include orthophosphoric acid, pyrophosphoric acid, metaphosphoric acid and alkaline metal or ammonium salts thereof.

In particular, condensed phosphoric acids such as trimetaphosphoric acid, tetrametaphosphoric acid, hexametaphosphoric acid or ultrametaphosphoric acid as well as alkaline metal salts or ammonium salts thereof are preferable for expressing function in a lithium ion battery exterior material.

In particular, in consideration of dry film formability (drying capacity, heat capacity) when forming a layer composed of a rare earth oxide by various coating methods using this sol of a rare earth oxide, an Na ion salt and the like having superior dehydration condensation properties at low temperatures is more preferable since it is an agent having superior reactivity at low temperatures. Although there are no particular restrictions on the salt that forms a phosphate, a water-soluble salt is more preferable.

The blending ratio of phosphoric acid (or a salt thereof) to cerium oxide is preferably 1 part by weight to 100 parts by weight of phosphoric acid (or salt thereof) to 100 parts by weight of cerium oxide. If the aforementioned blending ratio is lower than this value, the cerium oxide sol lacks stability, and it becomes difficult to satisfy functions as a lithium ion battery exterior material. The blending ratio is more preferably 5 parts by weight or less. An example of the upper limit of the blended amount of phosphate is that which is not accompanied by a decrease in function of the cerium oxide sol, and is 100 parts by weight or less, preferably 50 parts by weight or less and more preferably 20 parts by weight or less.

However, since the layer formed by the aforementioned rare earth oxide sol consists of an aggregate of inorganic particles, cohesion of the layer per se is low even after going through a dry curing step. Therefore, the layer is preferably conjugated by an anionic polymer or cationic polymer as indicated below in order to supplement the cohesion thereof.

A specific example of the anionic polymer is a polymer having a carboxyl group, examples of which include poly(meth)acrylic acid (or a salt thereof) and copolymers having poly(meth)acrylic acid as a main component thereof. Examples of components used for the aforementioned copolymers include alkyl (meth)acrylate-based monomers (of which examples of alkyl groups include a methyl group, ethyl group, n-propyl group, i-propyl group, n-butyl group, i-butyl group, t-butyl group, 2-ethylhexyl group and cyclohexyl group); amido group-containing monomers such as (meth)acrylamide, N-alkyl(meth)acrylamide, N,N-dialkyl(meth)acrylamide (of which examples of alkyl groups include a methyl group, ethyl group, n-propyl group, i-propyl group, n-butyl group, i-butyl group, t-butyl group, 2-ethylhexyl group and cyclohexyl group), N-alkoxy(meth)acrylamide, N,N-dialkoxy(meth)acrylamide (of which examples of alkoxy groups include a methoxy group, ethoxy group, butoxy group and isobutoxy group), N-methylol (meth)acrylamide or N-phenyl(meth)acrylamide; hydroxyl group-containing monomers such as 2-hydroxyethyl(meth)acrylate or 2-hydroxypropyl(meth)acrylate; glycidyl group-containing monomers such as glycidyl (meth)acrylate or allyl glycidyl ether; silane-containing monomers such as (meth)acryloxypropyl trimethoxysilane or (meth)acryloxypropyl triethoxysilane; and isocyanate group-containing monomers such as (meth)acryloxypropyl isocyanate.

These anionic polymers are materials used to improve the stability of the oxide layer obtained using the rare earth element oxide sol previously described. Examples of effects thereof include the effect of protecting a hard, brittle oxide layer with an acrylic-based resin component as well as the effect of trapping (by functioning as an cation catcher) ionic contaminants (and particularly sodium ions) derived from phosphates contained in the rare earth oxide sol. If ionic contaminants, and alkaline metal ions such as sodium ions or alkaline earth metal ions in particular, are contained in the protective layer provided to prevent corrosion of aluminum foil by corrosive compounds, for example, there is the problem of the protective layer being attacked starting at locations containing those ions without being limited to a lithium ion battery application used in embodiments of the present invention. In other words, an anionic polymer such as polyacrylic acid is effective in terms of immobilizing ionic contaminants such as sodium ions contained in a rare earth element oxide sol to be subsequently described, and improving resistance of the resulting coating.

As a result of combining such a polyanionic polymer with a rare earth element oxide sol as a corrosion prevention treated layer in a lithium battery exterior material, corrosion prevention performance can be imparted that is equal to that of chromate treatment. A structure in which a water-soluble polyanionic polymer is crosslinked is essentially preferable. Examples of such crosslinking agents include compounds having an isocyanate group, glycidyl group, carboxyl group or oxazoline group.

Examples of compounds having an isocyanate group include diisocyanates such as tolylene diisocyanate, xylylene diisocyanate or hydrogenation products thereof, hexamethylene diisocyanate, 4,4'-diphenylmethane diisocyanate or hydrogenation products thereof, or isophorone diisocyanate; polyisocyanates such as adducts obtained by reacting these isocyanates with a polyvalent alcohol such as trimethylolpropane, biurets obtained by reacting with water, or trimers in the form of isocyanurates; as well as block polyisocyanates obtained by forming blocks of these polyisocyanates with alcohols, lactams or oximes and the like.

Examples of compounds having a glycidyl group include epoxy compounds obtained by allowing epichlorhydrin to act on glycols such as ethylene glycol, diethylene glycol, triethylene glycol, polyethylene glycol, propylene glycol, dipropylene glycol, tripropylene glycol, polypropylene glycol, 1,4-butanediol, 1,6-hexanediol or neopentyl glycol; epoxy compounds obtained by allowing epichlorhydrin to act on polyvalent alcohols such as glycerin, polyglycerin, trimethylolpropane, pentaerythritol or sorbitol; and epoxy compounds obtained by allowing epichlorhydrin to act on dicarboxylic acids such as phthalic acid, terephthalic acid, oxalic acid or adipic acid.

Examples of compounds having a carboxyl group include various types of aliphatic or aromatic dicarboxylic acids, and poly(meth)acrylic acid and alkaline (earth) metal salts of poly(meth)acrylic acid can also be used.

Examples of compounds having an oxazoline group include low molecular weight compounds having two or more oxazoline units, or in the case of using a polymerizable monomer in the manner of isopropenyl oxazoline, copolymers obtained by copolymerizing an acrylic-based monomer such as (meth)acrylic acid, alkyl (meth)acrylic acid ester or hydroxyalkyl (meth)acrylic acid ester can be used.

Moreover, a crosslinking point may be siloxane-bonded by selectively reacting an amine and a functional group in the manner of a silane coupling agent. In this case, examples include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane and γ-isocyanatopropyltriethoxysilane. In particular, epoxysilanes, aminosilanes and isocyanate silanes are used preferably in consideration of reactivity with a cationic polymer or copolymer thereof.

One to 50 parts by weight of these crosslinking agents are suitably blended with 100 parts by weight of cationic polymer. If the blended amount is less than 1 part by weight, the crosslinked structure is inadequate, while if the blended amount exceeds 50 parts by weight, there is the risk of an accompanying decrease in the pot life of a coating liquid. The blended amount is preferably 10 parts by weight to 20 parts by weight. The method used to crosslink the water-soluble polymer is not limited to the aforementioned crosslinking agents, and may be a method consisting of the formation of a crosslinked structure such as ionic crosslinks using a titanium or zirconium compound.

Examples of cationic polymers include polymers containing an amine, polyethylene imine, ionic polymer complexes composed of polyethylene imine and a polymer having carboxylic acid, primary amine grafted acrylic resin in which a primary amine is grafted to an acrylic backbone, polyamines or derivatives thereof, and aminophenol.

In addition, examples of polymers having a carboxylic acid that forms an ionic polymer complex with polyethylene imine include polycarboxylic acids (salts) such as polyacrylic acid or an ionic salt thereof, copolymers obtained by introducing a co-monomer therein, and polysaccharides having a carboxyl group such as carboxymethyl cellulose or an ionic salt thereof.

Examples of polyallylamines that can be used include homopolymers and copolymers such as allylamines, allylamine amidosulfate, diallylamines or dimethylallylamine, and these amines can be used in the form of free amines or may be stabilized by acetic acid or hydrochloric acid. In addition, maleic acid or sulfur dioxide and the like can be used as copolymer components. Moreover, types imparted with thermal crosslinkability by partial methoxylation of a primary amine can also be used. Aminophenol can also be used. Allylamines and derivatives thereof are particularly preferable. The reason for this is that, as a result of conducting extensive studies using various compounds in order to impart electrolyte resistance and hydrofluoric acid resistance required by lithium battery exterior materials, it was found that cationic polymers per se are compounds that are capable of imparting electrolyte resistance and hydrofluoric acid resistance. This is presumed to be the result of inhibiting damage to aluminum foil by trapping fluorine ions with cationic groups (by functioning as an anion catcher).

Cationic polymers are extremely preferable materials from the viewpoint of improving adhesion. In addition, since cationic polymers are water-soluble in the same manner as the aforementioned anionic polymers, it is more preferable to form a crosslinked structure. The use of the previously described crosslinking agents having various functional groups makes it possible to impart moisture resistance to a cationic polymer. In other words, since this means that the cationic polymer also forms a crosslinked structure, in the case of using a rare earth oxide sold for the corrosion prevention treated layer as previously described, a cationic polymer may be used instead of an anionic polymer for the protective layer thereof.

Differing from chemical conversion treatment as exemplified by chromate treatment, the aforementioned coated type of corrosion prevention treated layer is not required to form an inclined structure between the aluminum foil layer and chemical conversion treated layer. In order to form this inclined structure with aluminum foil, chemical conversion treatment as exemplified by chromate treatment is carried out on the aluminum foil using a chemical conversion coating agent that incorporates hydrofluoric acid, hydrochloric acid, nitric acid, sulfuric acid or a salt thereof in particular, followed by forming a chemical conversion treated layer on the aluminum foil by allowing a chromium- or non-chromium-based compound to act thereon. However, since these treatment agents use acid, this treatment is accompanied by exacerbation of the working environment and corrosion of coating devices.

The definition of the corrosion prevented treated layer (coating layer) used in the aforementioned embodiments of the present invention differs from that of chemical conversion treatment since it is not necessary to form an inclined structure for aluminum foil. As a result, the properties of the coating agent are not subjected to restrictions such as being acidic, alkaline or neutral, thereby making it a treatment method that offers a superior working environment. Moreover, this can also be said to be interesting from the viewpoint of being a corrosion prevention technical field for which an alternative is desired in consideration of the environmental health of chromium compounds used in chromate treatment.

Although the aforementioned contents have described the case of the corrosion prevention treated layer consisting of multiple layers, in the case of consisting of a single layer, a layer that is provided with both a corrosion prevention function and adhesion can be formed by using a coating agent incorporating phosphoric acid and a chromium compound in a resin binder (such as aminophenol) in the manner of a known technology in the form of chromate coating, for example. In addition, a coating agent obtained by preliminarily incorporating the aforementioned rare earth oxide sol and polycationic polymer into a single liquid is also classified in this category, although the stability of the coating liquid must be taken into consideration. In other words, a chemical liquid comprising a mixture of a corrosion prevention function and a cationic polymer can also be used.

These corrosion prevention treated layers are preferably provided within the range of 0.005 mg/m$^2$ to 0.200 mg/m$^2$ and more preferably 0.010 mg/m$^2$ to 0.100 mg/m$^2$ regardless of whether consisting of a multilayer structure or single layer structure. In the case of being provided at a thickness of less than 0.005 mg/m$^2$, there is an effect on the corrosion prevention function of the aluminum foil layer. In the case of being provided at a thickness greater than 0.200 mg/m$^2$, the function of the corrosion prevention function ends up being saturated, or in the case of using a rare earth oxide sol, thermal curing during drying becomes inadequate if the coated film is excessively thick, thereby resulting in the risk of an accompanying decrease in cohesion. In the contents described above, although the coated amount is described in terms of the weight per unit surface area, this can be converted to thickness provided specific gravity is known.

Although the aforementioned corrosion prevention treated layer is mainly provided on the surface of an adhesive resin, similar treatment may be provided on the opposite surface (adhesive side), although not described in the present description.

<Adhesive Resin Layer>

Figure 14A:
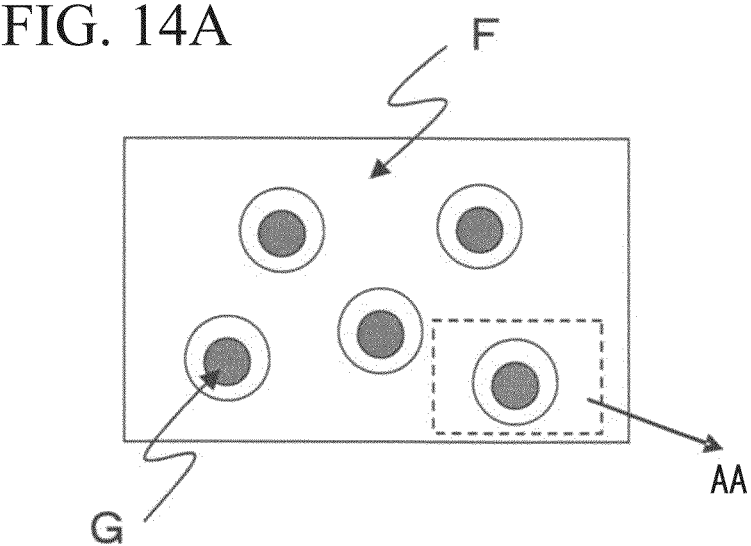
FIG. 14A shows an example of a sea-island structure composed of an acid-modified polyolefin and an immiscible elastomer.
Figure 14B:
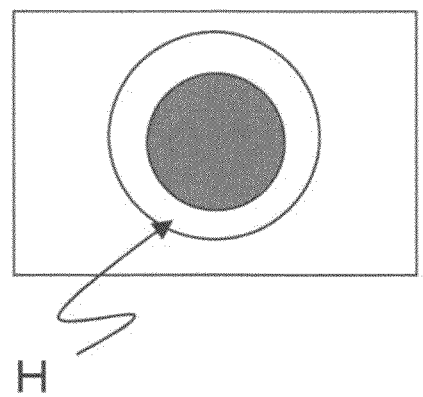
FIG. 14B is an enlarged view of portion AA in FIG. 14A.

As shown in FIGS. 14A and 14B, the adhesive resin layer 5b according to this embodiment of the present invention is composed of a sea-island type of microphase-separated structure in which an immiscible elastomer component G dispersed to a dispersed size within the range of 1 μm to 50 μm is incorporated in an acid-modified polyolefin resin F obtained by graft-modifying an unsaturated carboxylic acid derivative component derived from an unsaturated carboxylic acid, acid anhydride thereof or ester thereof in the presence of an organic peroxide.

Examples of the base polyolefin resin used in the aforementioned acid-modified polyolefin resin include low density polyethylene, medium density polyethylene, high density polyethylene, ethylene-α-olefin copolymers, homo-, block- or random polypropylenes, and propylene-α-olefin copolymers.

In addition, examples of compounds used during graft-modification of these polyolefin resins include unsaturated carboxylic acids, acid anhydrides thereof and esters thereof. More specifically, examples of compounds used include unsaturated carboxylic acids such as acrylic acid, methacrylic acid, maleic acid, fumaric acid, itaconic acid, citraconic acid, tetrahydrophthalic acid or bicyclo[2.2.1]hept-2-ene-5,6-dicarboxylic acid, anhydrides of unsaturated carboxylic acids such as maleic anhydride, itaconic anhydride, citraconic anhydride, tetrahydrophthalic anhydride and bicyclo[2.2.1]hept-2-ene-5,6-dicarboxylic acid anhydride, and esters of unsaturated carboxylic acids such as methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalate and dimethyl bicyclo[2.2.1]hept-2-ene-5,6-dicarboxlyate.

The aforementioned acid-modified polyolefin can be produced by reacting 0.2 parts by weight to 100 parts by weight of the aforementioned unsaturated carboxylic acid or derivative thereof with 100 parts by weight of the base polyolefin resin under heating conditions in the presence of a radical initiator. The reaction temperature conditions normally consist of 50° C. to 250° C. and more preferably 60° C. to 200° C. Although influenced by the production method, the reaction time in the case of a molten graft reaction using a twin-screw extruder is equal to or less than the residence time in the extruder, and for example, is 2 minutes to 30 minutes and preferably about 5 minutes to 10 minutes. In addition, the modification reaction can be carried out under conditions of either normal pressure or under pressurization.

An example of the radical initiator used in the aforementioned modification reaction is an organic peroxide. Typical examples of organic peroxides include alkyl peroxides, aryl peroxides, acyl peroxides, ketone peroxides, peroxyketals, peroxycarbonates, peroxyesters and hydroperoxides. These organic peroxides can be suitably selected corresponding to the temperature conditions and reaction time. In the case of a molten graft reaction using a twin-screw extruder, an alkyl peroxide, peroxyketal or peroxyester is preferable, and di-t-butyl peroxide, 2,5-dimethyl-2,5-di-t-butylperoxide-3-benzene or dicumyl peroxide is particularly preferable.

A typical example of the aforementioned grafted acid-modified polyolefin resin is a polyolefin resin that has been modified with maleic anhydride, and examples thereof include Admer (trade name) manufactured by Mitsui Chemicals Inc., Modic (trade name) manufactured by Mitsubishi Chemical Corp., and Adtex (trade name) manufactured by Nippon Polyethylene Corp.

These acid-modified polyolefin resins impart adhesion by utilizing reactivity between the grafted unsaturated carboxylic acid or unsaturated carboxylic acid derivative component derived from an anhydride or ester thereof, and a polymer containing various types of metals or various types of functional groups.

Differing from adhesion by this type of reaction, by incorporating a polyolefin-based thermoplastic elastomer obtained by copolymerizing ethylene/or and propylene with an α-olefin selected from the group consisting of 1-butene, 1-pentene, 1-hexene, 1-octene and 4-methyl-1-pentene, residual stress generated during lamination of this graft-modified polyolefin resin is released, thereby making it possible to impart improved viscoelastic adhesion.

An example of this polyolefin-based thermoplastic elastomer is a thermoplastic elastomer of the microphase-separated type present in the form of a sea-island structure at a dispersed size within the range of 1 μm to 50 μm. If the dispersed size is less than 1 μm, it becomes difficult to impart viscoelastic adhesion. On the other hand, if the dispersed size is greater than 50 μm, since this essentially results in the combination of materials having different compatibilities, lamination suitability (processability) of the material decreases considerably along with an increased susceptibility to decreases in material physical strength. More preferably, the size of the dispersed phase is within the range of 1 μm to 10 μm. Examples of such materials include Tafmer (trade name) manufactured by Mitsui Chemicals Inc., Zelas (trade name) manufactured by Mitsubishi Chemical Corp., and Catalloy (trade name) manufactured by Montell Co.

A first characteristic of the lithium ion battery exterior material according to the present embodiment is the incorporation of a miscible thermoplastic elastomer in the aforementioned acid-modified polyolefin resin. Here, an example of the definition of a microphase-separated structure is described in a reference document in the form of Japanese Unexamined Patent Application, First Publication No. 2003-321582.

In terms of discussion countermeasures against a whitening phenomenon during forming, the mechanism of the occurrence thereof is presumed to be as indicated below. As previously described, an immiscible elastomer is incorporated in a maleic anhydride-modified polyolefin resin used for the adhesive resin in order to improve physical adhesion. Crystallization of this acid-modified polyolefin resin is presumed to cause the formation of microcracks at the interface of the immiscible elastomer due to strain during forming.

Therefore, by adding an elastomer component having miscibility (miscible elastomer component), interface adhesion of the immiscible elastomer is improved or crystallization becomes difficult as a result of delaying or inhibiting crystallization of the acid-modified polyolefin resin. In other words, countermeasures against a whitening phenomenon can be deployed even if strain is applied during forming.

A type of material that improves interface adhesion of the immiscible elastomer or a type that delays or inhibits crystallization can be used as a material that is effective for these countermeasures. An example of the former is a polyolefin-based elastomer composed of a crystalline polyolefin segment and an amorphous polyolefin segment that has a microphase-dispersed structure, and in which the aforementioned crystalline polyolefin segment is miscible with acid-modified polyolefin sites, while the aforementioned amorphous polyolefin segment is miscible with immiscible elastomer sites. The interface adhesion of both is improved by each of these compatibilities, thereby making it possible to reduce void crazing at the interface of the immiscible resin blend when strain is applied during forming.

Typical examples of polyolefin-based elastomers having such a microphase-separated structure include Notio (trade name) manufactured by Mitsui Chemicals Inc., Tafthren (trade name) manufactured by Sumitomo Chemical Co., Ltd., and Dynalon SEBC (trade name) manufactured by JSR Corp.

On the other hand, examples of the latter that can be used include styrene-based elastomers, and particularly hydrogenated styrene-based thermoplastic elastomers such as Taftec (trade name) manufactured by Asahi Kasei Chemicals Corp., Septon/Hybrar (trade name) manufactured by Kuraray Co., Ltd., Dynalon (trade name) manufactured by JSR Corp., Espolex (trade name) manufactured by Sumitomo Chemical Co., Ltd., and Kraton G (trade name) manufactured by Kraton Polymers llc. AB-type and ABA-type block copolymers, having structural units selected from the group consisting of styrene, ethylene, propylene, isoprene and butylene are particularly effective, and styrene-ethylene•butylene-styrene copolymers and styrene-ethylene•propylene-styrene copolymers are used preferably. These hydrogenated styrene-based elastomers have favorable miscibility with styrene-based and olefin-based resins, and have superior durability and heat resistance.

The styrene content of the aforementioned hydrogenated styrene-based elastomer is preferably 5% by weight to 30% by weight and more preferably 5% by weight to 15% by weight. In the case the styrene content exceeds 30% by weight, since the resulting elastomer has a large number of styrene units, a microphase-separated structure cannot be formed due to the relationship of miscibility with the acid-modified polyolefin resin, and in consideration of electrolyte resistance, the hydrogenated styrene-based elastomer preferably has a styrene unit.

Incorporation of the aforementioned miscible elastomer is such that it is preferably incorporated at a content of 5% by weight to 50% by weight in the case of a polyolefin-based elastomer having a microphase-separated structure. If the content is less than 5% by weight, it is difficult to obtain the effect of inhibiting a whitening phenomenon. On the other hand, the content of the styrene-based elastomer is preferably 5% by weight to 25% by weight. If the content is less than 5% by weight, it becomes difficult to inhibit a whitening phenomenon. If the content exceeds 25% by weight, since the material is that used for the purpose of inhibiting a whitening phenomenon by inhibiting crystallinity, there is the risk of impairment of heat resistance as an adhesive resin layer.

Various types of additives may also be incorporated, such as a flame retardant, slipping agent, anti-blocking agent, antioxidant, photostabilizer or pressure-sensitive adhesion promoter.

<Sealant Layer>

The present embodiment is a lithium battery exterior material that uses an aluminum laminate obtained by sequentially laminating at least a base material film layer, adhesive layer, aluminum layer and adhesive resin layer. However, in the case the lithium ion battery exterior material is required to be sealed by heat sealing, this can be accommodated by laminating a heat seal layer 6b onto the aforementioned adhesive resin layer.

Typical examples of components that compose the heat seal layer 6b include polyolefin resins such as low density polyethylene, medium density polyethylene, high density polyethylene, ethylene-α-olefin copolymers, homo-, block- or random polypropylenes or propylene-α-olefin copolymers, ethylene-vinyl acetate copolymers, ethylene-(meth) acrylic acid copolymers and esterification products or ionic crosslinking products thereof. The sealant layer may be composed of a single layer of a material composed of one type of the aforementioned components or a blended material composed of two or more types, or may form a multilayer structure in accordance with other performance requirements of the sealant. Examples of this multilayer structure include that interposed with a resin having gas impermeability, such as a partially saponified or completely saponified ethylene-vinyl acetate copolymer or partially saponified or completely saponified polyvinyl acetate copolymer.

Although the following provides an explanation of a production method of the lithium ion battery exterior material of the present embodiment, the present invention is not limited thereto.

[Step for Forming Corrosion Prevention Treated Layer on Aluminum Foil]

The corrosion prevention treated layer is formed on the aforementioned aluminum foil. Examples of methods used include the previously described degreasing treatment, hot water modification treatment, anodic oxidation treatment, chemical conversion treatment or by applying a coating agent having corrosion prevention performance. Spraying or immersion can be selected for degreasing treatment, immersion can be selected for hot water modification treatment and anodic oxidation treatment, and immersion, spraying or coating can be selected for chemical conversion treatment corresponding to the type of chemical conversion treatment. The application of a coating agent having corrosion prevention performance can be carried out using various methods such as gravure coating, reverse coating, roll coating or bar coating. As previously described, although the aforementioned treatment may be carried out on one surface or both surfaces, in the case of treating on one side, treatment is carried out on the surface laminated with the adhesive resin layer. The coated amount provided is as previously described. In addition, in the case of requiring dry curing, drying curing can be carried out within a range of 60° C. to 300° C. for the substrate temperature corresponding to the drying conditions used when drying the corrosion prevention treated layer.

[Lamination of Base Material Film Layer and Aluminum Layer]

The aforementioned base material film layer and the aluminum layer provided with the corrosion prevention treated layer are laminated using an adhesive. At that time, the aforementioned adhesive is preferably provided as the dry coated amount thereof within the range of 1 $g/m^2$ to 10 $g/m^2$ and more preferably within the range of 3 $g/m^2$ to 7 $g/m^2$ by a technique such as dry lamination, non-solvent lamination or wet lamination.

[Lamination of Adhesive Resin Layer and Sealant Layer]

In addition to laminating the adhesive resin layer with the sealant layer using an extrusion laminator, a laminated structure consisting of the base material film layer, adhesive layer, aluminum layer, corrosion prevention treated layer, adhesive resin layer and sealant layer is formed by sandwich lamination. In this case, the adhesive resin layer may be laminated by directly laminating a dry blended material with an extrusion laminator so as to obtain the aforementioned blended material composition, or by laminating a granulated adhesive resin with an extrusion laminator after having carried out melt blending in advance using a melt blending device such as a single-screw extruder, twin-screw extruder or Brabender mixer. In addition, in the case the extrusion laminator has a unit capable of applying an anchor coating layer, a cationic polymer layer of the corrosion prevention treated layer may be coated in that portion. In addition, a layered structure having a different layer configuration may also be formed that is obtained by adhering a preliminarily extruded adhesive resin layer to a laminate consisting of the base material film layer, adhesive layer, aluminum layer and corrosion prevention treated layer by heat treatment to be subsequently described to form a layered structure consisting of a base material layer, adhesive layer, aluminum foil layer, corrosion prevention treated layer and adhesive resin layer.

[Heat Treatment Step]

A configuration consisting of the base material film layer, adhesive layer, aluminum layer (corrosion prevention treated layer), adhesive resin layer and sealant layer formed in the aforementioned various types of lamination modes is preferably subjected to heat treatment in the sense of further improving adhesion between the aluminum layer, corrosion prevention treated layer, adhesive resin layer and sealant layer, and imparting electrolyte resistance and hydrofluoric acid resistance. The heat treatment temperature is preferably within the range of 60° C. to 230° C. In the case of heat-treating at a higher temperature, treatment is carried out by passing through a drying oven or baking oven for a duration of 30 seconds or more. However, in consideration of productivity and handling ease, in addition to the aforementioned drying oven or baking oven set to a high temperature (such as 100° C. or higher), treatment is preferably carried out for a short period of time (less than 30 seconds) using a heat treatment method such as thermal lamination or Yankee dryer. In particular, by completely melting the adhesive resin layer in order to improve adhesion of the lithium ion battery exterior material of the present embodiment, adhesion with the corrosion prevention treated layer is improved, and resistance to a whitening phenomenon is further provided due to the effect of adding a thermoplastic elastomer.

EXAMPLES

The following provides a more detailed explanation of the present embodiment through examples thereof.

The following provides an explanation of a base material film layer, adhesive layer, adhesive resin layer, aluminum layer and sealant layer using in Examples 3-1 to 3-24 and Comparative Examples 3-1 and 3-2 of the present embodiment.

<Base Material Film Layer>
A biaxially oriented polyamide film (Unitika Ltd.) having a thickness of 25 µm was used.

<Adhesive Layer>
A polyurethane-based adhesive composed of a polyester polyol-based primary agent and a tolylene diisocyanate adduct-based curing agent (Toyo Ink Co., Ltd.) was used.

<Aluminum Layer>
Aluminum layer: Soft aluminum foil (Toyo Aluminum K.K., Material 8079) subjected to annealing and degreasing treatment and having a thickness of 40 µm was used, and this was subjected to corrosion prevention treatment with the corrosion prevention treatment liquids indicated below.

Corrosion prevention treatment liquid D1: A sodium polyphosphate-stabilized cerium oxide sol was used that was adjusted to a solid concentration of 10% by weight using distilled water for the solvent. The amount of phosphate was made to be 10 parts by weight based on 100 parts by weight of cerium oxide.

Corrosion Prevention Treatment Liquid D2: A composition was used that was composed of 90% by weight of polyacrylic acid ammonium salt (Toagosei Co., Ltd.) and 10% by weight of acrylic-isopropylenyl oxazoline copolymer (Nippon Shokubai Co., Ltd.) adjusted to a solid concentration of 5% by weight using distilled water for the solvent.

Corrosion Prevention Treatment Liquid D3: A composition was used that was composed of 90% by weight of polyallylamine (Nitto Boseki Co., Ltd.) and 10% by weight of polyglycerol polyglycidyl ether (Nagase Chemtex Corp.) adjusted to a solid concentration of 5% by weight using distilled water for the solvent.

Corrosion Prevention Treatment Liquid D4: A chemical conversion coating agent was used that was prepared by adding chromium fluoride ($CrF_3$) to a water-soluble phenol resin (Sumitomo Bakelite Co., Ltd.), adjusted to a solid concentration of 1% by weight using an aqueous phosphoric acid solution having a concentration of 1% as solvent, and adjusting the concentration to 10 mg/m$^2$ as the amount of Cr present in the final dry coating.

[Corrosion Prevention Treatment D1/D2/D3]
The aforementioned corrosion prevention treatment liquids were applied to the aforementioned aluminum foil layer by microgravure coating. The coated amount was set to 70 mg/m$^2$ to 100 mg/m$^2$ as the dry coated amount of the corrosion prevention treatment liquids. Drying conditions consisted of baking at 150° C. to 250° C. corresponding to the type of corrosion prevention treatment liquid. The composition using the corrosion prevention treatment liquids D1, D2 and D3 was made to express a corrosion prevention function by compounding those liquids, and by first coating and baking the corrosion prevention treatment liquid D1, and then coating the corrosion prevention treatment liquid D2 thereon, a compound layer composed of the corrosion prevention treatment liquids D1 and D2 was formed. Moreover, by then coating the corrosion prevention treatment liquid D3 thereon, the corrosion prevention treatment D1/D2/D3 was obtained. In addition, the corrosion prevention treatment liquid D4 was used to obtain corrosion prevention treatment D4 alone.

<Adhesive Resin Layer>
Adhesive resin layer E1: Maleic anhydride-modified polypropylene-based adhesive resin having a film thickness of 20 µm (Admer (trade name), Mitsui Chemicals Inc.)

Adhesive resin layer E2: Resin composition having a film thickness of 20 µm obtained by incorporating 5% by weight to 50% by weight of a hydrogenated styrene-based thermoplastic elastomer (Taftec (trade name) manufactured by Asahi Kasei Chemicals Corp.) in a maleic anhydride-modified polypropylene-based adhesive resin Adhesive resin layer E3: Resin composition having a film thickness of 20 µm obtained by incorporating 5% by weight to 50% by weight of an olefin-based elastomer (Notio (trade name) manufactured by Mitsui Chemicals Inc.) in a maleic anhydride-modified polypropylene-based adhesive resin Adhesive resin layer E4: Resin composition having a film thickness of 20 µm obtained by incorporating 5% by weight to 50% by weight of an olefin-based elastomer (Dynalon CEBC (trade name) manufactured by JSR Corp.) in a maleic anhydride-modified polypropylene-based adhesive resin <Sealant Layer>
A multilayer film comprised of two types and three layers consisting of random PP, block PP and random PP and having a total thickness of 40 µm was used.

Example 3-1

The aforementioned base material film layer and an aluminum layer obtained by carrying out the aforementioned corrosion prevention treatment D1/D2/D3 were dry-laminated with the aforementioned adhesive layer interposed therebetween. Next, the aforementioned adhesive resin layer E2 incorporating 5% by weight of hydrogenated styrene-based thermoplastic elastomer was laminated onto the aluminum layer with an extruder under conditions of 290° C. and 10 m/min to fabricate a lithium ion battery exterior material.

Example 3-2

A lithium ion battery exterior material was fabricated in the same manner as Example 3-1 with the exception of using an aluminum layer subjected to corrosion prevention treatment D4.

Example 3-3

A lithium ion battery exterior material was fabricated in the same manner as Example 3-1 with the exception of using the aforementioned adhesive resin layer E2 incorporating 15% by weight of hydrogenated styrene-based thermoplastic elastomer.

Example 3-4

A lithium ion battery exterior material was fabricated in the same manner as Example 3-3 with the exception of using an aluminum layer subjected to corrosion prevention treatment D4.

Example 3-5

A lithium ion battery exterior material was fabricated in the same manner as Example 3-1 with the exception of using the aforementioned adhesive resin layer E2 incorporating 30% by weight of hydrogenated styrene-based thermoplastic elastomer.

Example 3-6

A lithium ion battery exterior material was fabricated in the same manner as Example 3-5 with the exception of using an aluminum layer subjected to corrosion prevention treatment D4.

Example 3-7

A lithium ion battery exterior material was fabricated in the same manner as Example 3-1 with the exception of using the aforementioned adhesive resin layer E2 incorporating 50% by weight of hydrogenated styrene-based thermoplastic elastomer.

Example 3-8

A lithium ion battery exterior material was fabricated in the same manner as Example 3-7 with the exception of using an aluminum layer subjected to corrosion prevention treatment D4.

Example 3-9

A lithium ion battery exterior material was fabricated in the same manner as Example 3-1 with the exception of using the aforementioned adhesive resin layer E3 incorporating 5% by weight of olefin-based elastomer (Notio (trade name) manufactured by Mitsui Chemicals Inc.).

Example 3-10

A lithium ion battery exterior material was fabricated in the same manner as Example 3-9 with the exception of using an aluminum layer subjected to corrosion prevention treatment D4.

Example 3-11

A lithium ion battery exterior material was fabricated in the same manner as Example 3-9 with the exception of using the aforementioned adhesive resin layer E3 incorporating 15% by weight of olefin-based elastomer (Notio (trade name) manufactured by Mitsui Chemicals Inc.).

Example 3-12

A lithium ion battery exterior material was fabricated in the same manner as Example 3-11 with the exception of using an aluminum layer subjected to corrosion prevention treatment D4.

Example 3-13

A lithium ion battery exterior material was fabricated in the same manner as Example 3-9 with the exception of using the aforementioned adhesive resin layer E3 incorporating 30% by weight of olefin-based elastomer (Notio (trade name) manufactured by Mitsui Chemicals Inc.).

Example 3-14

A lithium ion battery exterior material was fabricated in the same manner as Example 3-13 with the exception of using an aluminum layer subjected to corrosion prevention treatment D4.

Example 3-15

A lithium ion battery exterior material was fabricated in the same manner as Example 3-9 with the exception of using the aforementioned adhesive resin layer E3 incorporating 50% by weight of olefin-based elastomer (Notio (trade name) manufactured by Mitsui Chemicals Inc.).

Example 3-16

A lithium ion battery exterior material was fabricated in the same manner as Example 3-13 with the exception of using an aluminum layer subjected to corrosion prevention treatment D4.

Example 3-17

A lithium ion battery exterior material was fabricated in the same manner as Example 3-1 with the exception of using the aforementioned adhesive resin layer E4 incorporating 5% by weight of olefin-based elastomer (Dynalon CEBC (trade name) manufactured by JSR Corp.).

Example 3-18

A lithium ion battery exterior material was fabricated in the same manner as Example 3-17 with the exception of using an aluminum layer subjected to corrosion prevention treatment D4.

Example 3-19

A lithium ion battery exterior material was fabricated in the same manner as Example 3-17 with the exception of using the aforementioned adhesive resin layer E4 incorporating 15% by weight of olefin-based elastomer (Dynalon CEBC (trade name) manufactured by JSR Corp.).

Example 3-20

A lithium ion battery exterior material was fabricated in the same manner as Example 3-17 with the exception of using an aluminum layer subjected to corrosion prevention treatment D4.

Example 3-21

A lithium ion battery exterior material was fabricated in the same manner as Example 3-17 with the exception of using the aforementioned adhesive resin layer E4 incorporating 30% by weight of olefin-based elastomer (Dynalon CEBC (trade name) manufactured by JSR Corp.).

Example 3-22

A lithium ion battery exterior material was fabricated in the same manner as Example 3-17 with the exception of using an aluminum layer subjected to corrosion prevention treatment D4.

Example 3-23

A lithium ion battery exterior material was fabricated in the same manner as Example 3-17 with the exception of using the aforementioned adhesive resin layer E4 incorporating 5% by weight of olefin-based elastomer (Dynalon CEBC (trade name) manufactured by JSR Corp.).

Example 3-24

A lithium ion battery exterior material was fabricated in the same manner as Example 3-17 with the exception of using an aluminum layer subjected to corrosion prevention treatment D4.

Comparative Example 3-1

A lithium ion battery exterior material was fabricated in the same manner as Example 3-1 with the exception of using a maleic anhydride-modified polyolefin-based adhesive resin (Admer (trade name) manufactured by Mitsui Chemicals Inc.) in the form of the aforementioned adhesive resin layer E1.

Comparative Example 3-2

A lithium ion battery exterior material was fabricated in the same manner as Comparative Example 3-1 with the exception of using an aluminum layer subjected to corrosion prevention treatment D4.

Luminosity (L*) and heat seal strength were measured according to the test methods indicated below using the lithium ion battery exterior materials fabricated in Examples 3-1 to 3-24 and Comparative Examples 3-1 and 3-2, the results of which are shown in Table 6.

<Test Method 1>

A test piece measuring 15 mm wide×100 mm long was prepared using each of the aforementioned lithium ion battery exterior materials, the test piece was drawn by 150% with a tensile tester (Tensilon), and luminosity (L*) on the surface of the adhesive resin layer was measured before and after drawing using a microspectrometer manufactured by Olympus Corp. (spot diameter: 50 μm. At this time, the test piece was evaluated as Good when ΔL* was 0 to 15, as Fair when ΔL* was 15 to 25, and Bad when ΔL* exceeded 25. ΔL* was defined as ΔL*=L*2−L*1 when luminosity before drawing was taken to be L*1 and luminosity after drawing was taken to be L*2, and an evaluation of Fair or better was judged to be acceptable.

<Test Method 2>

A test piece measuring 150 mm×200 mm was cut out from each of the aforementioned lithium ion battery exterior materials and subjected to deep drawing with a metal mold as indicated below.

Figure 15A:
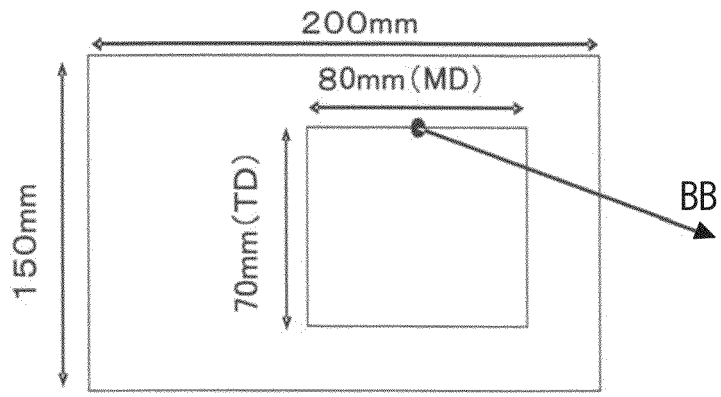
FIG. 15A shows the positional relationship between a lithium ion battery of the present invention and a metal mold, and a location where whitening is confirmed during forming.
Figure 15B:
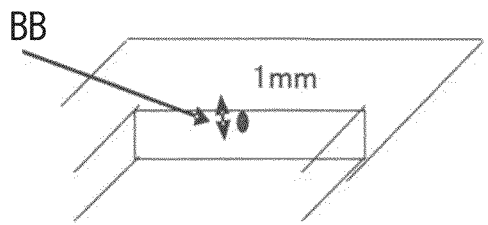
FIG. 15B is an enlarged view of portion BB in FIG. 15A where whitening is evaluated.

Mold size: 252 mm×125 mm, forming size: 70 mm×80 mm
Punch die perpendicularity R: 1.00 mm, mold clearance: 0.34 mm
Molding speed: 300 mm/min, draw depth: 5 mm
Film clamping pressure: 0.8 MPa Luminosity (L*) at a portion roughly 1 mm below (FIG. 15B) the top of near of the center of the long side (40 mm) was similarly measured when the sample obtained following the aforementioned deep drawing was placed with the adhesive resin layer surface following this deep molding facing upward based on the positional relationship of the film and mold shown in FIGS. 15A and 15B. The evaluation criteria used at this time were the same as those used in Test Method 1.

Furthermore, in order to further confirm inhibiting a whitening phenomenon of molding, and for the purpose of carrying out an accelerated test in consideration of the need to be able to withstand use over a long period of time as in the case of lithium ion batteries used in vehicle applications, luminosity (L*) was measured initially after the aforementioned sample preparation, after storing for 3 days at 85° C. and after storing for 10 days at 85° C. in Test Method 1 and Test Method 2. This was carried out to guarantee reliability of the battery finished product for a minimum of 10 years, and because it is thought that crystallization is accelerated and equivalent to about 10 years at normal temperature by allowing to stand for 10 days at 85° C. as a general criterion.

<Test Method 3>

Heat seal strength of the aforementioned lithium ion battery exterior materials was measured in a sample having a width of 15 mm heat-sealed under conditions of 190° C. and 0.3 MPa for 3 seconds using the same Tensilon tester under conditions of T-peeling at a rate of 200 mm/min. The heat seal strength measuring environment at this time was such that evaluations were carried out by holding at room temperature and 100° for 5 minutes each and then evaluating in an environment at 100° C., heat seal strength at 100° C. was evaluated as Excellent when 40 N/15 mm or more, as Good when 30 N/15 mm to 40 N/15 mm, as Fair when 20 N/15 mm to 30 N/15 mm, and Bad when lower than 20 N/15 mm, and an evaluation of Fair or better was judged to be acceptable.

TABLE 6

| | Composition of Adhesion Resin Modified Polyolefin + α | | Aluminum layer | | | | 85° C. × 3 days accelerated | | 85° C. × 10 days accelerated | | Heat Seal Strength (N/15 mm) | | | |
|---|---|---|---|---|---|---|---|---|---|---|---|---|---|---|
| | Type | added amount of α | corrosion prevention method | Test method | Initial ΔL* | Judgment | ΔL* | Judgment | ΔL* | Judgment | 25° C. | Judgment | 100° C. | Judgment |
| Ex. 3-1 | E2 | 5% | D1/D2/D3 | Deep drawing | 5 | Good | 11 | Good | 20 | Fair | 129 | Good | 34 | Good |
| | | | | Drawing | 10 | Good | 18 | Fair | 29 | Fair | | | | |

TABLE 6-continued

| | Composition of Adhesion Resin Modified Polyolefin + α | | Aluminum layer corrosion prevention method | Test method | Initial | | 85° C. × 3 days accelerated | | 85° C. × 10 days accelerated | | Heat Seal Strength (N/15 mm) | | | |
|---|---|---|---|---|---|---|---|---|---|---|---|---|---|---|
| | Type | amount of α | | | Δ$^{L*}$ | Judgment | Δ$^{L*}$ | Judgment | Δ$^{L*}$ | Judgment | 25° C. | Judgment | 100° C. | Judgment |
| Ex. 3-2 | | 5% | D4 | Deep drawing | 7 | Good | 13 | Good | 20 | Fair | 133 | Good | 34 | Good |
| | | | | Drawing | 10 | Good | 20 | Fair | 27 | Fair | | | | |
| Ex. 3-3 | | 15% | D1/D2/D3 | Deep drawing | 5 | Good | 9 | Good | 19 | Fair | 134 | Good | 32 | Good |
| | | | | Drawing | 11 | Good | 13 | Good | 26 | Fair | | | | |
| Ex. 3-4 | | 15% | D4 | Deep drawing | 6 | Good | 10 | Good | 20 | Fair | 130 | Good | 30 | Good |
| | | | | Drawing | 9 | Good | 13 | Good | 28 | Fair | | | | |
| Ex. 3-5 | | 30% | D1/D2/D3 | Deep drawing | 5 | Good | 9 | Good | 19 | Fair | 136 | Good | 33 | Good |
| | | | | Drawing | 10 | Good | 12 | Good | 27 | Fair | | | | |
| Ex. 3-6 | | 30% | D4 | Deep drawing | 6 | Good | 8 | Good | 17 | Fair | 134 | Good | 34 | Good |
| | | | | Drawing | 9 | Good | 12 | Good | 26 | Fair | | | | |
| Ex. 3-7 | | 50% | D1/D2/D3 | Deep drawing | 4 | Good | 8 | Good | 19 | Fair | 132 | Good | 26 | Fair |
| | | | | Drawing | 9 | Good | 11 | Good | 27 | Fair | | | | |
| Ex. 3-8 | | 50% | D4 | Deep drawing | 5 | Good | 8 | Good | 18 | Fair | 134 | Good | 27 | Fair |
| | | | | Drawing | 9 | Good | 13 | Good | 27 | Fair | | | | |
| Ex. 3-9 | E3 | 5% | D1/D2/D3 | Deep drawing | 2 | Good | 2 | Good | 13 | Good | 137 | Good | 38 | Good |
| | | | | Drawing | 8 | Good | 9 | Good | 19 | Fair | | | | |
| Ex. 3-10 | | 5% | D4 | Deep drawing | 1 | Good | 2 | Good | 11 | Good | 139 | Good | 39 | Good |
| | | | | Drawing | 4 | Good | 7 | Good | 16 | Fair | | | | |
| Ex. 3-11 | | 15% | D1/D2/D3 | Deep drawing | 1 | Good | 2 | Good | 3 | Good | 140 | Good | 43 | Excellent |
| | | | | Drawing | 4 | Good | 7 | Good | 8 | Good | | | | |
| Ex. 3-12 | | 15% | D4 | Deep drawing | 1 | Good | 1 | Good | 3 | Good | 141 | Good | 44 | Excellent |
| | | | | Drawing | 4 | Good | 5 | Good | 9 | Good | | | | |
| Ex. 3-13 | | 30% | D1/D2/D3 | Deep drawing | 1 | Good | 1 | Good | 4 | Good | 139 | Good | 43 | Excellent |
| | | | | Drawing | 5 | Good | 6 | Good | 8 | Good | | | | |
| Ex. 3-14 | | 30% | D4 | Deep drawing | 1 | Good | 2 | Good | 3 | Good | 144 | Good | 44 | Excellent |
| | | | | Drawing | 5 | Good | 6 | Good | 7 | Good | | | | |
| Ex. 3-15 | | 50% | D1/D2/D3 | Deep drawing | 1 | Good | 1 | Good | 3 | Good | 145 | Good | 43 | Excellent |
| | | | | Drawing | 4 | Good | 6 | Good | 8 | Good | | | | |
| Ex. 3-16 | | 50% | D4 | Deep drawing | 1 | Good | 2 | Good | 4 | Good | 143 | Good | 42 | Excellent |
| | | | | Drawing | 5 | Good | 8 | Good | 9 | Good | | | | |
| Ex. 3-17 | E4 | 5% | D1/D2/D3 | Deep drawing | 1 | Good | 2 | Good | 11 | Good | 133 | Good | 32 | Good |
| | | | | Drawing | 6 | Good | 6 | Good | 18 | Fair | | | | |
| Ex. 3-18 | | 5% | D4 | Deep drawing | 1 | Good | 2 | Good | 12 | Good | 134 | Good | 33 | Good |
| | | | | Drawing | 7 | Good | 7 | Good | 18 | Fair | | | | |
| Ex. 3-19 | | 15% | D1/D2/D3 | Deep drawing | 1 | Good | 2 | Good | 2 | Good | 138 | Good | 38 | Good |
| | | | | Drawing | 6 | Good | 7 | Good | 7 | Good | | | | |
| Ex. 3-20 | | 15% | D4 | Deep drawing | 1 | Good | 2 | Good | 3 | Good | 136 | Good | 40 | Excellent |
| | | | | Drawing | 5 | Good | 8 | Good | 8 | Good | | | | |
| Ex. 3-21 | | 30% | D1/D2/D3 | Deep drawing | 1 | Good | 3 | Good | 3 | Good | 138 | Good | 44 | Excellent |
| | | | | Drawing | 5 | Good | 2 | Good | 7 | Good | | | | |
| Ex. 3-22 | | 30% | D4 | Deep drawing | 1 | Good | 2 | Good | 4 | Good | 140 | Good | 41 | Excellent |
| | | | | Drawing | 4 | Good | 9 | Good | 9 | Good | | | | |
| Ex. 3-23 | | 50% | D1/D2/D3 | Deep drawing | 1 | Good | 2 | Good | 4 | Good | 139 | Good | 43 | Excellent |
| | | | | Drawing | 4 | Good | 10 | Good | 10 | Good | | | | |
| Ex. 3-24 | | 50% | D4 | Deep drawing | 1 | Good | 2 | Good | 4 | Good | 141 | Good | 42 | Excellent |
| | | | | Drawing | 4 | Good | 9 | Good | 9 | Good | | | | |

TABLE 6-continued

| | Composition of Adhesion Resin Modified Polyolefin + α | | Aluminum layer | | Initial | | 85° C. × 3 days accelerated | | 85° C. × 10 days accelerated | | Heat Seal Strength (N/15 mm) | | | |
|---|---|---|---|---|---|---|---|---|---|---|---|---|---|---|
| | Type | amount of α | corrosion prevention method | Test method | $\Delta^{L*}$ | Judgment | $\Delta^{L*}$ | Judgment | $\Delta^{L*}$ | Judgment | 25° C. | Judgment | 100° C. | Judgment |
| Comp. Ex. 3-1 | E1 | 0% | D1/D2/D3 | Deep drawing | 31 | Bad | 45 | Bad | 52 | Bad | 135 | Good | 36 | Good |
| | | | | Drawing | 36 | Bad | 53 | Bad | 58 | Bad | | | | |
| Comp. Ex. 3-2 | | 0% | D4 | Deep drawing | 33 | Bad | 47 | Bad | 50 | Bad | 130 | Good | 34 | Good |
| | | | | Drawing | 37 | Bad | 57 | Bad | 55 | Bad | | | | |

<Comparative Evaluation>

The exterior materials of the present embodiment obtained in Examples 3-1 to 3-8 allowed the obtaining of favorable results by demonstrating resistance to a whitening phenomenon for about 3 days even when subjected to accelerated testing at 85° C. as a result of delaying crystallization with a hydrogenated styrene-based elastomer. However, since heat resistance of heat seal strength was confirmed to decrease as the incorporated amount increased, the preferable range thereof was confirmed to be 5% by weight to 30% by weight.

In addition, exterior materials of the present embodiment obtained in Examples 3-9 to 3-24 allowed the obtaining of favorable results by demonstrating superior resistance to a whitening phenomenon even after 10 days had elapsed in an environment at 85° C. without observing any decreases in heat resistance even if the incorporated amount was increased due to the effects of a polystyrene-based elastomer having a microphase-separated structure.

On the other hand, the exterior materials of the comparative examples obtained in Comparative Examples 3-1 and 3-2 both demonstrated large differences in luminosity (ΔL*), and the exterior materials of the present embodiment were clearly determined to be superior.

Fourth Embodiment

The following provides a detailed explanation of the present invention by indicating an example of a lithium ion battery exterior material according to a fourth embodiment of the present invention.

Figure 16:
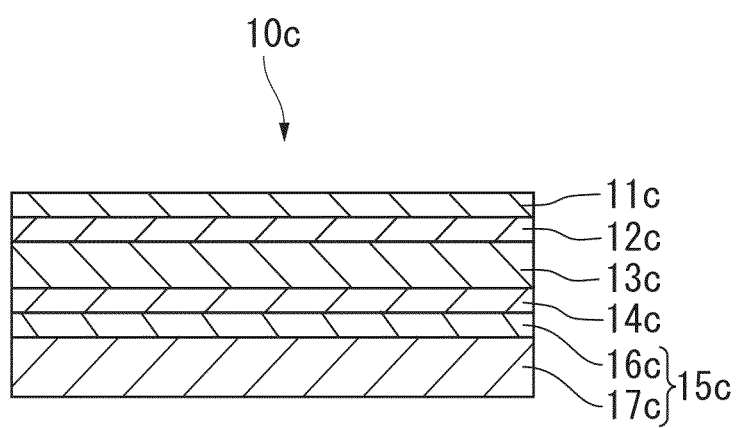
FIG. 16 is a cross-sectional view showing an example of a lithium ion battery exterior material according to a fourth embodiment of the present invention.

A lithium ion battery exterior material 10c of the present embodiment (to also be referred to as "exterior material 10c" as shown in FIG. 16) is an exterior material obtained by sequentially laminating on a first surface (one surface) of a base material layer (SB) 11c to be subsequently described an adhesive layer (AD) 12c, an aluminum foil layer (AL) 13c, a corrosion prevention treated layer (CL) 14c, and a thermoplastic resin layer (TPR) 15c, followed by heat treatment of the resulting laminate. The thermoplastic resin layer (TPR) 15c consists of an adhesive resin layer (AR) 16c and a sealant layer (SL) 17c laminated starting from the surface of the base material layer (SB) 11c. Namely, the innermost layer of the exterior material 10c is the sealant layer (SL) 17c.

Conventional lithium ion battery exterior materials produced by heat treatment such as thermal lamination are susceptible to whitening of the thermoplastic resin layer (TPR) during deep drawing due to the effects of that heat treatment. As a result of conducting extensive studies to inhibit this whitening phenomenon of the thermoplastic resin layer (TPR) during cold forming, it was found that a whitening phenomenon during cold forming can be inhibited by using the thermoplastic resin layer (TPR) to be subsequently described.

<Thermoplastic Resin Layer (TPR)>

The thermoplastic resin layer (TPR) 15c is composed of the adhesive resin layer (AR) 16c and the sealant layer (SL) 17c. The adhesive resin layer (AR) 16c and the sealant layer (SL) 17c that compose the thermoplastic resin layer (TPR) 15c are deposited by, for example, casting or extrusion lamination using a T-die or by extrusion in the form of inflation molding with a ring die, and using a thermoplastic resin that has been thermoplasticized by melting. Although the higher order structure of these molten films during deposition is dependent on the polymer backbone of the thermoplastic resin used, deposition temperature and cooling temperature, it is composed of a crystal phase that forms a lamellar structure and an amorphous phase present in gaps in the crystal phase, and optical anisotropy occurs as a result of molecular orientation of this crystal phase caused by extrusion. Consequently, birefringence increases immediately after deposition.

In the exterior material 10c, the thermoplastic resin layer (TPR) 15c is melted and softened by heat treatment such as thermal lamination, and imparts adhesion to the aluminum foil layer (AL) 13c provided with the corrosion prevention treated layer (CL) 14c and the adhesive resin layer (AR) 16c that composes the thermoplastic resin layer (TPR) 15c. At this time, molecular orientation of the crystal phase is relaxed and birefringence decreases as a result of heat treatment.

The absolute value of birefringence of the thermoplastic resin layer (TPR) 15c following heat treatment such as thermal lamination is 0.002 or less. If the absolute value of birefringence is 0.002 or less, molecular orientation in the thermoplastic resin layer (TPR) 15c is adequately relaxed, thereby making it possible to inhibit a whitening phenomenon during cold forming. The reason why the aforementioned effect is obtained is thought to be as indicated below.

When considering the thermal properties of thermoplastic resins, the reason for the occurrence of a whitening phenomenon in conventional exterior materials may be caused by accelerated heating crystallization of the thermoplastic resin and a failure to relax the oriented crystal phase during heat treatment such as thermal lamination. In other words, as a result of heat treatment, crystallization of the amorphous phase present in the gaps of the oriented crystal phase is accelerated, and as a result thereof, the degree of crystallization of the thermoplastic resin layer (TPR) increases, thereby having a high possibility of occurring a whitening phenomenon during cold forming. In contrast, in the present embodiment, a whitening phenomenon during cold forming is thought to be inhibited as a result of applying an amount of heat so as to exceed the crystallization temperature on heating during heat treatment to create a state in which the absolute value of birefringence is 0.002 or less indicating adequate relaxation of the oriented crystal layer.

The absolute value of birefringence of the thermoplastic resin layer (TPR) following heat treatment such as thermal lamination is preferably 0.0015 or less and more preferably 0.0010 or less from the viewpoint that a whitening phenomenon during cold forming can be easily inhibited.

Furthermore, birefringence as referred to in the present embodiment is a value obtained by measuring light at a wavelength of 550 nm using a rotating analyzer.

In addition, the degree of crystallization after heat treatment of the thermoplastic resin layer (TPR) $15c$ is 60% or less.

Cooling crystallization that occurs during cooling is also thought to have an effect on a whitening phenomenon during cold forming in addition to the previously described heating crystallization of the thermoplastic resin. In other words, when crystallization is accelerated by gradual cooling following heat treatment, even if the absolute value of birefringence is 0.002 or less, the degree of crystallization of the entire system increases due to cooling crystallization, thereby resulting in the risk of whitening of the thermoplastic resin layer (TPR) during cold forming. However, by making the absolute value of birefringence after heat treatment to be 0.002 or less and making the degree of crystallization to be 60% or less, the occurrence of a whitening phenomenon during cold forming can be inhibited.

The degree of crystallization after heat curing of the thermoplastic resin layer (TPR) $15c$ is preferably 40% or less from the viewpoint of being able to more easily inhibit the occurrence of a whitening phenomenon during cold forming.

Furthermore, degree of crystallization in the present embodiment is measured by X-ray diffraction.

[Adhesive Resin Layer (AR)]

The adhesive resin layer (AR) $16c$ is a layer contains an acid-modified polyolefin resin (a1) obtained by graft-modifying a polyolefin resin with one or more types of unsaturated carboxylic acid components selected from the group consisting of unsaturated carboxylic acids, acid anhydrides of unsaturated carboxylic acids, and esters of unsaturated carboxylic acids.

Since the adhesive resin layer (AR) $16c$ contains the acid-modified polyolefin resin (a1), in the case the corrosion prevention treated layer (CL) $14c$ to be subsequently described contains a polymer (x) having a functional group capable of reacting with a grafted unsaturated carboxylic acid derivative in the acid-modified polyolefin resin (a1), adhesive improves as a result of the reaction thereof.

Examples of the aforementioned polyolefin resin include low density polyethylene, medium density polyethylene, high density polyethylene, ethylene-α-olefin copolymers, homo-, block- or random polypropylenes, and propylene-α-olefin copolymers.

Examples of unsaturated carboxylic acids include acrylic acid, methacrylic acid, maleic acid, fumaric acid, itaconic acid, citraconic acid, tetrahydrophthalic acid and bicyclo[2.2.1]hept-2-ene-5,6-dicarboxylic acid.

Examples of unsaturated carboxylic acid anhydrides include maleic anhydride, itaconic anhydride, citraconic anhydride, tetrahydrophthalic anhydride and bicyclo[2.2.1]hept-2-ene-5,6-dicarboxylic acid anhydride.

Examples of unsaturated carboxylic acid esters include methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalate and dimethyl bicyclo[2.2.1]hept-2-ene-5,6-dicarboxlyate.

The acid-modified polyolefin resin (a1) can be produced by graft polymerizing (graft modifying) the aforementioned unsaturated carboxylic acid derivative component with a polyolefin resin serving as a base resin in the presence of a radical initiator.

The ratio of the aforementioned unsaturated carboxylic acid derivative component is preferably 0.2 parts by weight to 100 parts by weight based on 100 parts by weight of the base polyolefin resin.

The reaction temperature is preferably 50° C. to 250° C. and more preferably 60° C. to 200° C.

Although suitably set according to the production method, the reaction time in the case of a molten graft reaction using a twin-screw extruder, for example, is equal to or less than the residence time in the extruder, and more specifically, is preferably 2 minutes to 30 minutes and more preferably 5 minutes to 10 minutes.

Furthermore, graft modification can be carried out under conditions of either normal pressure or under pressurization.

Examples of the radical initiator used in graft modification include organic peroxides such as alkyl peroxides, aryl peroxides, acyl peroxides, ketone peroxides, peroxyketals, peroxycarbonates, peroxyesters and hydroperoxides.

These organic peroxides can be suitably selected according to the aforementioned conditions for reaction temperature and reaction time. For example, in the case of a molten graft reaction using a twin-screw extruder, an alkyl peroxide, peroxyketal or peroxyester is preferable, and more specifically, di-t-butyl peroxide, 2,5-dimethyl-2,5-di-t-butylperoxide-3-benzene or dicumyl peroxide is more preferable.

An acid-modified polyolefin resin that has been modified with maleic anhydride is preferable for the acid-modified polyolefin resin (a1). Examples thereof include Admer (trade name) manufactured by Mitsui Chemicals Inc., Modic (trade name) manufactured by Mitsubishi Chemical Corp., and Adtex (trade name) manufactured by Nippon Polyethylene Corp.

One type or two or more types of the acid-modified polyolefin resin (a1) may be contained in the adhesive resin layer (AR) $16c$.

The adhesive resin layer (AR) $16c$ is preferably composed of a resin composition in which a miscible elastomer component (a2) dispersed in the acid-modified polyolefin resin (a1) at a dispersed diameter of 1 nm to less than 1000 nm (to be simply referred to as "elastomer component (a2)"), and an immiscible elastomer component (a3) dispersed at a dispersed diameter of 1 μm to less than 1000 μm (to be simply referred to as "elastomer component (a3)").

The effects of (i) and (ii) indicated below are obtained as a result of incorporating the elastomer component (a2) in the acid-modified polyolefin resin (a1):

(i) crystallization rate of the adhesive resin layer (AR) $16c$ is slowed and crystallization attributable to heat treatment is further inhibited; and (ii) sea-island adhesive strength is improved and void crazing phenomenon is inhibited in a sea-island structure in which the elastomer component (a3) (islands) is present in the acid-modified polyolefin resin component (a1) (sea) in the adhesive resin layer (AR) $16c$.

In addition, as a result of incorporating the elastomer component (a3), residual stress generated during lamination of the acid-modified polyolefin resin (a1) is released, and viscoelastic adhesion improves.

If the elastomer component (a2) is present in the acid-modified polyolefin resin (a1), it is dispersed at a dispersed diameter of 1 nm to less than 1 µm. The dispersed diameter of the elastomer component (a2) is preferably 1 nm to 200 nm from the viewpoint of electrical insulating properties.

Furthermore, the dispersed diameter of the elastomer in the acid-modified polyolefin resin (a1) in the present embodiment in the case the dispersed phase is considered to be circular is the diameter of that circle, the maximum diameter in the case of approximating to be an oval, the maximum diameter of the long axis of the aspect ratio in the case of a rod, or the thickness of a layer thereof in the case of having a layered lamellar structure.

The dispersed diameter of the elastomer in the acid-modified polyolefin resin (a1) can be confirmed in, for example, the manner described below.

A mixture of the acid-modified polyolefin resin (a1) and elastomer is formed into a pressed sheet, cut into a 0.5 mm-square chip, and then stained with ruthenium oxide ($RuO_4$). An ultrathin section having a film thickness of about 100 nm is then prepared from the stained sample using an ultramicrotome (such as Reichert S or Reichert TCS) equipped with a diamond knife. Next, carbon is vapor-deposited on this ultrathin section followed by observation with a transmission electron microscope. At least five locations are randomly selected for the observed locations, and observations are made at magnifications of 10,000×, 50,000× and 150,000×. At that time, in the case of approximating the dispersed phase to be an oval, by selecting Axis-major using Image-Pro Plus software within a field observed at a magnification of 10,000× to 150,000× with a transmission electron microscope, the dispersed phase (flexible component or constrained component) can be approximated to an oval of the same area and having an equal primary and secondary moment, and the long axis thereof is taken to be the maximum diameter.

Preferable examples of the elastomer component (a2) include styrene-based thermoplastic elastomers, hydrogenated styrene-based thermoplastic elastomers and propylene-α-olefin copolymer elastomers, and from the viewpoint of electrical insulating properties, propylene-α-olefin copolymer elastomers and hydrogenated styrene-based thermoplastic elastomers are more preferable. One type or two or more types of the elastomer component (a2) may be contained in the adhesive resin layer (AR) 16c.

Examples of styrene-based thermoplastic elastomers include AB type or ABA type block copolymers having a structural unit derived from styrene and a structural unit derived from one or more types of compounds selected from the group consisting of α-olefins such as ethylene, propylene or butylene. Specific examples include styrene-ethylene•butylene-styrene copolymers and styrene-ethylene•propylene-styrene copolymers.

Examples of hydrogenated styrene-based thermoplastic elastomers include elastomers obtained by reducing the aforementioned styrene-based thermoplastic elastomer by hydrogenation.

The content of structural units to which hydrogen derived from styrene has not been added in the hydrogenated styrene-based thermoplastic elastomer is preferably 1% by weight to 20% by weight and more preferably 5% by weight to 15% by weight.

If the aforementioned content is 1% by weight or more, resistance to electrolyte improves. If the aforementioned content is 20% by weight or less, miscibility with the acid-modified polyolefin resin (a1) improves.

Examples of commercially available products of hydrogenated styrene-based thermoplastic elastomers include Taftec manufactured by Asahi Kasei Chemicals Corp., Septon/Hybrar manufactured by Kuraray Co., Ltd., Dynalon manufactured by JSR Corp., Espolex manufactured by Sumitomo Chemical Co., Ltd., and Kraton G manufactured by Kraton Polymers llc.

The propylene-α-olefin copolymer elastomer preferably has a structural unit derived from propylene and a structural unit derived from one or more types of compounds selected from the group consisting of α-olefins having 2 to 200 carbon atoms (excluding propylene), and the ratio of the structural unit derived from propylene preferably is preferably 51 mol % or more.

Examples of commercially available products of propylene-α-olefin copolymer elastomers include Notio (trade name) manufactured by Mitsui Chemicals Inc., Tafthren (trade name) manufactured by Sumitomo Chemical Co., Ltd., and Dynalon (trade name) manufactured by JSR Corp.

The content of the elastomer component (a2) in the adhesive resin layer (AR) 16c (100% by weight) is preferably 1% by weight to 50% by weight and more preferably 10% by weight to 30% by weight. If the content of the elastomer component (a2) is equal to or greater than the aforementioned lower limit value, the occurrence of a whitening phenomenon is easily inhibited. If the content of the elastomer component (a3) is equal to or less than the aforementioned upper limit value, it is economically advantageous.

Examples of the elastomer component (a3) include polyolefin-based thermoplastic elastomers obtained by copolymerizing at least one of ethylene and/or propylene with one or more types of α-olefins selected from the group consisting of 1-butene, 1-pentene, 1-hexene, 1-octene and 4-methyl-1-pentene.

One type of two or more types of the elastomer component (a3) may be contained in the adhesive resin layer (AR) 16c.

The elastomer component (a3) is preferably a microphase-separated type of thermoplastic elastomer dispersed in the form of a sea-island structure at a dispersed diameter of 1 µm to 50 µm. If the dispersed diameter is 1 µm or more, viscoelastic adhesion improves. If the dispersed diameter is 50 µm or less, decreases in lamination suitability (processability) of the acid-modified polyolefin resin (a1) are easily inhibited and physical strength of the material improves. The elastomer component (a3) is more preferably a thermoplastic elastomer dispersed in the form of a sea-island structure at a dispersed diameter of 1 µm to 10 µm. Specific examples of such elastomer components include Tafmer (trade name) manufactured by Mitsui Chemicals Inc., Zelas (trade name) manufactured by Mitsubishi Chemical Corp., and Catalloy (trade name) manufactured by Montell Co.

The content of the elastomer component (a3) in the adhesive resin layer (AR) 16c (100% by weight) is preferably 1% by weight to 40% by weight and more preferably 10% by weight to 20% by weight. If the content of the elastomer component (a3) is equal to or greater than the aforementioned lower limit value, viscoelastic adhesion improves. If the content of the elastomer component (a3) is equal to or less than the aforementioned upper limit value, decreases in lamination suitability (processability) of the acid-modified polyolefin resin (a1) are easily inhibited and physical strength of the material formed improves.

The adhesive resin layer (AR) 16c may also be composed of a resin composition in which either one of the elastomer component (a2) and the elastomer component (a3) are incorporated in the acid-modified polyolefin resin (a1).

In addition, various types of additives may also be incorporated in the adhesive resin layer (AR) 16c, such as a flame retardant, slipping agent, anti-blocking agent, antioxidant, photostabilizer or pressure-sensitive adhesion promoter.

[Sealant Layer (SL)]

The sealant layer (SL) 17c is a layer that imparts sealing properties to the exterior material 1 by heat sealing.

The sealant layer (SL) 17c is a layer that contains a polyolefin resin.

Examples of the aforementioned polyolefin resin include low density polyethylene, medium density polyethylene, high density polyethylene, ethylene-α-olefin copolymers, homo-, block- or random polypropylenes and propylene-α-olefin copolymers.

One type or two or more types of polyolefin resin may be contained in the sealant layer (SL) 17c. In addition, the sealant layer (SL) 17c may be in the form of a single layer or may employ a multilayer structure in accordance with other performance requirements. Examples of a multilayer structure include forms interposed with a resin layer having gas impermeability, such as a partially saponified or completely saponified ethylene-vinyl acetate copolymer or partially saponified or completely saponified polyvinyl acetate copolymer.

There are no particular limitations on the combination of layered structures of the adhesive resin layer (AR) 16c and sealant layer (SL) 17c in the thermoplastic resin layer (TPR) 15c.

<Base Material Layer (SB)>

The base material layer (SB) 11c fulfills the role of imparting heat resistance in the sealing step during production of a lithium battery and inhibiting the formation of pinholes that can occur during processing and distribution.

A resin layer having insulating properties is preferable for the base material layer (SB) 11c. Examples of this resin layer include a single layer film or layered multilayer film having two or more layers composed of a drawn or non-drawn film such as a polyester film, polyamide film or polypropylene film.

The thickness of the base material layer (SB) 11c is preferably 6 μm or more and more preferably 10 μm or more from the viewpoint of improving pinhole resistance and insulating properties. In addition, the thickness of the base material layer (SB) 11c is preferably 40 μm or less and more preferably 25 μm or less from the viewpoint of moldability.

The outermost layer of the base material layer (SB) 11c may be provided with a coated film composed of a coating agent such as an acrylic, urethane, polyvinylidene chloride (including copolymer types), epoxy or polyester-based coating agent by various types of coating methods corresponding to the required performance.

<Adhesive Layer (AD)>

Examples of adhesive that form the adhesive layer (AD) 12c include polyurethane resins obtained by allowing an isocyanate compound having two or more functional groups to act on a primary agent such as a polyester polyol, polyether polyol, acrylic polyol or carbonate polyol.

The polyester polyol is obtained by reacting one or more types of dibasic acid with one or more types of diol.

Examples of dibasic acids include aliphatic dibasic acids such as succinic acid, glutaric acid, adipic acid, pimelic acid, suberic acid, azelaic acid, sebacic acid or brazilic acid, and aromatic dibasic acids such as isophthalic acid, terephthalic acid or naphthalene dicarboxylic acid.

Examples of diols include aliphatic diols such as ethylene glycol, propylene glycol, butanediol, neopentyl glycol, methyl pentanediol, hexanediol, heptanediol, octanediol, nonanediol, decanediol or dodecanediol, alicyclic diols such as cyclohexanediol or hydrogenated xylylene glycol, and aromatic diols such as xylylene glycol.

In addition, polyester urethane polyols, in which hydroxyl groups on both ends of the aforementioned polyester polyol have undergone chain elongation by reacting with one or more types of isocyanate compounds having two or more functional groups, may also be used.

Examples of isocyanate compounds having two or more functional groups include 2,4- or 2,6-tolylene diisocyanate, xylylene diisocyanate, 4,4'-diphenylmethane diisocyanate, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate and isopropylidene dicyclohexyl-4,4'-diisocyanate. In addition, polyester urethane polyols may also be used that have undergone chain elongation using an adduct, biuret or isocyanurate of these isocyanate compounds.

Examples of polyether polyols include polyethylene glycol and polypropylene glycol, as well as polyether urethane polyols that have undergone chain elongation by allowing the aforementioned isocyanurate compounds to act thereon.

Examples of acrylic polyols include copolymers having poly(meth)acrylic acid as a main component thereof. Examples of components that copolymerize with (meth) acrylic acid include hydroxyl group-containing monomers such as 2-hydroxyethyl (meth)acrylate or 2-hydroxypropyl (meth)acrylate; alkyl (meth)acrylate-based monomers (of which examples of alkyl groups include a methyl group, ethyl group, n-propyl group, i-propyl group, n-butyl group, i-butyl group, t-butyl group, 2-ethylhexyl group and cyclohexyl group); amido group-containing monomers such as (meth) acrylamide, N-alkyl(meth)acrylamide, N,N-dialkyl(meth) acrylamide (of which examples of alkyl groups include a methyl group, ethyl group, n-propyl group, i-propyl group, n-butyl group, i-butyl group, t-butyl group, 2-ethylhexyl group and cyclohexyl group), N-alkoxy(meth)acrylamide, N,N-dialkoxy(meth)acrylamide (of which examples of alkoxy groups include a methoxy group, ethoxy group, butoxy group and isobutoxy group), N-methylol (meth)acrylamide or N-phenyl(meth)acrylamide; glycidyl group-containing monomers such as glycidyl (meth)acrylate or allyl glycidyl ether; silane-containing monomers such as (meth) acryloxypropyl trimethoxysilane or (meth)acryloxypropyl triethoxysilane; and isocyanate group-containing monomers such as (meth)acryloxypropyl isocyanate.

Carbonate polyols are obtained by reacting a carbonate compound with a diol. Examples of carbonate compounds include dimethyl carbonate, diphenyl carbonate and ethylene carbonate. Examples of diols include the same diols listed as examples for the aforementioned polyester polyols.

In addition, polycarbonate urethane polyols obtained by subjecting a carbonate polyol obtained from the aforementioned carbonate compounds and diols to chain elongation by the aforementioned isocyanate compounds may also be used.

One type of each type of these polyols may be used alone or two or more types may be used in combination according to the desired functions and performance.

The use of an isocyanate compound as a curing agent in the aforementioned primary agents allows the obtaining of a polyurethane resin. Examples of isocyanate compounds used as curing agents include the same isocyanate compounds as those listed as examples of chain extenders.

A carbodiimide compound, oxazoline compound, epoxy compound, phosphorous compound or silane coupling agent and the like may be incorporated in the adhesive layer (AD) 12c to promote adhesion.

Examples of carbodiimide compounds include N,N'-di-o-tolylcarbodiimide, N,N'-diphenylcarbodiimide, N,N'-di-2,6-dimethylphenylcarbodiimide, N,N'-bis(2,6-diisopropylphenyl) carbodiimide, N,N'-dioctyldecylcarbodiimide, N-tolyl-N'-cyclohexylcarbodiimide, N,N'-di-2,2-di-t-butylphenylcarbodiimide, N-triyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide and N,N'-di-p-tolylcarbodiimide.

Examples of oxazoline compounds include monooxazoline compounds such as 2-oxazoline, 2-methyl-2-oxazoline, 2-phenyl-2-oxazoline, 2,5-dimethyl-2-oxazoline or 2,4-diphenyl-2-oxazoline; and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline) or 2,2'-(1,4-phenylene)-bis(2-oxazoline).

Examples of epoxy compounds include diglycidyl ethers of aliphatic diols such as 1,6-hexanediol, neopentyl glycol or polyalkylene glycol; polyglycidyl ethers of aliphatic polyols such as sorbitol, sorbitan, polyglycerol, pentaerythritol, diglycerol, glycerol or trimethylolpropane; polyglycidyl ethers of alicyclic diols such as cyclohexane dimethanol; diglycidyl esters or polyglycidyl esters of aliphatic and aromatic polyvalent carboxylic acids such as terephthalic acid, isophthalic acid, naphthalene dicarboxylic acid, trimellitic acid, adipic acid or sebacic acid; diglycidyl ethers or polyglycidyl ethers of polyvalent phenols such as resorcinol, bis-(p-hydroxyphenyl)methane, 2,2-bis-(p-hydroxyphenyl)propane, tris-(p-hydroxyphenyl)methane or 1,1,2,2-tetrakis(p-hydroxyphenyl)ethane; N-glycidyl derivatives of amines such as N,N'-diglycidyl aniline, N,N,N-diglycidyl toluidine or N,N,N',N'-tetraglycidyl-bis-(p-aminophenyl) methane; triglycidyl derivatives of aminophenols; and triglycidyltris(2-hydroxyethyl) isocyanurate, triglycidyl isocyanurate, ortho-cresol epoxies and phenol novolac epoxies.

Examples of phosphorous-based compounds include tris (2,4-di-t-butylphenyl)phosphite, tetrakis(2,4-di-t-butylphenyl)4,4'-biphenylene phosphonite, bis(2,4-di-t-butylphenyl) pentaerythritol-di-phosphite, bis(2,6-di-t-butyl-4-methylphenyl)pentaerythritol-di-phosphite, 2,2-methylenebis(4,6-di-t-butylphenyl)octyl phosphite, 4,4'-butylidene-bis(3-methyl-6-t-butylphenyl-di-tridecyl) phosphite, 1,1,3-tris(2-methyl-4-ditridecylphosphite-5-t-butyl-phenyl)butane, tris(mixed mono- and di-nonylphenyl) phosphite, tris(nonylphenyl)phosphite and 4,4'-isopropylidenebis(phenyl-dialkylphosphite).

Examples of silane coupling agents include vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane and N-β (aminoethyl)-γ-aminopropyltrimethoxysilane.

In addition, various types of other additives and stabilizers may be incorporated according to the performance required of the adhesive.

<Aluminum Foil Layer (AL)>

Ordinary soft aluminum foil can be used for the aluminum foil layer (AL) 13c, and iron-containing aluminum foil is used preferably from the viewpoints of being able to impart pinhole resistance and extendability during molding.

The iron content of the aluminum foil (100% by weight) is preferably 0.1% by weight to 9.0% by weight and more preferably 0.5% by weight to 2.0% by weight. If the iron content is 0.1% by weight or more, pinhole resistance and extendability improve. If the iron content is 9.0% by weight or less, flexibility improves.

The thickness of the aluminum foil layer (AL) 13c is preferably 9 μm to 200 μm and more preferably 15 μm to 100 μm from the viewpoints of bather properties, pinhole resistance and processability.

Aluminum foil that has been subjected to degreasing treatment is preferably used for the aluminum foil layer (AL) 13c from the viewpoint of electrolyte resistance. Degreasing treatment is broadly classified into a wet type degreasing treatment and a dry type degreasing treatment.

Examples of wet type degreasing treatment include acid degreasing and alkaline degreasing.

Examples of acids used for acid degreasing include inorganic acids such as sulfuric acid, nitric acid, hydrochloric acid or hydrofluoric acid. One type of these acids may be used alone or two or more types may be used in combination. In addition, various types of metal salts serving as supply sources of Fe ions or Ce ions and the like may be incorporated in these organic acids as necessary from the viewpoint of improving etching effects of the aluminum foil.

Examples of bases used for alkaline degreasing include sodium hydroxide because of its high etching effects. In addition, other examples include weak bases and those incorporating surfactants.

Wet type degreasing treatment is carried out by immersion or spraying.

An example of dry type degreasing treatment is a method carried out in a step in which aluminum is subjected to annealing treatment. In addition, other examples of this degreasing treatment include flame treatment and corona treatment. Moreover, another example of degreasing treatment consists of oxidatively decomposing and removing contaminants with active oxygen generated by irradiating with ultraviolet light of a specific wavelength.

Degreasing treatment of the aluminum foil layer (AL) 13c may be carried out on one surface or on both surfaces.

<Corrosion Prevention Treated Layer (CL)>

The corrosion prevention treated layer (CL) 14c is a layer provided for preventing corrosion of the aluminum foil layer (AL) 13c by electrolytic solution or hydrofluoric acid. The corrosion prevention treated layer (CL) 14c is formed by degreasing treatment, hot water modification treatment, anodic oxidation treatment, chemical conversion treatment or a combination thereof.

Examples of degreasing treatment include the treatment explained in the section describing the aluminum foil layer (AL) 13c.

Examples of hot water modification treatment include boehmite treatment consisting of immersing aluminum foil in boiling water containing triethanolamine.

An example of anodic oxidation treatment is alumite treatment.

Examples of chemical conversion treatment include chromate treatment, zirconium treatment, titanium treatment, vanadium treatment, molybdenum treatment, calcium phosphate treatment, strontium hydroxide treatment, cerium treatment, ruthenium treatment and various types of chemical conversion treatment composed of mixed phases thereof.

When performing this hot water modification treatment, anodic oxidation treatment or chemical conversion treatment, the aforementioned degreasing treatment is preferably performed in advance.

In addition, among the aforementioned treatments, hot water modification treatment and anodic oxidation treatment in particular cause the surface of the aluminum foil to be dissolved by a treatment agent resulting in the formation of an aluminum compound (boehmite or alumite) that has superior corrosion resistance. Consequently, since this results in the formation of a common continuous structure extending from the aluminum foil layer (AL) 13c to the corrosion prevented treated layer (CL) 14c, it allows the formation of a corrosion prevention treated layer by a simple coating method, which is included in the definition of chemical conversion treatment but not included in the definition of chemical conversion treatment to be subsequently described. An example of this method consists of using a sol of a rare earth element-based oxide in the manner of cerium oxide having a mean particle diameter of 100 nm or less that has aluminum corrosion preventive effects (inhibitory effects) and is also a preferable material in terms of environmental aspects. The use of this method makes it possible to impart corrosion preventive effects to metal foils such as aluminum foil even when using an ordinary coating method.

Examples of the aforementioned sols of rare earth element-based oxides include sols using various types of solvents such as aqueous, alcohol, hydrocarbon, ketone, ester and ether-based solvents. Aqueous sols are particularly preferable.

An inorganic acid such as nitric acid, hydrochloric acid or phosphoric acid or a salt thereof, or an organic acid such as acetic acid, malic acid, ascorbic acid or lactic acid, is normally used as a dispersion stabilizer in the aforementioned sol of a rare earth element-based oxide in order to stabilize the dispersion thereof. Among these dispersion stabilizers, phosphoric acid in particular is expected to (1) stabilize dispersion of the sol, (2) improve adhesion of the aluminum foil layer 13 by utilizing the aluminum chelating ability of phosphoric acid, (3) impart electrolyte resistance by scavenging (forming a passive state) aluminum ions that have eluted due to the effects of hydrofluoric acid, and (4) improve cohesion of the corrosion prevention treated layer 14c (oxide layer) by facilitating the occurrence of dehydration condensation of phosphoric acid even at low temperatures, in the exterior material 1.

Examples of the aforementioned phosphoric acid and salts thereof include orthophosphoric acid, pyrophosphoric acid, metaphosphoric acid and alkaline metal or ammonium salts thereof. In particular, condensed phosphoric acids such as trimetaphosphoric acid, tetrametaphosphoric acid, hexametaphosphoric acid or ultrametaphosphoric acid as well as alkaline metal salts or ammonium salts thereof are preferable for expressing function in the exterior material 1. In addition, in consideration of dry film formability (drying capacity, heat capacity) when forming the corrosion prevented treated layer 14c composed of a rare earth oxide by various coating methods using the aforementioned sol of a rare earth oxide, a sodium salt is more preferable from the viewpoint of superior dehydration condensation properties at low temperatures. A water-soluble salt is preferable as a phosphoric acid salt.

The blending ratio of phosphoric acid (or a salt thereof) to cerium oxide is preferably 1 part by weight to 100 parts by weight based on 100 parts by weight of cerium oxide. If the aforementioned blending ratio is equal to or greater than 1 part by weight based on 100 parts by weight of cerium oxide, the cerium oxide sol becomes more stable and the function of the exterior material 1c is improved. The aforementioned blending ratio is more preferably 5 parts by weight or more based on 100 parts by weight of cerium oxide. In addition, if the aforementioned blending ratio is equal to or less than 100 parts by weight based on 100 parts by weight of cerium oxide, a decrease in function of the cerium oxide sol is easily inhibited. The aforementioned blending ratio is more preferably 50 parts by weight or less and even more preferably 20 parts by weight or less based on 100 parts by weight of cerium oxide.

Since the corrosion prevention treated layer (CL) 14c formed by the aforementioned rare earth oxide sol consists of an aggregate of inorganic particles, there is the risk of a decrease in the cohesion of the layer per se even after going through a dry curing step. Therefore, the corrosion prevention treated layer (CL) 14c in this case is preferably conjugated by an anionic polymer or cationic polymer as indicated below in order to supplement cohesion.

An example of the anionic polymer is a polymer having a carboxyl group, specific examples of which include poly (meth)acrylic acid (or a salt thereof) and copolymers obtained by copolymerizing poly(meth)acrylic acid as a main component thereof.

Examples of copolymerizing components of these copolymers include alkyl (meth)acrylate-based monomers (of which examples of alkyl groups include a methyl group, ethyl group, n-propyl group, i-propyl group, n-butyl group, i-butyl group, t-butyl group, 2-ethylhexyl group and cyclohexyl group); amido group-containing monomers such as (meth) acrylamide, N-alkyl(meth)acrylamide, N,N-dialkyl(meth) acrylamide (of which examples of alkyl groups include a methyl group, ethyl group, n-propyl group, i-propyl group, n-butyl group, i-butyl group, t-butyl group, 2-ethylhexyl group and cyclohexyl group), N-alkoxy(meth)acrylamide, N,N-dialkoxy(meth)acrylamide (of which examples of alkoxy groups include a methoxy group, ethoxy group, butoxy group and isobutoxy group), N-methylol (meth)acrylamide or N-phenyl(meth)acrylamide; hydroxyl group-containing monomers such as 2-hydroxyethyl (meth)acrylate or 2-hydroxypropyl(meth)acrylate; glycidyl group-containing monomers such as glycidyl (meth)acrylate or allyl glycidyl ether; silane-containing monomers such as (meth)acryloxypropyl trimethoxysilane or (meth)acryloxypropyl triethoxysilane; and isocyanate group-containing monomers such as (meth)acryloxypropyl isocyanate.

These anionic polymers fulfill the role of improving the stability of the corrosion prevention treated layer (CL) 14c (oxide layer) obtained using the rare earth element oxide sol. This is achieved by the effect of protecting a hard, brittle oxide with an acrylic-based resin component as well as the effect of capturing (by functioning as an cation catcher) ionic contaminants (and particularly sodium ions) derived from phosphates contained in the rare earth oxide sol. In other words, if alkaline metal ions such as sodium ions and alkaline earth metal ions in particular are contained in the corrosion prevention treated layer (CL) 14c obtained using the rare earth oxide sol, the corrosion prevention treated layer (CL) 14c is susceptible to deterioration starting at locations containing those ions. Consequently, the resistance of the corrosion prevention treated layer (CL) 14c is improved as a result of the anionic polymer immobilizing sodium ions and the like contained in the rare earth oxide sol.

As a result of combining an anionic polymer and a rare earth element oxide sol, the corrosion prevention treated layer (CL) 14c has corrosion prevention performance that is equal to that of the corrosion prevention treated layer (CL) 14c formed by carrying out chromate treatment on aluminum foil. The anionic polymer preferably has a structure in which an essentially water-soluble polyanionic polymer is crosslinked. Examples of crosslinking agents used to form this structure include compounds having an isocyanate group, glycidyl group, carboxyl group or oxazoline group.

Examples of compounds having an isocyanate group include diisocyanates such as tolylene diisocyanate, xylylene diisocyanate or hydrogenation products thereof, hexamethylene diisocyanate, 4,4'-diphenylmethane diisocyanate or hydrogenation products thereof, or isophorone diisocyanate; polyisocyanates such as adducts obtained by reacting these isocyanates with a polyvalent alcohol such as trimethylolpropane, biurets obtained by reacting with water, or trimers in the form of isocyanurates; as well as block polyisocyanates obtained by forming blocks of these polyisocyanates with alcohols, lactams or oximes and the like.

Examples of compounds having a glycidyl group include epoxy compounds obtained by allowing epichlorhydrin to act on glycols such as ethylene glycol, diethylene glycol, triethylene glycol, polyethylene glycol, propylene glycol, dipropylene glycol, tripropylene glycol, polypropylene glycol, 1,4-butanediol, 1,6-hexanediol or neopentyl glycol; epoxy compounds obtained by allowing epichlorhydrin to act on polyvalent alcohols such as glycerin, polyglycerin, trimethylolpropane, pentaerythritol or sorbitol; and epoxy compounds obtained by allowing epichlorhydrin to act on dicarboxylic acids such as phthalic acid, terephthalic acid, oxalic acid or adipic acid.

Examples of compounds having a carboxyl group include various types of aliphatic or aromatic dicarboxylic acids. In addition, poly(meth)acrylic acid and alkaline (earth) metal salts of poly(meth)acrylic acid may also be used.

Examples of compounds having an oxazoline group include low molecular weight compounds having two or more oxazoline units, or in the case of using a polymerizable monomer in the manner of isopropenyl oxazoline, copolymers obtained by copolymerizing an acrylic-based monomer such as (meth)acrylic acid, alkyl (meth)acrylic acid ester or hydroxyalkyl (meth)acrylic acid ester.

In addition, a crosslinking point may be siloxane-bonded to an anionic polymer by selectively reacting an amine and a functional group in the manner of a silane coupling agent. In this case, examples of compounds that can be used include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane and γ-isocyanatopropyltriethoxysilane. In particular, epoxysilanes, aminosilanes and isocyanate silanes are preferable in consideration of reactivity with anionic polymers or copolymers thereof.

The ratio of these crosslinking agents to the anionic polymer is preferably 1 part by weight to 50 parts by weight and more preferably 10 parts by weight to 20 parts by weight based on 100 parts by weight of the anionic polymer. If the ratio of the crosslinking agent is equal to or greater than 1 part by weight based on 100 parts by weight of the anionic polymer, a crosslinked structure is formed with sufficient ease. If the ratio of the crosslinking agent is equal to or less than 50 parts by weight based on 100 parts by weight of the anionic polymer, the pot life of a coating liquid improves.

There are no particular limitations on the aforementioned crosslinking agents, and the method used to crosslink the anionic polymer may be a method consisting of the formation of ionic crosslinks using a titanium or zirconium compound.

Examples of cationic polymers include polyethylene imine, ionic polymer complexes composed of polyethylene imine and a polymer having carboxylic acid, primary amine-grafted acrylic resin in which a primary amine is grafted to an acrylic backbone, polyamines or derivatives thereof, and aminophenol.

Examples of polymers having a carboxylic acid that forms an ionic polymer complex with polyethylene imine include polycarboxylic acids (salts) such as polyacrylic acid or ionic salts thereof, copolymers in which a co-monomer has been introduced therein, and polysaccharides having a carboxyl group such as carboxymethyl cellulose or an ionic salt thereof. Examples of polyallylamines include homopolymers and copolymers of allylamines, allylamine amidosulfate, diallylamines or dimethylallylamine. These amines may be in the form of free amines or may be stabilized by acetic acid or hydrochloric acid. In addition, maleic acid or sulfur dioxide and the like may be used as copolymer components. Moreover, types imparted with thermal crosslinkability by partial methoxylation of a primary amine can also be used, and aminophenol can also be used. Allylamines and derivatives thereof are particularly preferable.

Cationic polymers are compounds that are able to impart electrolyte resistance and hydrofluoric acid resistance. This is presumed to be the result of inhibiting damage to the aluminum foil by capturing fluorine ions with cationic groups (by functioning as an anion catcher).

The aforementioned cationic polymers are extremely preferable materials from the viewpoint of improving adhesion. In addition, since cationic polymers are water-soluble in the same manner as the aforementioned anionic polymers, it is preferable to form a crosslinked structure, and moisture resistance can be imparted to the cationic polymer by using a crosslinking agent having various types of functional groups as exemplified in the section on anionic polymers. In this manner, since a cationic polymer is also able to form a crosslinked structure, in the case of using a rare earth oxide sol for the corrosion prevention treated layer (CL) 14c, a cationic polymer may be used for the protective layer thereof instead of using an anionic polymer.

From the viewpoint of adhesion between the corrosion prevention treated layer (CL) 14c and the adhesive resin layer (AR) 16c, a polymer (x) having a functional group able to react with the aforementioned graft-modified unsaturated carboxylic acid derivative component is preferably contained in the acid-modified polyolefin resin (a1) contained in the adhesive resin layer (AR) 16c.

Examples of the aforementioned functional group include an amino group, glycidyl group and carbodiimide group.

A cationic polymer is preferable for the polymer (x), and one or more compounds selected from the group consisting of polyethylene imine, ionic polymer complexes composed of polyethylene imine and a polymer having carboxylic acid, primary amine-grafted acrylic resin in which a primary amine is grafted to an acrylic backbone, polyamines or derivatives thereof, and aminophenol.

There are no particular limitations on the combination of components in the coating agent used to form the aforementioned coated type of corrosion prevention treated layer (CL) 14c, and examples thereof include the combinations of (1) to (7) indicated below:

(1) rare earth oxide sol only;
(2) anionic polymer only;
(3) cationic polymer only;
(4) layered compound consisting of rare earth oxide and anionic polymer;
(5) layered compound consisting of rare earth oxide and cationic polymer;
(6) multilayered laminate obtained by forming a layered compound using a rare earth oxide and anionic polymer followed by further laminating a cationic polymer; and,
(7) multilayered laminate obtained by forming a layered compound using a rare earth oxide and a cationic polymer followed by further laminating an anionic polymer.

In addition, the corrosion prevention treated layer (CL) 14c is not limited to the aforementioned layers. For example, the corrosion prevention treated layer (CL) 14c may also be formed using a treatment agent incorporating phosphoric acid and a chromium compound in a resin binder (such as aminophenol) in the manner of a known technology in the form of chromate coating. The use of such a treatment agent enables the formation of a layer that is provided with both a corrosion prevention function and adhesion. In addition, compound treatment may also be used that uses the aforementioned cationic polymer or anionic polymer in the aforementioned degreasing treatment, hot water modification treatment, anodic oxidation treatment, chemical conversion treatment or a combination thereof in order to improve adhesion. In addition, a layer consisting of a cationic polymer or anionic polymer may be further laminated on a layer formed by the aforementioned treatment to form a multilayer structure. In addition, a layer can be obtained that is provided with both a corrosion prevention function and adhesion by using a coating agent in which a rare earth oxide sol and polycationic polymer or polyanionic polymer have been preliminarily incorporated into a single liquid, although the stability of the coating liquid must be taken into consideration.

The weight per unit surface area of the corrosion prevention treated layer (CL) 14c is preferably 0.005 mg/m$^2$ to 0.200 mg/m$^2$ and more preferably 0.010 mg/m$^2$ to 0.100 mg/m$^2$. If the aforementioned weight per unit surface area is 0.005 mg/m$^2$ or more, a corrosion prevention function is easily imparted to the aluminum foil layer 13c. In addition, even if the aforementioned weight per unit surface area exceeds 0.200 mg/m$^2$, there is little change in corrosion prevention function. On the other hand, in the case of using a rare earth oxide sol, heat-curing during drying may become inadequate if the coated film is excessively thick, thereby resulting in the risk of a decrease in cohesion. Furthermore, the thickness of the corrosion prevention treated layer (CL) 14c can be converted from the specific gravity thereof.

In order to allow a corrosion prevention treated layer subjected to chemical conversion treatment as exemplified by chromate treatment to form an inclined structure with aluminum foil, the aluminum foil is subjected to treatment using a chemical conversion coating agent that incorporates hydrofluoric acid, hydrochloric acid, nitric acid, sulfuric acid or a salt thereof in particular, followed by forming a chemical conversion treated layer on the aluminum foil by allowing a chromium- or non-chromium-based compound to act thereon. However, since the aforementioned chemical conversion treatment uses an acid for the chemical conversion coating agent, this treatment is accompanied by exacerbation of the working environment and corrosion of coating devices. On the other hand, differing from chemical conversion treatment as exemplified by chromate treatment, the aforementioned coated type of corrosion prevention treated layer 14c is not required to form an inclined structure with the aluminum foil layer 13c. Consequently, the properties of the coating agent are not subjected to restrictions such as being acidic, alkaline or neutral, thereby making it possible to realize a favorable working environment. In addition, the coated type of corrosion prevention treated layer (CL) 14c is also preferable since chromate treatment using a chromium compound requires an alternative in terms of environmental health.

<Production Method>

The following provides an explanation of a production method of the exterior material 10c. However, the production method of the exterior material 10c is not limited to the method indicated below.

The production method of the exterior material 10c has the steps (I) to (IV) indicated below:

(I) a step for forming the corrosion prevention treated layer (CL) 14c on the aluminum foil layer (AL) 13c;

(II) a step for laminating the base material layer (SB) 11c through the first adhesive layer (AD) 12c onto the aluminum foil layer (AL) 13c on the opposite surface from the surface on which the corrosion prevention treated layer (CL) 14c has been formed;

(III) a step for laminating the thermoplastic resin layer (TPR) 15c on the aluminum foil layer (AL) 13c on the surface of the corrosion prevention treated layer (CL) 14c; and, (IV) a step for heat treating a laminate composed of the base material layer (SB) 11c, the adhesive layer (AD) 12c, the aluminum foil layer (AL) 13c, the corrosion prevention treated layer (CL) 14c and the thermoplastic resin layer (TPR) 15c.

Step (I):

The corrosion prevention treated layer (CL) 14c is formed on a first surface (one surface) of the aluminum foil layer (AL) 13c by carrying out degreasing treatment, hot water modification treatment, anodic oxidation treatment, chemical conversion treatment or by applying a coating agent having corrosion prevention performance.

Examples of methods used to carry out degreasing treatment include annealing, spraying and immersion.

An example of a method used to carry out hot water modification treatment or anodic oxidation treatment is immersion.

The method used to carry out chemical conversion treatment can be selected from among immersion, spraying and coating corresponding to the type of chemical conversion treatment.

Various types of methods such as gravure coating, reverse coating, roll coating or bar coating can be employed as the method for coating the coating agent having corrosion prevention performance.

The amount of coating agent applied is preferably within a range that satisfies the aforementioned weight per unit surface area of the corrosion prevention treated layer 14c. In addition, in the case of requiring dry curing, drying curing can be carried out within a range of 60° C. to 300° C. for the substrate temperature corresponding to the drying conditions used when drying the corrosion prevention treated layer (CL) 14c.

Step (II):

The base material layer (SB) 11c is laminated by a method such as dry lamination, non-solvent lamination or wet lamination using an adhesive that forms the adhesive layer (AD) 12c on the surface of the aluminum foil layer (AL) 13c on the opposite surface from the surface on which the corrosion prevention treated layer (CL) 14c has been formed. The dried coated amount of the adhesive is preferably 1 g/m$^2$ to 10 g/m$^2$ and more preferably 3 g/m$^2$ to 7 g/m$^2$.

In step (II), aging treatment may also be carried out within a range of room temperature to 100° C. in order to promote adhesion.

Step (III):

The thermoplastic resin layer (TPR) 15c is formed on the aluminum foil layer (AL) 13c on the surface of the corrosion prevention treated layer (CL) 14c by laminating the adhesive resin layer (AR) 16c and the sealant layer (SL) 17c on the aluminum foil layer (AL) 13c on the surface of the corrosion prevention treated layer (CL) 14c by sandwich lamination using an extrusion laminator.

In addition, the adhesive resin layer (AR) 16c may be formed by directly laminating a dry blended material with an extrusion laminator so as to obtain the aforementioned blended material composition, or by laminating a granulated adhesive resin with an extrusion laminator after having carried out melt blending in advance using a melt blending device such as a single-screw extruder, twin-screw extruder or Brabender mixer. In addition, in the case the extrusion laminator has a unit capable of applying an anchor coating layer, a layer composed of a cationic polymer or anionic polymer of the corrosion prevented treated layer (CL) 14c may be coated with that unit coinciding with formation of the adhesive resin layer (AR) 16c.

In addition, the adhesive resin layer (AR) 16c and the sealant layer (SL) 17c may be co-extruded in advance to obtain the thermoplastic resin layer (TPR) 15c in the form of a film, and the aforementioned film may be adhered by heat treatment to be subsequently described to a laminate to be subsequently described composed of the base material layer (SB) 11c, the adhesive layer (AD) 12c, the aluminum foil layer (AL) 13c and the corrosion prevention treated layer (CL) 14c followed by laminating the thermoplastic resin layer (TPR) 15c.

In addition, a method other than that described above may also be used.

Step (IV):

The laminate composed of the base material layer (SB) 11c, the adhesive layer (AD) 12c, the aluminum foil layer (AL) 13c, the corrosion prevention treated layer (CL) 14c and the thermoplastic resin layer (TPR) 15c obtained in steps (I) to (III) is heat-treated to make the birefringence of the thermoplastic resin layer (TPR) 15c after heat treatment 0.002 or less and the degree of crystallization 60% or less. Birefringence decreases the higher the treatment temperature and the longer the treatment time. In addition, the degree of crystallization decreases the shorter the cooling time after heating.

The method used to carry out heat treatment preferably consists of passing through a high-temperature oven such as drying oven or baking oven, thermal lamination (thermocompression bonding) using heated rollers, holding between heated rollers using a Yankee dryer (heat dryer), or a combination thereof.

There are no particular limitations on the cooling method, and examples thereof include air cooling, cooling by holding in a cooling drum (between rollers), and water cooling. A cooling drum (cooling rollers) are typically used for cooling.

The heat treatment temperature is preferably 60° C. to 230° C.

Heat treatment temperature, the time until cooling following heat treatment, and cooling time are set as necessary to adjust the degree of crystallization and birefringence of the thermoplastic resin layer (TPR) 15c according to the heat treatment temperature and other process conditions.

Other Steps:

Slippage with the mold used to carry out deep drawing is important for improving the moldability of the exterior material 10c when producing the exterior material 10c. Consequently, in order to further reduce the static coefficient of friction of the surfaces of the base material layer (SB) 11c side and thermoplastic resin layer (TPR) 15c side of the exterior material 10c, a slipping agent is preferably applied these surfaces. Examples of slipping agents include silicone, polymeric wax and fatty acid amides.

Although there are no particular limitations thereon, examples of methods used to apply the slipping agent include a wet coating method consisting of applying a coating agent obtained by dissolving slipping agent such as erucic amide in a solvent using a known coating method, and a method consisting of containing a slipping agent in the sealant layer (SL) 17c and depositing the slipping agent on the surface using bleed out phenomenon.

The slipping agent is preferably applied to both the surface on the base material (SB) 11c side and the surface on the thermoplastic resin layer (TPR) 15c side. However, it may also be applied to only one of the surfaces of the base material (SB) 11c side and thermoplastic resin layer (TPR) 15c side.

The exterior material of the present embodiment as explained above is obtained by carrying out heat treatment, has superior electrolyte resistance and the like, and as a result of aggressively controlling the birefringence and degree of crystallization of the thermoplastic resin layer (TPR) 15c after heat treatment 1 to specified ranges, has superior moldability, while also being able to inhibit the occurrence of a whitening phenomenon during cold forming.

Furthermore, the exterior material of the present invention is not limited to the previously described exterior material 10c. For example, the exterior material may be that in which the corrosion prevention treated layer (CL) is formed on both surfaces of the aluminum foil layer (AL).

EXAMPLES

Although the following provides a detailed explanation of the present invention through examples thereof, the present invention is not limited by the following descriptions.

[Materials Used]

The materials used in the present examples are as indicated below.

(Base Material Layer (SB))

Base Material SB-1: Biaxially oriented polyamide film (SNR, Mitsubishi Plastics Inc., thickness: 25 μm)

Base Material SB-2: Biaxially oriented polyamide film (SNR, Mitsubishi Plastics Inc., thickness: 15 μm)

Base Material SB-3: Biaxially oriented polyester film (PET, Unitika Ltd., thickness: 12 μm)

(Adhesive (AD))

Adhesive AD-1: Polyurethane-based adhesive incorporating a tolylene diisocyanate adduct-based curing agent in a polyester polyol-based primary agent (Toyo Ink Co., Ltd.)

(Aluminum Foil Layer (AL))

Aluminum Foil AL-1: Soft aluminum foil material 8079 subjected to annealing and degreasing treatment (Toyo Aluminum K.K., thickness: 40 μm)

(Corrosion Prevention Treated Layer (CL))

Treatment Agent CL-1: Sodium polyphosphate-stabilized cerium oxide sol adjusted to a solid concentration of 10% by weight using distilled water for the solvent. Amount of phosphate made to be 10 parts by weight based on 100 parts by weight of cerium oxide.

Treatment Agent CL-2: Composition composed of 90% by weight of polyacrylic acid ammonium salt (Toagosei Co., Ltd.) and 10% by weight of acrylic-isopropylenyl oxazoline copolymer (Nippon Shokubai Co., Ltd.) adjusted to a solid concentration of 5% by weight using distilled water for the solvent.

Treatment Agent CL-3: Composition composed of 90% by weight of polyallylamine (Nitto Boseki Co., Ltd.) and 10% by weight of polyglycerol polyglycidyl ether (Nagase Chemtex Corp.) adjusted to a solid concentration of 5% by weight using distilled water for the solvent.

Treatment Agent CL-4: Chemical conversion coating agent prepared by adding chromium fluoride ($CrF_3$) to a water-soluble phenol resin (Sumitomo Bakelite Co., Ltd.), adjusted to a solid concentration of 1% by weight using an aqueous phosphoric acid solution having a concentration of 1% as solvent, and adjusting the concentration to 10 mg/m² as the amount of Cr present in the final dry coating.

(Adhesive Resin (AR))

Adhesive Resin AR-1: Resin composition obtained by incorporating an elastomer composed of elastomer component (a3) (immiscible elastomer) in the form of ethylene-α-olefin copolymer in a modified PP (80% by weight) obtained by graft-modifying maleic anhydride to a random polypropylene (PP) base (Tm(AR)=approx. 135° C.) (Mitsui Chemicals Inc.).

Adhesive Resin AR-2: Resin composition obtained by further incorporating a styrene-based elastomer composed of styrene-ethylene-propylene-styrene units as a miscible elastomer in the form of elastomer component (a2) in Adhesive Resin AR-1 at a concentration of 15% by weight based on total weight (Mitsui Chemicals Inc.).

Adhesive Resin AR-3: Resin composition obtained by further incorporating an olefin-based elastomer composed of a propylene-α-olefin copolymer as a miscible elastomer in the form of elastomer component (a2) in Adhesive Resin AR-1 at a concentration of 15% by weight based on total weight (Mitsui Chemicals Inc.).

(Sealant Layer (SL))

Film SL-1: Multilayer film composed of two types and three layers consisting of random PP, block PP and random PP having a total thickness of 30 μm (Okamoto Co., Ltd.).

[Exterior Material Production Method]

The corrosion prevention treated layer (CL) was formed on the aluminum foil layer (AL) by coating treatment agents CL-1 to CL-4 on the surface of the aluminum foil AL-1 filled with electrolytic solution to a dry coated amount of 70 mg/m² to 100 mg/m² by microgravure coating, and carrying out baking treatment at 150° C. to 250° C. with a drying unit corresponding to the type of treatment agent. The final dry coated amount and baking treatment conditions were made to be the same in the case of multiple layers of the corrosion prevention treated layer (CL) as well.

Next, the adhesive AD-1 was applied to the aluminum foil layer (AL) on the opposite surface from the corrosion prevention treated layer (CL) to a dry coated amount of 4 g/m² to 5 g/m² by gravure reverse coating, lamination was carried out to laminate base materials SB-1 to SB-3, and the adhesive AD-1 was cured by carrying out aging treatment, followed by laminating the base material layer (SB) through the adhesive layer (AD).

Next, adhesive resins AR-1 to AR-3 were extrusion-laminated within a temperature range of 260° C. to 300° C. onto the surface of the corrosion prevention treated layer (CL) of the resulting laminate using an extrusion laminator, and by carrying out sandwich lamination with the film SL-1, the thermoplastic resin layer (TPR) composed of the adhesive resin layer (AR) and the sealant layer (SL) was laminated to obtain a laminate having the laminated configuration shown in FIG. 1.

Next, thermocompression bonding was carried out by thermal lamination so that the substrate temperature was in near of the melting point of the sealant layer (SL) to securely adhere the corrosion prevented treated layer (CL) and the adhesive resin layer (AD). The ultimately obtained laminated lithium ion battery exterior materials were used in the evaluations indicated below. Evaluations of the configurations are summarized in Tables 7 and 8.

[Measurement of Birefringence]

Birefringence of the thermoplastic resin layer (TPR) was measured following heat treatment for each of the resulting exterior materials for light at a wavelength of 550 nm using a rotating analyzer.

[Measurement of Degree of Crystallization]

Degree of crystallization of the thermoplastic resin layer (TPR) was calculated following heat treatment for each of the resulting exterior materials by measuring by X-ray diffraction. Degree of crystallization was calculated in the manner described below.

After correcting profile data obtained by X-ray diffraction for background noise and further correcting for the amorphous portion and crystalline portion, degree of crystallization was determined from the area ratio between the amorphous portion and the crystalline portion.

[Evaluation Methods]

(Evaluation of Whitening During Molding)

After deep drawing at a draw depth of 5 mm using a die composed of long sides measuring 60 mm and short sides measuring 40 mm, the thermoplastic resin layer (TPR) was evaluated for the presence or absence of a whitening phenomenon. The mold clamping force generated by an air cylinder was 0.5 MPa to 0.8 MPa, and the stroke speed was 5 mm/sec. Evaluation criteria were as indicated below, and an evaluation of Fair or better was judged to be acceptable.

Good: No whitening
Fair: Extremely thin whitening confirmed
Bad: Prominent whitening confirmed over all portions subjected to strain during molding (Evaluation of Electrolyte Resistance)

Strips measuring 100 mm×15 mm were cut out from the exterior materials obtained in each example were used as test pieces.

The aforementioned test pieces were immersed in an electrolytic solution obtained by incorporating $LiPF_6$ (lithium hexafluorophosphate) in a mixture of ethylene carbonate, dimethyl carbonate and diethyl carbonate (weight ratio=1:1:1) to a concentration of 1.5 M, followed by further incorporating water equivalent to 1500 ppm by weight, and lamination strength of the test pieces was measured and evaluated initially and after storing for 1 week, 2 weeks, 4 weeks or 8 weeks. Evaluation criteria were as indicated below, and an evaluation of Fair or better was judged to be acceptable.

Good: Ratio of lamination strength after storing for 8 weeks to initial strength of 50% or more
Fair: Ratio of lamination strength after storing for 8 weeks to initial strength of 20% to 50%
Bad: Ratio of lamination strength after storing for 8 weeks to initial strength of less than 20%

(Overall Evaluation)

An overall evaluation of whitening during molding and electrolyte resistance using the criteria indicated below, and an evaluation of Fair or better was judged to be acceptable.

Excellent: Evaluation of Good for both whitening and electrolyte resistance
Good: Evaluation of Good for one of whitening or electrolyte resistance and evaluation of Fair for the other
Fair: Evaluation of Fair for both whitening and electrolyte resistance
Bad: Evaluation of Bad for evaluation of at least one of whitening and electrolyte resistance Examples 1 to 28 and Comparative Examples 1 and 2

Exterior materials having the configurations shown in Tables 7 and 8 were obtained according to the aforementioned exterior material production method.

In Tables 7 and 8, "CL-1/CL-2/CL-3" means that the corrosion prevention treated layer (CL) was provided by carrying out treatment on the aluminum foil (AL) with treatment agent CL-1, followed by compounding treatment by carrying out treatment with treatment agent CL-2, followed by further carrying out treatment with treatment agent CL-3. Similarly, "CL-1/CL-2" and "CL-1/CL-3" means that the corrosion prevented treated layer (CL) was provided by carrying out treatment with treatment agent CL-1 followed by compounding treatment by carrying out treatment with treatment agent CL-2 or treatment agent CL-3. In addition, "SB-3/SB-2" refers to a base material layer (SB) obtained by providing a laminated film obtained by laminating base material SB-3 and base material SB-2 by dry lamination using the adhesive SD-1 so that the base material SB-3 comprises the outermost layer.

Evaluation results are shown in Tables 7 and 8.

TABLE 7

| | Base Material Layer (SB) | Adhesive Layer (AD) | Aluminum Foil Layer (AL) | Corrosion Prevention Treated Layer (CL) | Thermoplastic Layer (TPR) Adhesive Resin Layer (AR) | Sealant Layer (SL) | Properties after Heat Treatment Birefringence | Degree of crystallization (%) |
|---|---|---|---|---|---|---|---|---|
| Ex. 4-1 | SB-1 | AD-1 | AL-1 | CL-1/ | AR-1 | SL-1 | 0.0004 | 40 |
| Ex. 4-2 | | | | CL-2/ | | | 0.0008 | 42 |
| Ex. 4-3 | | | | CL-3 | | | 0.0015 | 50 |
| Ex. 4-4 | | | | | | | 0.0020 | 58 |
| Ex. 4-5 | | | | | AR-2 | | 0.0004 | 40 |
| Ex. 4-6 | | | | | | | 0.0008 | 42 |
| Ex. 4-7 | | | | | | | 0.0015 | 50 |
| Ex. 4-8 | | | | | | | 0.0020 | 58 |
| Ex. 4-9 | | | | | AR-3 | | 0.0004 | 40 |
| Ex. 4-10 | | | | | | | 0.0008 | 42 |
| Ex. 4-11 | | | | | | | 0.0015 | 50 |
| Ex. 4-12 | | | | | | | 0.0020 | 58 |
| Ex. 4-13 | | | | CL-1/ | AR-2 | | 0.0004 | 40 |
| Ex. 4-14 | | | | CL-2 | | | 0.0008 | 42 |
| Ex. 4-15 | | | | | | | 0.0015 | 50 |
| Ex. 4-16 | | | | | | | 0.0020 | 58 |

| | Whitening during Molding | Initial strength | Lamination Strength (15N/15 mm) After electrolyte immersion 1 week | 2 weeks | 4 weeks | 8 weeks | Judgment | Overall Evaluation |
|---|---|---|---|---|---|---|---|---|
| Ex. 4-1 | Good | 15.2 | 14.1 | 14.1 | 13.2 | 12.2 | Good | Excellent |
| Ex. 4-2 | Fair | 15.1 | 14.2 | 14.1 | 13.5 | 12.1 | Good | Good |
| Ex. 4-3 | Fair | 15.2 | 13.9 | 14 | 13.8 | 11.9 | Good | Good |
| Ex. 4-4 | Fair | 15.2 | 14.1 | 14 | 13.5 | 12.1 | Good | Good |
| Ex. 4-5 | Good | 15.1 | 14.2 | 14.1 | 13.8 | 12.1 | Good | Excellent |
| Ex. 4-6 | Good | 15.1 | 14.1 | 13.9 | 13.6 | 12.4 | Good | Excellent |
| Ex. 4-7 | Good | 15.1 | 13.8 | 13.8 | 13.5 | 11.9 | Good | Excellent |
| Ex. 4-8 | Fair | 15.2 | 13.9 | 13.8 | 13.5 | 11.9 | Good | Good |
| Ex. 4-9 | Good | 15.3 | 14.1 | 13.9 | 13.6 | 11.8 | Good | Excellent |
| Ex. 4-10 | Good | 15.2 | 14.2 | 13.8 | 13.4 | 12.1 | Good | Excellent |
| Ex. 4-11 | Good | 15.2 | 14.1 | 13.9 | 13.5 | 12.1 | Good | Excellent |
| Ex. 4-12 | Fair | 15.2 | 14.1 | 13.8 | 13.6 | 12.2 | Good | Good |
| Ex. 4-13 | Good | 12.6 | 10.5 | 10.2 | 7.8 | 4.2 | Fair | Good |
| Ex. 4-14 | Good | 12.8 | 10.6 | 9.8 | 7.6 | 4.3 | Fair | Good |
| Ex. 4-15 | Good | 12.5 | 10.5 | 9.8 | 7.5 | 4.5 | Fair | Good |
| Ex. 4-16 | Fair | 12.6 | 10.6 | 10.2 | 7.5 | 4.2 | Fair | Fair |

TABLE 8

| | Base Material Layer (SB) | Adhesive Layer (AD) | Aluminum Foil Layer (AL) | Corrosion Prevention Treated Layer (CL) | Thermoplastic Layer (TPR) Adhesive Resin Layer (AR) | Sealant Layer (SL) | Properties after Heat Treatment Birefringence | Degree of crystallization |
|---|---|---|---|---|---|---|---|---|
| Ex. 4-17 | SB-1 | AD-1 | AL-1 | CL-1/ | AR-2 | SL-1 | 0.0004 | 40 |
| Ex. 4-18 | | | | CL-3 | | | 0.0008 | 42 |
| Ex. 4-19 | | | | | | | 0.0015 | 50 |
| Ex. 4-20 | | | | | | | 0.0020 | 58 |
| Ex. 4-21 | | | | CL-4 | AR-2 | | 0.0004 | 40 |
| Ex. 4-22 | | | | | | | 0.0008 | 42 |
| Ex. 4-23 | | | | | | | 0.0015 | 50 |
| Ex. 4-24 | | | | | | | 0.0020 | 58 |
| Ex. 4-25 | SB-3/ | | | CL-1/ | AR-2 | | 0.0004 | 40 |
| Ex. 4-26 | SB-2 | | | CL-2/ | | | 0.0008 | 42 |
| Ex. 4-27 | | | | CL-3 | | | 0.0015 | 50 |

TABLE 8-continued

| | | | | | |
|---|---|---|---|---|---|
| Ex. 4-28 | | | | 0.0020 | 58 |
| Comp. Ex. 4-1 | SB-1 | | AR-2 | 0.0004 | 66 |
| Comp. Ex. 4-2 | | | | 0.0025 | 58 |

| | Whitening during Molding | Lamination Strength (15N/15 mm) | | | | | Judgment | Overall Evaluation |
|---|---|---|---|---|---|---|---|---|
| | | Initial strength | After electrolyte immersion | | | | | |
| | | | 1 week | 2 weeks | 4 weeks | 8 weeks | | |
| Ex. 4-17 | Good | 15.1 | 14.1 | 13.9 | 13.5 | 12.2 | Good | Excellent |
| Ex. 4-18 | Good | 15.1 | 14.2 | 14.1 | 13.8 | 12.2 | Good | Excellent |
| Ex. 4-19 | Good | 15.2 | 14.1 | 14.1 | 13.8 | 12.1 | Good | Excellent |
| Ex. 4-20 | Fair | 15.2 | 14.1 | 14.1 | 13.9 | 12.2 | Good | Good |
| Ex. 4-21 | Good | 12.5 | 10.2 | 9.2 | 7.7 | 4.2 | Fair | Good |
| Ex. 4-22 | Good | 12.4 | 10.3 | 9.2 | 7.8 | 4.4 | Fair | Good |
| Ex. 4-23 | Good | 12.6 | 10.2 | 9.9 | 7.5 | 4.3 | Fair | Good |
| Ex. 4-24 | Fair | 12.5 | 10.1 | 9.8 | 7.6 | 4.2 | Fair | Fair |
| Ex. 4-25 | Good | 15.2 | 14.2 | 14.1 | 13.8 | 12.1 | Good | Excellent |
| Ex. 4-26 | Good | 15.1 | 13.9 | 13.8 | 13.7 | 12.2 | Good | Excellent |
| Ex. 4-27 | Good | 15.3 | 14.1 | 13.9 | 13.8 | 12.1 | Good | Excellent |
| Ex. 4-28 | Fair | 15.1 | 14.2 | 13.9 | 13.7 | 13.9 | Good | Good |
| Comp. Ex. 4-1 | Bad | 15.4 | 14.3 | 14.2 | 14.1 | 12.1 | Good | Bad |
| Comp. Ex. 4-2 | Bad | 15.2 | 14.2 | 14.1 | 13.9 | 12.2 | Good | Bad |

Examples 4-1 to 4-28, in which birefringence of the thermoplastic resin layer (TPR) after heat treatment was 0.002 or less and degree of crystallization was 60% or less, inhibited whitening during molding and demonstrated superior moldability and superior electrolyte resistance. In addition, Examples 4-5 to 4-12, in which elastomer components (a2) and (a3) were dispersed in the adhesive resin layer (AR), inhibited whitening during molding to a greater degree than Examples 4-1 to 4-4. In addition, it was determined from Examples 4-13 to 4-24 that long-term reliability of electrolyte resistance can be improved by using a cationic polymer for the corrosion prevention treated layer (CL). It was determined from Examples 4-25 to 4-28 that the configuration of the base material layer (SB) does not have a significant effect on whitening during molding or electrolyte resistance.

On the other hand, Comparative Example 4-1, in which the degree of crystallization exceeded 60%, and Comparative Example 4-2, in which birefringence was greater than 0.002, demonstrated a whitening phenomenon during molding and inferior moldability.

The lithium ion battery exterior material according to the embodiments of the present invention allows the obtaining of superior electrical insulating properties by forming an adhesive resin layer with an adhesive resin obtained by adding a miscible elastomer dispersed at a dispersed phase size of 1 nm to less than 1 μm to an acid-modified polyolefin resin. Consequently, since the thickness of the exterior material can be reduced and both superior moisture resistance and electrical insulating properties can be realized, the exterior material can be preferably used in fields requiring particularly superior long-term stability and high battery capacity as exemplified by the automotive and power storage fields.

Since the exterior material according to the embodiments of the present invention has superior resistance such as electrolyte resistance, and superior moldability capable of inhibiting the occurrence of a whitening phenomenon during cold forming, it is particularly useful in large-scale applications such as electric vehicles requiring reliability and long-term stability.

What is claimed is:

1. A lithium ion battery exterior material, comprising:
a base material layer; and
an adhesive layer, an aluminum foil layer provided with a corrosion prevention treated layer, an adhesive resin layer, and a sealant layer, which are sequentially laminated on one surface of the base material layer, the adhesive resin layer containing an acid-modified polyolefin resin and a miscible elastomer dispersed in the acid-modified polyolefin at a dispersed phase size of 1 nm to less than 1 μm, wherein
the acid-modified polyolefin resin is a resin that has been graft-modified with one or more compounds of unsaturated carboxylic acid derivative components selected from the group consisting of unsaturated carboxylic acids, acid anhydrides of unsaturated carboxylic acids and esters of unsaturated carboxylic acids, and
an absolute value of birefringence following a heat treatment of a thermoplastic resin layer is 0.002 or less and a degree of crystallization is 60% or less, the thermoplastic resin layer being composed of the adhesive resin layer and the sealant layer.

2. The lithium ion battery exterior material according to claim 1, wherein the adhesive resin layer contains an immiscible elastomer dispersed in the acid-modified polyolefin resin at a dispersed phase size of 1 μm to less than 1000 μm.

3. The lithium ion battery exterior material according to claim 1, wherein a withstand voltage of the adhesive resin layer as measured according to the "Testing Methods for Electric Strength of Solid Insulating Materials" defined in JIS-C2110 is 0.04 kV/μm or more.

4. The lithium ion battery exterior material according to claim 1, wherein a laminated portion of the adhesive resin layer and the sealant layer provided on an opposite surface of the adhesive resin layer from the base material layer satisfies the following conditions (1) and (2):
(1) a heat of fusion ΔH as measured by differential scanning calorimetry is 15 J/g to 80 J/g and a melting temperature Tm is 130° C. to 170° C.; and, (2) a melt viscosity η at a shear velocity of $1 \times 10^{-2}$/second and temperature 30° C. higher than the melting temperature Tm of a laminated portion of the sealant layer and the adhesive resin layer is 1000 Pa·s to 7000 Pa·s.

5. The lithium ion battery exterior material according to claim 1, wherein a luminosity difference ΔL* of an aluminum laminate obtained by sequentially laminating the base material layer, the adhesive layer, the aluminum foil layer and the adhesive resin layer before and after drawing the adhesive resin layer surface of the aluminum laminate is 25 or less when a test piece of the aluminum laminate having a width of 15 mm is drawn by 150%, and when the luminosity before drawing is defined as L*1 and the luminosity after drawing is defined as L*2, the luminosity difference ΔL* is L*2−L*1.

6. The lithium ion battery exterior material according to claim 1, wherein a content of the miscible elastomer is 1% by weight to 50% by weight based on 100% by weight of the adhesive resin layer, and the miscible elastomer is one or more compounds selected from the group consisting of a styrene-based thermoplastic elastomer, a hydrogenated styrene-based thermoplastic elastomer and a propylene-α-olefin copolymer elastomer, and is dispersed at a dispersed phase size of 1 nm to 200 nm.

7. The lithium ion battery exterior material according to claim 1, wherein the sealant layer provided on an opposite surface of the adhesive resin layer from the base material layer is composed of a polyolefin-based resin, and
the polyolefin-based resin and the acid-modified polyolefin-based resin contain one or more compounds selected from the group consisting of random polypropylene, homopolypropylene and block polypropylene.

8. The lithium ion battery exterior material according to claim 1, wherein the base material layer has at least one of a biaxially oriented polyester film and a biaxially oriented polyamide film.

9. The lithium ion battery exterior material according to claim 1, further comprising a resin layer between the base material layer and the aluminum foil layer, wherein the base material layer has a protective layer on an opposite surface from a surface on which the aluminum foil layer is laminated.

10. The lithium ion battery exterior material according to claim 1, wherein the corrosion prevention treated layer is provided at least on the surface of the aluminum foil layer that contacts the adhesive resin layer.

11. The lithium ion battery exterior material according to claim 1, wherein
the miscible elastomer is a polyolefin-based elastomer composed of a crystalline polyolefin segment and an amorphous polyolefin segment and having a microphase-separated structure, a content of the polyolefin-based elastomer is 5% by weight to 50% by weight, and the miscible elastomer is a propylene-based elastomer.

12. The lithium ion battery exterior material according to claim 1, wherein
the miscible elastomer is a styrene-based thermoplastic elastomer or a hydrogenated styrene-based thermoplastic elastomer, a content of the styrene-based thermoplastic elastomer or the hydrogenated styrene-based thermoplastic elastomer is 5% by weight to 30% by weight, and
a hydrogenation product of a block copolymer composed of styrene and butadiene, or a hydrogenation product of a block copolymer composed of styrene and isoprene.

13. The lithium ion battery exterior material according to claim 1, wherein
a polymer x having a functional group capable of reacting with a graft-modified unsaturated carboxylic acid derivative component is contained in the acid-modified polyolefin resin in the corrosion prevention treated layer,
the polymer x is a cationic polymer, and
the cationic polymer is one or more compounds selected from the group consisting of polyethyleneimine, an ion-polymer complex composed of polyethyleneimine and a polymer having carboxylic acid, a primary amine-grafted acrylic resin obtained by grafting a primary amine to an acrylic main backbone, a polyallylamine or derivative thereof, and aminophenol.

* * * * *